`US012401700B2`

United States Patent
Chanda

(10) Patent No.: US 12,401,700 B2
(45) Date of Patent: Aug. 26, 2025

(54) SYSTEMS AND METHODS FOR ESTABLISHING VIRTUAL BREAKOUT MEETINGS IN A VIDEO CONFERENCE BY UTILIZING VARIOUS CANVASES OF A VIRTUAL WORKSPACE

(71) Applicant: Bluescape Buyer LLC, Chicago, IL (US)

(72) Inventor: Rupen Chanda, Austin, TX (US)

(73) Assignee: Bluescape Buyer LLC, Chicago, IL (US)

( * ) Notice: Subject to any disclaimer, the term of this patent is extended or adjusted under 35 U.S.C. 154(b) by 306 days.

(21) Appl. No.: 18/106,992

(22) Filed: Feb. 7, 2023

(65) Prior Publication Data
US 2023/0254352 A1   Aug. 10, 2023

Related U.S. Application Data
(60) Provisional application No. 63/307,941, filed on Feb. 8, 2022.

(51) Int. Cl.
    *H04L 65/401* (2022.01)
(52) U.S. Cl.
    CPC .............................. *H04L 65/4015* (2013.01)
(58) Field of Classification Search
    CPC .. G06F 3/0481; G06F 3/1454; G06F 3/04883; G06F 9/451; G06F 3/04842; G06Q 10/101; H04L 67/131; H04L 12/1813; H04L 12/1827; H04L 12/1822; H04L 65/4015
    See application file for complete search history.

(56) References Cited

U.S. PATENT DOCUMENTS

| | | | |
|---|---|---|---|
| 10,304,037 B2 | 5/2019 | Foley et al. | |
| 10,802,783 B2 | 10/2020 | Santhakumar et al. | |
| 11,126,325 B2 | 9/2021 | Jakobovits et al. | |
| 11,949,723 B1* | 4/2024 | Batt | H04L 65/403 |
| 2014/0362165 A1* | 12/2014 | Ackerman | G06Q 10/10 348/14.07 |

(Continued)

OTHER PUBLICATIONS

Anonymous, Security Assertion Markup Language, Wikipedia, retrieved on Mar. 11, 2021, 11 pages. Retrieved from the internet [URL: https://en.wikipedia.org/wiki/Security_Assertion_Markup_Language].

*Primary Examiner* — Chris Parry
*Assistant Examiner* — Abderrahmen Chouat
(74) *Attorney, Agent, or Firm* — Haynes Beffel & Wolfeld LLP; Andrew L. Dunlap

(57) ABSTRACT

Systems and methods are provided for operating a network node to implement a collaborative breakout session in a video conference or in a content collaboration session between other network nodes hosted in part by a collaboration system. The system includes logic to initiate a collaboration server of the collaboration system to provide a first group of network nodes access to a first canvas of a virtual workspace to commence collaboration on the first canvas of the virtual workspace by the first group of network nodes. The system includes logic to initiate the collaboration server of the collaboration system to provide the first group of network nodes access to the entire virtual workspace to commence collaboration on the virtual workspace upon conclusion of the collaborative breakout session.

20 Claims, 41 Drawing Sheets

(56) References Cited

U.S. PATENT DOCUMENTS

| | | | |
|---|---|---|---|
| 2016/0073059 A1* | 3/2016 | Bader-Natal | H04N 7/148 |
| | | | 348/14.03 |
| 2016/0328114 A1* | 11/2016 | Santhakumar | G06F 3/1454 |
| 2016/0378291 A1* | 12/2016 | Pokrzywka | G06F 3/0488 |
| | | | 715/751 |
| 2019/0121498 A1* | 4/2019 | Jakobovits | G06F 3/0481 |
| 2021/0176216 A1* | 6/2021 | Yorga | H04L 63/0421 |
| 2021/0286861 A1 | 9/2021 | Churchill et al. | |
| 2022/0270050 A1* | 8/2022 | Stringham | G06F 3/04845 |

* cited by examiner

FIG. 4B

M^T Bluescape Meet                                        ✕

⊘ This tab is only visible to you. Please select a workspace and it will be added to the ongoing meeting.

B^T Hello, Dora                                    ⊕ Add workspace    ←410

My workspaces  ⑩  All ⑬⑤⑦                               Create new workspace ⊕

☐ My Bluescape ⑳           ☆    ☐ UX - 2023 Vision & Plan 🔒  ☆    Search 🔍  ▽  ⊞
By Survi Gopal          Secret   By You                    Secret
Modified 2/23/2023              Modified 2/23/2023               ☐ BDV PD Demo
                                                                 By Alexy Agranovsky  Secret
(LK)(TK)(Q)(PJ) +100            (LK)(Q)                          Modified 2/23/2023

☐ TPM ⑳                    ☆    ☐ UI Inventory ⑳          🔒    ⌂                    Details  ○○○
By Bob Shields                  By Gemma Waston
Modified 2/23/2023              Modified 2/23/2023               ☐ QA Planning 2023
                                                                 By Elaine Rabonza
(LK)(Q)                         (LK)(TK)                         Modified 2/23/2023

☐ Mobile standup                ☐ Metrics 2.0
By Harley Ware                  By Elaine Rabonza
Modified 2/23/2023              Modified 2/23/2023               ☐ Video Test          ☆
                                                                 By You
                                                                 Modified 2/23/2023

DATA STRUCTURES FOR BREAKOUT SESSION WITH BREAKOUT MEETING ROOMS
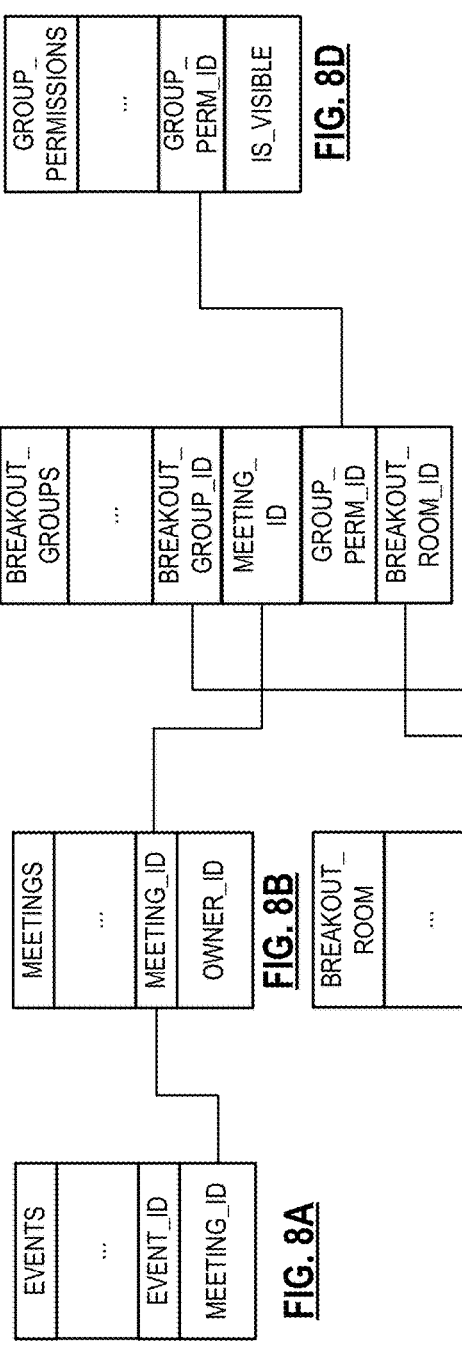
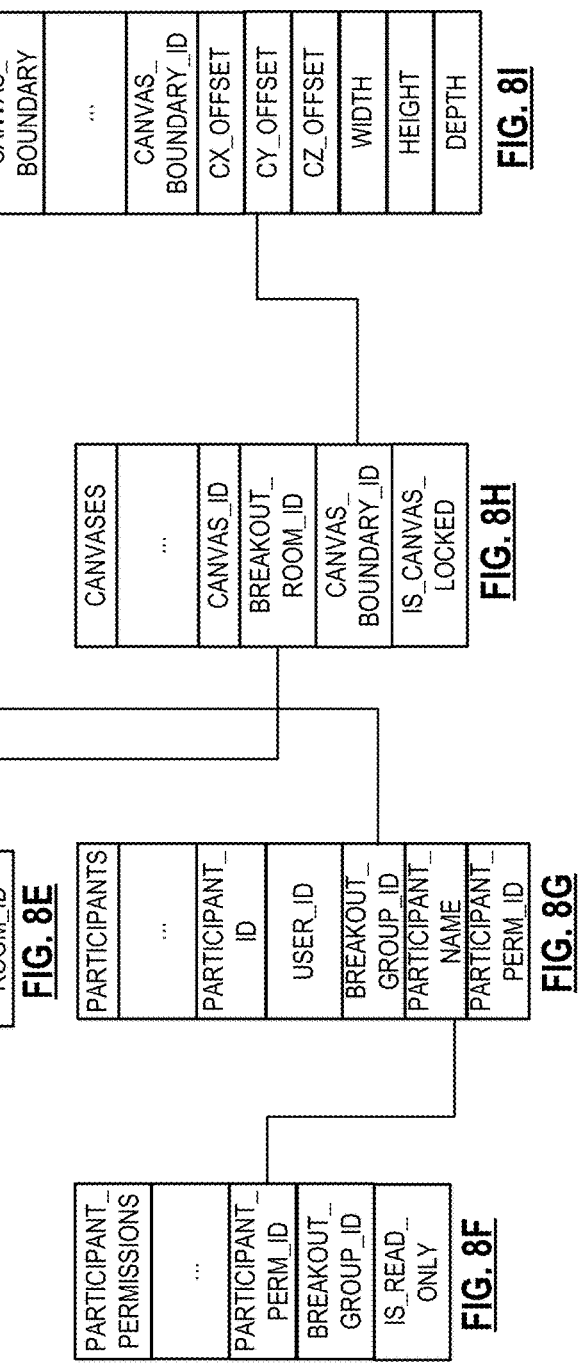

SYSTEMS AND METHODS FOR ESTABLISHING VIRTUAL BREAKOUT MEETINGS IN A VIDEO CONFERENCE BY UTILIZING VARIOUS CANVASES OF A VIRTUAL WORKSPACE

PRIORITY APPLICATION

This application claims the benefit of U.S. Provisional Patent Application No. 63/307,941, filed on 8 Feb. 2022, which application is incorporated herein by reference.

FIELD OF INVENTION

The present technology relates to content collaboration and video conferencing systems that enable users to actively participate in collaboration sessions from multiple geographic locations.

BACKGROUND

Video conferencing systems are used in a variety of environments to allow users to participate in content review. Users of a video conferencing system can join sessions from locations around the world. A participant in a session can share content (e.g., documents, spreadsheets, slide decks, images, videos, line drawings, etc.) that is displayed on their local screen with other participants in the session. However, conventional video conferencing systems do not provide the ability for each participant to interact with the content that is shared from a particular participant. For example, if a first participant is sharing a view of a local spreadsheet that is open on their computer with a second participant during a video conference, the second participant will not be able to interact with (e.g., edit) the spreadsheet. The second participant will be limited to viewing what the first participant is doing with the spreadsheet. Further, if the second participant shares their screen with the first participant, the first participant will not be able to interact with the shared content from the second participant.

Therefore, a need arises for a collaboration and video conferencing system that allows all participants to actively and simultaneously interact with a shared virtual workspace, so as to allow the participants to work on particular digital assets to complete a specified task. Furthermore, a need arises for a collaboration and video conferencing system that allows a group of participants in a collaboration session to work on particular digital assets within a virtual workspace to complete a specified task while a different group of participants may need to work on different digital assets within the virtual workspace to complete a different task. Yet, another need arises for a collaboration and video conferencing system in which a group of certain participants has access to a certain portion of the virtual workspace but does not have access to other portions of the virtual workspace, wherein other participants can have access to the other portion of the virtual workspace.

SUMMARY

A system and method for operating a system are provided for controlling display of a workspace, whereas a workspace is a digital construct for organizing content by assigning coordinates or locations to particular digital assets in a virtual space having two or three dimensions in a whiteboard. The digital assets in the virtual workspace can be displayed on a display client according to their coordinates in the virtual workspace.

Technology is provided to operate a network node to implement a collaborative breakout session in a video conference between other network nodes hosted in part by a collaboration system. The system includes logic to establish the video conference between the other network nodes. The network node and each network node of the other network nodes can include a display having a physical display space, and a processor. The system includes logic to identify a first group of network nodes of the other network nodes and identify a first canvas of a virtual workspace. The first canvas can have a location and dimensions in the virtual workspace. The first group of network nodes can be associated with the first canvas and the first canvas may not include the entire virtual workspace. The system includes logic to initiate the collaborative breakout session within the video conference by initiating a collaboration server of the collaboration system to provide the first group of network nodes access to the first canvas of the virtual workspace to commence collaboration on the first canvas of the virtual workspace by the first group of network nodes. The collaboration on the first canvas can be commenced by, for each respective network node of the first group of network nodes, mapping a client viewport having a location and dimensions in the first canvas of the virtual workspace to a local client screen space of the respective network node having dimensions in the physical display space of the respective network node. Additionally, the collaboration on the first canvas can be commenced by, for each respective network node of the first group of network nodes, rendering digital assets having locations in the client viewport to the local client screen space of the respective network node as a function of the mapping. The system includes logic, upon conclusion of the collaborative breakout session, to initiate the collaboration server of the collaboration system to provide the first group of network nodes access to the entire virtual workspace to commence further collaboration on the virtual workspace.

The collaboration on the first canvas can be commenced by the first group by only allowing the network nodes of the first group to access the first canvas of the virtual workspace and without allowing (or preventing) the network nodes of the first group to access other portions of the virtual workspace.

In one implementation, the system can include logic to identify a second group of network nodes of the other network nodes and identify a second canvas of the virtual workspace. The second group of network nodes can be associated with the second canvas. The system includes logic to initiate the collaborative breakout session within the video conference by initiating the collaboration server of the collaboration system to provide the second group of network nodes access to the second canvas of the virtual workspace to commence collaboration on the second canvas of the virtual workspace by the second group of network nodes. The collaboration on the second canvas can be commenced by, for each respective network node of the second group of network nodes, mapping a client viewport having a location and dimensions in the second canvas of the virtual workspace to a local client screen space of the respective network node having dimensions in the physical display space of the respective network node. Additionally, the collaboration on the second canvas can be commenced by, for each respective network node of the second group of network nodes, rendering digital assets having locations in the client viewport having the location and dimensions in the second canvas to the local client screen space of the respective network node as a function of the mapping. The system, upon the conclusion of the collaborative breakout session, includes logic to initiate the collaboration server of the collaboration system to provide both the first group of network nodes and the second group of network nodes access to both the first canvas and the second canvas of the virtual workspace to commence further collaboration on the first canvas and the second canvas.

The collaboration on the first canvas can be commenced by the first group by only allowing the network nodes of the first group to access the first canvas of the virtual workspace and without allowing (or preventing) the network nodes of the first group to access the second canvas of the virtual workspace. The collaboration on the second canvas can be commenced by the second group by only allowing the network nodes of the second group to access the second canvas of the virtual workspace and without allowing (or preventing) the network nodes of the second group to access the first canvas of the virtual workspace.

In one implementation, during the collaborative breakout session, the network nodes of the first group can view digital assets having locations in the second canvas but they cannot participate in the collaboration on the second canvas by manipulating the digital assets having locations in the second canvas.

In one implementation, the network node can be included in the first group of network nodes. During the collaborative breakout session, the network node or at least one network node of the first group can store collaboration data identifying digital assets having locations in the first canvas of the virtual workspace. The collaboration data can include (i) locations of the identified digital assets having locations in the first canvas of the virtual workspace and (ii) a log of events (a) relating to the digital assets having locations in the first canvas of the virtual workspace and (b) including entries related to network nodes of the first group interacting with the identified digital assets having locations in the first canvas.

The collaboration data (spatial event map) provided to and stored by the first group of nodes does not include information regarding the second canvas or digital assets located therein. Similarly, the collaboration data (spatial event map) provided to and stored by the second group of nodes does not include information regarding the first canvas or digital assets located therein. This feature limits the spatial event map to include only data relevant to the particular canvas and not the other canvases during a breakout session.

The stored collaboration data can identify digital assets having locations in a second canvas of the virtual workspace. The stored collaboration data can further include (i) locations of the identified digital assets having locations in the second canvas of the virtual workspace and (ii) a log of events (a) relating to the digital assets having locations in the second canvas of the virtual workspace. The log of event can further include entries related to network nodes of the second group interacting with the identified digital assets having locations in the second canvas.

In one implementation, the first canvas and the second canvas do not overlap one another in the virtual workspace.

A user of the network node can interact with the collaboration system to (i) allow, during the collaborative breakout session, the first group of network nodes to collaborate using the second canvas of the virtual workspace and (ii) not allow (or prevent), during the collaborative breakout session, the first group of network nodes to collaborate by viewing the second canvas of the virtual workspace.

In one implementation, the first group of network nodes is allowed to collaborate with the second canvas by rendering, but not interacting with, the digital assets having locations within the second canvas.

In one implementation, the first group of network nodes is allowed to collaborate with the second canvas by rendering and interacting with the digital assets having locations within the second canvas.

The system further comprises logic to enable a user of the network node to interact with the collaboration system to form the first group of network nodes and assign the first canvas of the virtual workspace to the first group prior to establishing the video conference with the other network nodes.

The system further comprises logic to enable a user of the network node to interact with the collaboration system to form the first group of network nodes and assign the first canvas of the virtual workspace to the first group after establishing the video conference with the other network nodes.

The further comprises logic to enable a user of the network node to interact with the collaboration system to (i) allow, during the collaborative breakout session, the first group of network nodes to collaborate using other portions of the virtual workspace outside of the first canvas and (ii) not allow (or prevent), during the collaborative breakout session, the first group of network nodes to collaborate by viewing other portions of the virtual workspace that are outside of the first canvas.

The system further comprises logic to identify a first sub-canvas of the first canvas and identify a second sub-canvas of the first canvas. The system further comprises logic to identify a first sub-group of network nodes of the first group of network nodes and logic to identify a second sub-group of network nodes of the first group of network nodes. The system includes logic to initiate the collaborative breakout session including initiating the collaboration server of the collaboration system to provide the first sub-group of network nodes access to the first sub-canvas of the first canvas of the virtual workspace to commence collaboration on the first sub-canvas of the first canvas of the virtual workspace by the first sub-group of network nodes. The system includes logic to initiate the collaboration server of the collaboration system to provide the second sub-group of network nodes access to the second sub-canvas of the first canvas of the virtual workspace to commence collaboration on the second sub-canvas of the first canvas of the virtual workspace by the second sub-group of network nodes.

The technology disclosed includes a network node of a collaboration system. The collaboration system can host a collaborative breakout session in a video conference between the network node and other network nodes. The network node can comprise a display having a physical display space and a processor. The processor can be configured with logic to establish the video conference between the other network nodes, the network node and each network node of the other network nodes including a display having a physical display space. The processor is configured with logic to identify a first group of network nodes of the other network nodes and identify a first canvas of a virtual workspace, the first canvas having a location and dimensions in the virtual workspace. The first group of network nodes is associated with the first canvas and the first canvas does not include the entire virtual workspace. The processor includes logic to initiate the collaborative breakout session within the video conference by initiating a collaboration server of the collaboration system to provide the first group of network nodes access to the first canvas of the virtual workspace to commence collaboration on the first canvas of the virtual workspace by the first group of network nodes. The collaboration on the first canvas can be commenced by, for each respective network node of the first group of network nodes, (i) mapping a local client viewport having a location and dimensions in the first canvas of the virtual workspace to a local client screen space of the respective network node having dimensions in the physical display space of the respective network node. The collaboration on the first canvas can be commenced by, for each respective network node of the first group of network nodes, (ii) rendering digital assets having locations in the client viewport to the local client screen space of the respective network node as a function of the mapping. Upon conclusion of the collaborative breakout session, the processor is configured with logic to initiate the collaboration server of the collaboration system to provide the first group of network nodes access to the entire virtual workspace to commence further collaboration on the virtual workspace.

A method of operating a collaboration server of a collaboration system is described. The method includes implementing a collaborative breakout session in a video conference between network nodes of the collaboration system. The method includes establishing the video conference between the network nodes, each of the network nodes including a display having a physical display space and a processor. The method includes receiving an identification of a first group of network nodes of the network nodes and receiving an identification of a first canvas of a virtual workspace. The first canvas having a location and dimensions in the virtual workspace. The first group of network nodes can be associated with the first canvas and the first canvas may not include the entire virtual workspace. The method includes initiating the collaborative breakout session within the video conference by providing the first group of network nodes access to the first canvas of the virtual workspace to commence collaboration on the first canvas of the virtual workspace by the first group of network nodes. The collaboration on the first canvas can be commenced by providing information to each network node of the first group of network nodes that allows, for each respective network node of the first group of the network nodes, (i) mapping a client viewport having a location and dimensions in the first canvas of the virtual workspace to a local client screen space of the respective network node having dimensions in the physical display space of the respective network node. Further, the collaboration on the first canvas can be commenced by providing information to each network node of the first group of network nodes that allows for (ii) rendering digital assets having locations in the client viewport to the local client screen space of the respective network node as a function of the mapping. The method includes, upon conclusion of the collaborative breakout session, providing the first group of network nodes access to the entire virtual workspace to commence further collaboration on the virtual workspace.

In one implementation, the method includes providing collaboration data to each of the network nodes of the first group during the collaborative breakout session. The collaboration data can identify digital assets having locations in the first canvas of the virtual workspace. The collaboration data can include (i) locations in first canvas of the virtual workspace of the identified digital assets and (ii) a log of events (a) relating to the digital assets having locations in the first canvas of the virtual workspace. The collaboration data can include log of events (b) including entries related to network nodes of the first group interacting with the identified digital assets having locations in the first canvas.

Technology is provided to operate a network node to implement a collaborative breakout session in a content collaboration session between other network nodes hosted in part by a collaboration system. A method of operating the network node to implement the collaborative breakout session in the content collaboration session between other network nodes hosted in part by the collaboration system includes the following operations. The method includes establishing the content collaboration session between the other network nodes, the network node and each network node of the other network nodes including a display having a physical display space and a processor. The method includes identifying a first group of network nodes of the other network nodes and identifying a first canvas of a virtual workspace, the first canvas having a location and dimensions in the virtual workspace, and the first group of network nodes being associated with the first canvas and the first canvas not including the entire virtual workspace. The method includes, within the content collaboration session, initiating the collaborative breakout session by initiating a collaboration server of the collaboration system to provide the first group of network nodes access to the first canvas of the virtual workspace to commence collaboration on the first canvas of the virtual workspace by the first group of network nodes. The collaboration on the first canvas can be commenced by, for each respective network node of the first group of network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping. The method includes, upon conclusion of the collaborative breakout session, initiating the collaboration server of the collaboration system to provide the first group of network nodes access to the entire virtual workspace to commence further collaboration on the virtual workspace.

Systems and computer program products which can execute the methods are also described herein (e.g., a non-transitory computer-readable recording medium having a program recorded thereon, wherein, when the program is executed by one or more processors the one or more processors can perform the methods and operations described above).

Other aspects and advantages of the present technology can be seen on review of the drawings, the detailed description, and the claims, which follow.

BRIEF DESCRIPTION OF THE DRAWINGS

The technology will be described with respect to specific embodiments thereof, and reference will be made to the drawings, which are not drawn to scale, and in which:

FIGS. 4A, 4B, 4C, 4D, 4E, and 4F present user interface examples of a process flow to add workspace to a collaboration meeting.

FIGS. 8A, 8B, 8C, 8D, 8E, 8F, 8G, 8H, and 8I present example of data structures that can be used to implement a collaborative breakout session with breakout meeting rooms.

DETAILED DESCRIPTION

Figure 1A:
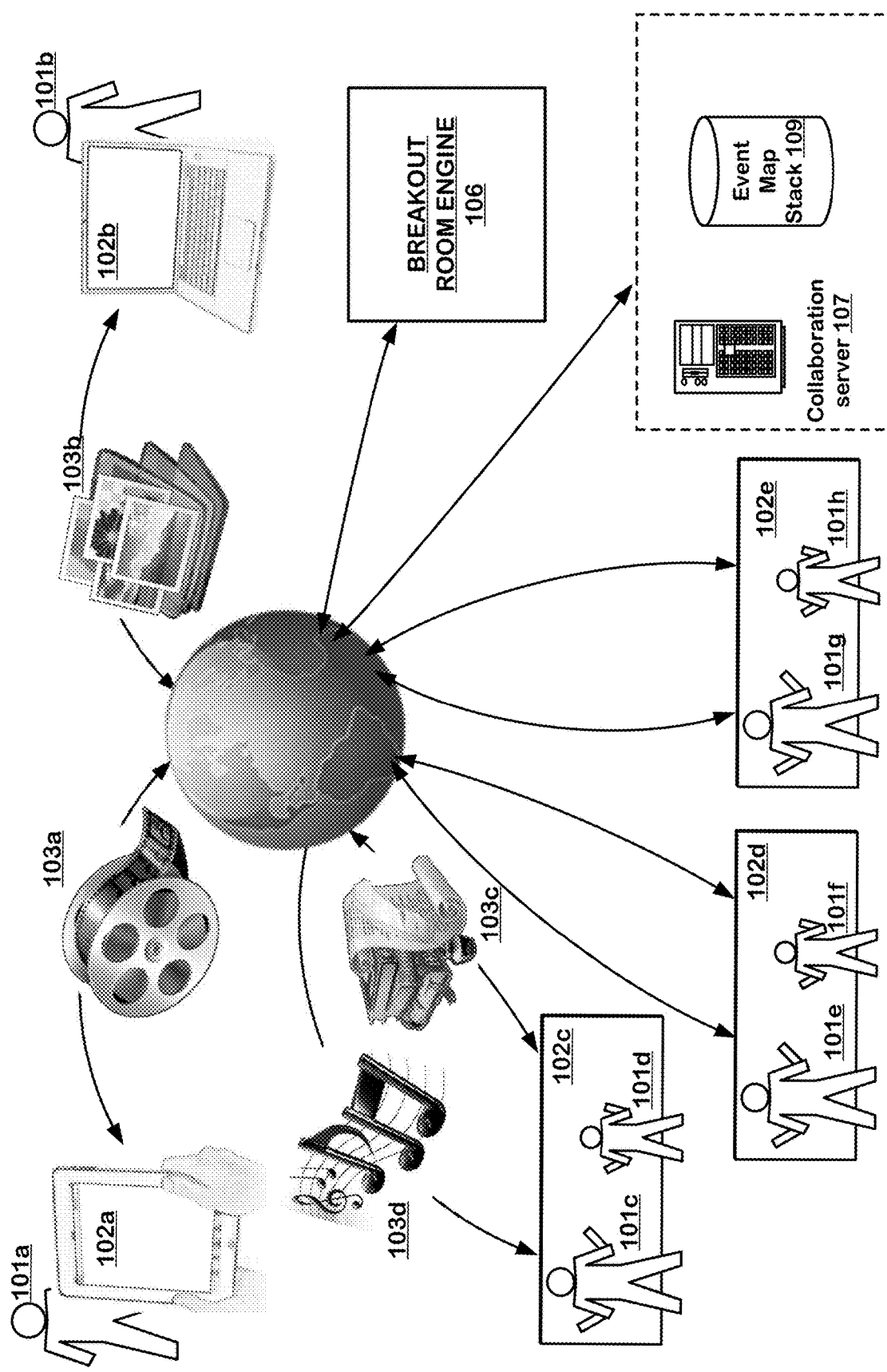
FIGS. 1A and 1B illustrate example aspects of a system implementing collaborative breakout session in a video conference.

A detailed description of embodiments of the present technology is provided with reference to the FIGS. 1-15.

The following description is presented to enable a person skilled in the art to make and use the technology, and is provided in the context of a particular application and its requirements. Various modifications to the disclosed embodiments will be readily apparent to those skilled in the art, and the general principles defined herein may be applied to other embodiments and applications without departing from the spirit and scope of the present technology. Thus, the present technology is not intended to be limited to the embodiments shown, but is to be accorded the widest scope consistent with the principles and features disclosed herein.

Environment

We describe a collaboration environment in which users participate in an interactive video conference and/or in a content collaboration session from network nodes located across the world. A user or a participant can join and participate in the video conference and content collaboration session, using display clients, such as browsers, for large format digital displays, desktop and laptop computers, or mobile computing devices. Video conference and content collaboration systems can be used in a variety of environments to allow users to contribute and participate in content generation and review. Users of video conference and content collaboration systems can join collaboration sessions from remote locations around the globe. Participants of a video conference and content collaboration meeting can share digital assets such as documents, spreadsheets, slide decks, images, videos, line drawings, annotations, etc. with other participants in a shared workspace (also referred to as a virtual workspace). Other examples of digital assets include software applications such as third-party software applications or proprietary software applications, web pages, web resources, cloud-based applications, APIs to resources or applications running on servers.

In some video conference and content collaboration meetings the participants of the meeting can be divided in groups. Participants in a group can collaborate with other participants in their respective groups during virtual breakout sessions. During a virtual breakout session, the participants of a group can collaborate using digital assets provided to respective groups in their virtual breakout meeting rooms. The virtual breakout meeting room for a group can include the digital resources for the participants of the group to perform their tasks. Examples of digital assets can include documents, files, images, whiteboard, etc. The digital assets (or resources) for a group can be positioned in an area (e.g., a first canvas) located within a virtual workspace that is accessible to members of the respective breakout group during the breakout session. In one embodiment, participants of a group may not be able to view or edit digital assets assigned to virtual breakout rooms of other breakout groups in the collaboration meeting. In another embodiment, the participants of other groups can view the digital assets assigned to virtual breakout rooms of other groups. However, they may not be able to interact with the digital assets or edit content of such digital assets.

FIG. 1A illustrates example aspects of a digital display collaboration environment. In the example, a plurality of users 101a-h (collectively 101), may desire to collaborate with each other, including sharing digital assets including, for example, complex images, music, video, documents, and/or other media, all generally designated in FIG. 1A as 103a-d (collectively 103).

The digital assets can be stored in an external system such as a cloud-based storage system or locally within the collaboration system such as on a resource server or a local storage. Throughout this document the term "collaboration system" also encompasses a video conferencing system that is part of the collaboration system or that is separate from the collaboration system. Resource servers can include logic to maintain security protocols protecting access to the digital assets independent of a workspace. Others digital assets may be available to participants in the workspace without further security protocols.

The users in the illustrated example can use a variety of devices configured as electronic network nodes, in order to collaborate with each other, for example a tablet 102a, a personal computer (PC) 102b, and many large format displays 102c, 102d, 102e (collectively devices 102). The network nodes can be positioned in locations around the world. The user devices, which can be referred to as (client-side) network nodes, have display clients, such as browsers, controlling displays (e.g., a physical display space) on which a displayable area (e.g., a local client screen space) is allocated for displaying graphical objects in a workspace. The displayable area (local client screen space) for a given user may comprise the entire screen of the display (physical display space), a subset of the screen, a window to be displayed on the screen and so on. The display client can set a (client) viewport in the workspace, which identifies an area (e.g., a location and dimensions) in the coordinate system of the workspace, to be rendered in the displayable area (local client screen space).

The display clients at client-side network nodes 102a, 102b, 102c, 102d, 102e are in network communication with a collaboration server 107 configured at a server-side network node. The communication between the client-side network nodes and the collaboration server is established using a network(s) 104. The network nodes 102a, 102b, 102c, 102d, and 102e each comprise respective computer systems 110 executing client-side software 112. The collaboration server 107 can maintain participant accounts, by which access to one or more workspace data sets can be controlled. A workspace database 109 (also referred to as event stack map or spatial event map) accessible by the collaboration server 107 can store the workspace data sets, which can comprise spatial event maps. The collaboration server 107 can also establish video conference sessions between the client-side network nodes 102a, 102b, 102c, 102d and 102e for simultaneous video conferencing and virtual workspace collaboration.

The collaboration server 107 can be linked with a breakout room engine 106. The breakout room engine 106 includes logic to assign participants of a collaboration meeting to breakout groups (e.g., different groups of network nodes). The breakout room engine 106 can also include logic to create virtual breakout rooms containing digital resources that can be used by the breakout groups during virtual breakout sessions. The resources for the virtual breakout group are positioned in an area (e.g., canvas) on the workspace which is only accessible by participants of the breakout group during the virtual breakout session.

When a breakout group session starts, the participants of the breakout group session are positioned in respective areas (canvases) within the workspace (corresponding to their virtual breakout rooms) and can only view digital assets within that area (canvas) until the group breakout session ends. Other digital assets in the workspace are not available to the group. The area or canvas can be considered as a bounded area within the workspace including all resources (digital assets) for the meeting. After the breakout session ends, the area or canvas designated for the group and all digital resources in that bounded area become unlocked and available for participants of other groups. When the group session ends, all the digital resources that group participants have worked on are available for review and discussion in the main collaboration meeting in which all meeting participants are included.

As used herein, a network node is an active electronic device that is attached to a network, and is capable of sending, receiving, or forwarding information over a communications channel. Examples of electronic devices which can be deployed as network nodes, include all varieties of computers, display walls, workstations, laptop and desktop computers, handheld computers and smart phones.

As used herein, the term "database" does not necessarily imply any unity of structure. For example, two or more separate databases, when considered together, still constitute a "database" as that term is used herein.

The operation of a network node to implement a collaborative breakout session in a collaboration meeting (such as a video conference) with other network nodes can be hosted in part by a collaboration system. This can include establishing the video conference between the other network nodes. The network node and each of the other network nodes can include a display having a physical display space, a user input device, a processor and a communication port. This can also include identifying a first group of network nodes of the other network nodes and identifying a first canvas (area) of a virtual workspace. The first canvas can have a location and dimensions in the virtual workspace. Further, the first group of network nodes can belong to a first virtual breakout group and a first canvas may not include the entire virtual workspace. The first canvas can be a sub-area on the workspace only accessible by participants of the first virtual breakout group during the virtual breakout session. The first group of network nodes can be associated with the first canvas.

This operation of implementing the collaborative breakout session can include initiating a collaboration server of the collaboration system to provide the first group of network nodes access to the first canvas of the virtual workspace to commence collaboration on the first canvas of the virtual workspace by the first group of network nodes to initiate the collaborative breakout session or the virtual breakout session in the collaboration meeting. The collaboration on the first canvas can be commenced by mapping, for each respective network node of the first group, a client viewport having a location and dimensions in the first canvas of the virtual workspace to a local client screen space of the respective network node having dimensions in the physical display space of the respective network node. In one implementation, collaboration on the first canvas can be commenced by mapping, for at least some of the network nodes of the first group, a client viewport having a location and dimensions in the first canvas of the virtual workspace to a local client screen space of the respective network node having dimensions in the physical display space of the respective network node. Similarly, the collaboration on the second, canvas can be commenced by mapping, for at least some of the network nodes of the second group, a client viewport having a location and dimensions in the second canvas of the virtual workspace to a local client screen space of the respective network node having dimensions in the physical display space of the respective network node. The operation of implementing the collaborative breakout session can include rendering digital assets having locations in the client viewport to the local client screen space of the respective network node as a function of the mapping. The operation of implementing the collaborative breakout session can further include, upon conclusion of the collaborative breakout session, initiating the collaboration server of the collaboration system to provide the first group of network nodes access to the entire virtual workspace to commence further collaboration on the virtual workspace.

In one embodiment, the collaboration on the first canvas is commenced by the first group by only allowing the network nodes of the first group to access the first canvas of the virtual workspace and preventing the network nodes of the first group to access other portions of the virtual workspace.

The technology disclosed enables creation of multiple breakout groups of participants of a collaboration meeting and assigning these groups to respective virtual breakout rooms with corresponding canvases having locations and dimensions within the virtual workspace. During the breakout sessions, respective groups collaborate within their breakout rooms. At the end of breakout sessions, the virtual breakout rooms are unlocked, and breakout groups can share their work with other participants in the collaboration meeting and get their feedback. We now present some important elements of the collaboration and video conference technology before presenting further details of the technology disclosed.

Workspace

A collaboration session can include access to a data set having a coordinate system establishing a virtual space, termed the "workspace" or "virtual workspace", in which digital assets are assigned coordinates or locations in the virtual space. The workspace can be characterized by a multi-dimensional and in some cases two-dimensional Cartesian plane with essentially unlimited extent in one or more dimensions for example, in such a way that new content can be added to the space, that content can be arranged and rearranged in the space, that a user can navigate from one part of the space to another. The workspace can also be referred to as a "container" in the sense it is a data structure that can contain other data structures or links to other objects or data structures.

Viewport

Display clients at participant client network nodes in the collaboration session can display a portion, or mapped area, of the workspace, where locations on the display are mapped to locations in the workspace. A mapped area, also known as a viewport within the workspace is rendered on a physical screen space (e.g., a local client screen space). Because the entire workspace is addressable in for example Cartesian coordinates, any portion of the workspace that a user may be viewing itself has a location, width, and height in Cartesian space. The concept of a portion of a workspace can be referred to as a "viewport" or "client viewport". The coordinates of the viewport are mapped to the coordinates of the screen space (e.g., the local client screen space) on the display client which can apply appropriate zoom levels based on the relative size of the viewport and the size of the screen space. The coordinates of the viewport can be changed which can change the objects contained within the viewport, and the change would be rendered on the screen space of the display client. Details of the workspace and the viewport are presented in our U.S. Pat. No. 11,126,325, entitled, "Virtual Workspace Including Shared Viewport Markers in a Collaboration System," filed 23 Oct. 2017, which is incorporated by reference as if fully set forth herein.

Spatial Event Map

Using a virtually unlimited workspace introduces a need to track how people and devices interact with the workspace over time. This can be achieved using a "spatial event map". The spatial event map contains information needed to define objects and events in the workspace. It is useful to consider the technology from the point of view of space, events, maps of events in the space, and access to the space by multiple users, including multiple simultaneous users. The spatial event map contains information to define objects and events in a workspace. The spatial event map can include events comprising data specifying virtual coordinates of location within the workspace at which an interaction with the workspace is detected, data specifying a type of interaction, a graphical object associated with the interaction, and a time of the interaction.

The spatial event map contains and/or identifies content in the workspace for a given collaboration session. The spatial event map defines arrangement of digital assets (or objects) on the workspace. The spatial event map contains information needed to define digital assets, their locations, and events in the workspace. The collaboration system maps portions of workspace to a digital display e.g., a touch enabled display using the spatial event map. Further details of the workspace and the spatial event map are presented in U.S. Pat. No. 10,304,037, entitled, "Collaboration System Including a Spatial Event Map," filed Nov. 26, 2013, which is incorporated by reference as if fully set forth herein.

Events

Interactions with the workspace are handled as events. People, via tangible user interface devices, and systems can interact with the workspace. Events have data that can define or point to a target graphical object (digital asset) to be displayed on a physical display, and an action as creation, modification, movement within the workspace and deletion of a target graphical object (digital asset), and metadata associated with them. Metadata can include information such as originator, date, time, location in the workspace, event type, security information, and other metadata.

Tracking events in a workspace enables the system to not only present the events in a workspace in its current state, but to also share the events with multiple users on multiple displays, to share relevant external information that may pertain to the content, and understand how the spatial data evolves over time. Also, the spatial event map can have a reasonable size in terms of the amount of data needed, while also defining an unbounded workspace.

Security Protocol

A security protocol can include three parts: identification, authentication, authorization. Also, an accounting process can be included.

1: Identification—User Accounts

Users of the video conferencing and collaboration system can create an account in the video conferencing and collaboration system to join collaboration sessions, create workspaces, etc. The users can create an account in resource servers (that are a part of, for example, the collaboration server) storing or controlling access to digital assets linked to the collaboration session. An identifier in user accounts tables can be used to identify a user of the video conferencing and collaboration system.

For example, the video conferencing and collaboration system can support "participant accounts" of users of the video conferencing and collaboration system, which rely on authorization protocols to establish participant operative identities (OIDs) for access to virtual workspaces and spatial event maps associated therewith. The participants in the collaboration session can login to the workspace using credentials of their "participant accounts" which can be maintained by a collaboration application using a "user accounts table". These identities are also referred to as internal identities. The technology disclosed also allows users to login to the workspace using external identities provided by external identity providers such as Google™, Okta™, Azure Active Directory, etc. The combination of a participant account and the internal or external identity provider, referred to as a participant operative identity OID, generate a record, such as workspace access tokens, for the display client of the network node of the participant which enables access to the workspace. A participant account may have multiple identity providers available. Thus, to login to a workspace, the participant may select an identity provider. Upon successful login, a workspace access token, such as a Security Assertion Markup Language SAML token is delivered to the display client, linking the participant account identifier, the identity service provider and a workspace domain defined by authorizations associated with the operative identifier, thereby establishing a participant operative identity for utilization of resources within a workspace domain. See, Security Assertion Markup Language, Wikipedia, Mar. 11, 2021.

2: Authentication—Using First and Second Level Authorization Protocols

Authentication of an identified user can include a protocol requiring passwords or other credentials authenticate them. The video conferencing and collaboration system or external identity servers, can use the credentials of respective users to authenticate the identified users.

For example, logging in to the workspace can require establishing a first level authorization protocol. The first level authorization protocol can include use of internal or external identities for authentication during login to identify the user. The collaboration server (or other server that is part of the video conferencing and collaboration system) can include a data structure (such as a table or a data set) listing users (or participant OIDs) authorized to receive a spatial event map (or SEM).

A second level authorization, in some embodiments, can be implemented to require action by a different user and not authorized under the requesting participant OID alone. Thus, a second authorization protocol is required by which an "owner account" of the digital asset is required to login to the resource server and grant suitable permissions for the requesting participant.

3: Authorization

Authorization refers to the actions to be enabled upon identification and authentication of a user. For example, upon access to a digital asset, such as a document, authorization can be limited by the permission, also referred to as authorization level, established for the user. For a document, the permission may have levels such as read only, or read and write, etc. During or prior to a breakout session, authorizations can be set for various digital assets in the virtual workspace based on which users are assigned to various groups that have access to the various canvases. For example, a first group of users of their respective network nodes can be assigned to a first canvas of the virtual workspace and a second group of users of their respective network nodes can be assigned to a second canvas of the virtual workspace. The first group of users (e.g., the network nodes of the first group of users) can be authorized to only be able to view and/or interact with the digital assets having locations and dimensions within the first canvas and the second group of users (e.g., the network nodes of the second group of users) can be authorized to only be able to view and/or interact with the digital assets having locations and dimensions within the second canvas. The authorization (permission levels) can be set for individual users and their respective network nodes based on which groups they are assigned to and they can be set using information included in, for example, the spatial event map or some other secured or non-secured data structure. Further, an individual or entity with a proper (e.g., administrative) authorization level can organize the different groups of users (network nodes) and assign corresponding canvases to the different groups such that the authorization levels for the users who are part of the particular groups only have access to the digital assets that have locations and dimensions within the corresponding canvases. As discussed in more detail below, the authorization levels can be easily changed based on certain events, such as then end of one or more breakout sessions.

Figure 1B:
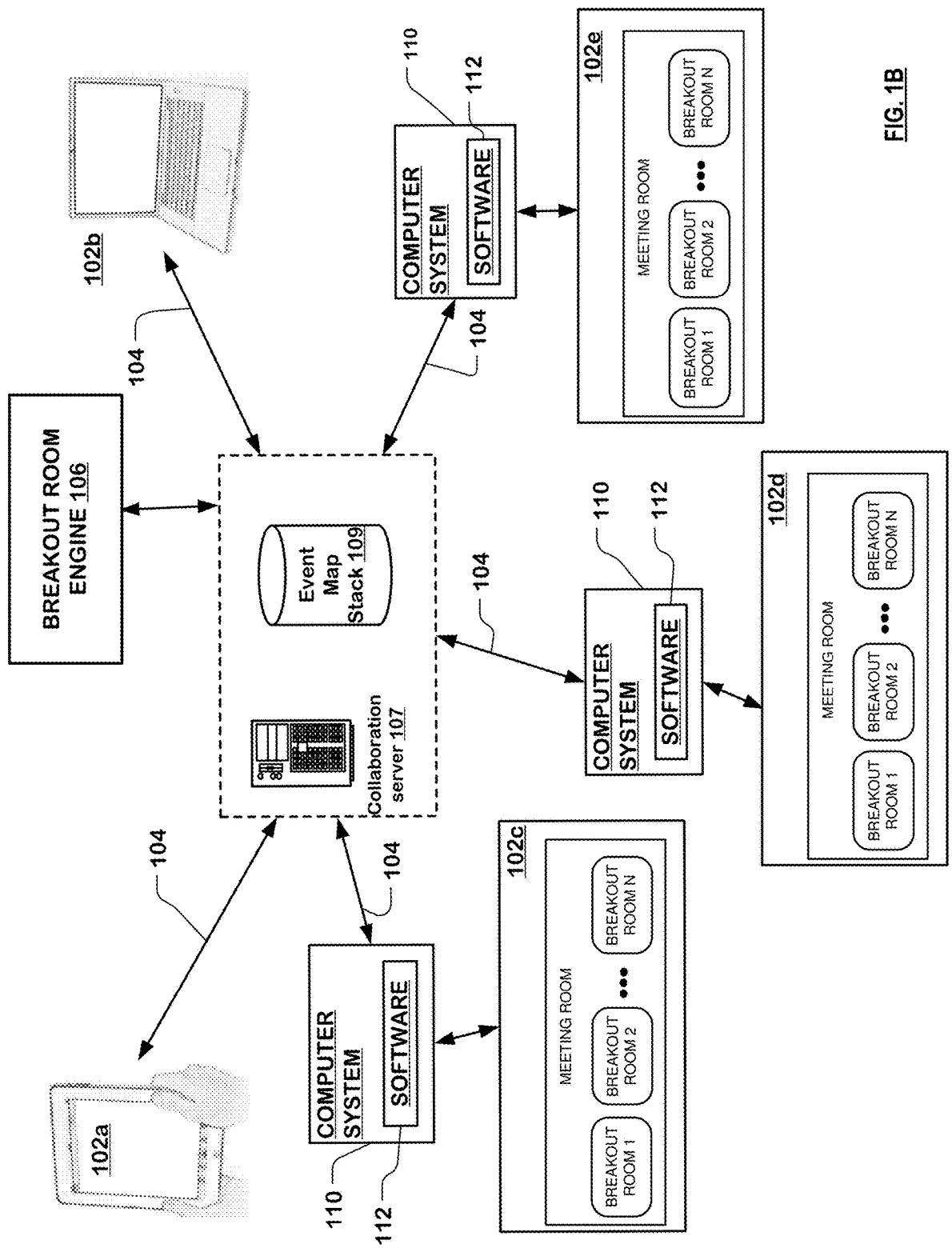

FIG. 1B illustrates the same environment as in FIG. 1A. The application running at the collaboration server 107 can be hosted using Web server software such as Apache or nginx. It can be hosted for example on virtual machines running operating systems such as LINUX. The architecture can involve systems of many computers, each running server applications, as is typical for large-scale cloud-based services. The collaboration server 107 can include or can be in communication with a server and authorization engine that includes communication modules which can be configured for various types of communication channels, including more than one channel for each client (e.g., network node) in a collaboration session. For example, using near-real-time updates across the network, client software 112 can communicate with the communication modules via using a message-based channel, based for example on the Web Socket protocol. For file uploads as well as receiving initial large volume workspace data, the client software 112 can communicate with a server communication module of, for example, the collaboration server 107, via HTTP. The server and authorization engine can run front-end programs written for example in JavaScript and HTML using Node.js, support authentication/authorization based for example on OAuth, and support coordination among multiple distributed clients (e.g., network nodes). The front-end programs can be written using other programming languages and web-application frameworks such as in JavaScript served by Ruby-on-Rails. The server communication module can include a message-based communication protocol stack, such as a Web Socket application, that performs the functions of recording user actions in workspace data (e.g., a spatial event map), and relaying user actions to other clients (e.g., network nodes) as applicable. Parts of the video conferencing and collaboration system can run on a node.JS platform for example, or on other server technologies designed to handle high-load socket applications.

The collaboration server 107 can include or can be in communication with a federated authorization engine can include an OAuth storage database to store access tokens providing access to the digital assets. As mentioned above, the event map stack database 109 includes a workspace data set (e.g., a spatial event map) including events in the collaboration workspace and digital assets, such as graphical objects, distributed at virtual coordinates in the virtual workspace. Examples of digital assets are presented above in the description of FIG. 1A, such as images, music, video, documents, application windows and/or other media. Other types of digital assets, such as graphical objects can also exist on the workspace such as annotations, comments, and text entered by the users.

Various Implementations of Video Conference and Content Collaboration Meetings

We now present various examples of user interface elements that can be used to provide functionality related to starting a video conference and/or a content collaboration meeting, adding one or more workspaces to the video conference and the content collaboration meeting, including screen sharing in the video conference and the collaboration meeting, and creating and implementing virtual breakout groups during the video conference and the content collaboration meeting. The systems described above with reference to FIGS. 1A and 1B can be implemented to establish and conduct the various types of video conference and content collaboration meetings described below.

Initiating an Ad-Hoc Video Conference and/or a Content Collaboration Meeting

FIGS. 2A to 2D present user interface examples of a process flow to start an ad-hoc video conference and/or a content collaboration meeting.

Figure 2A:
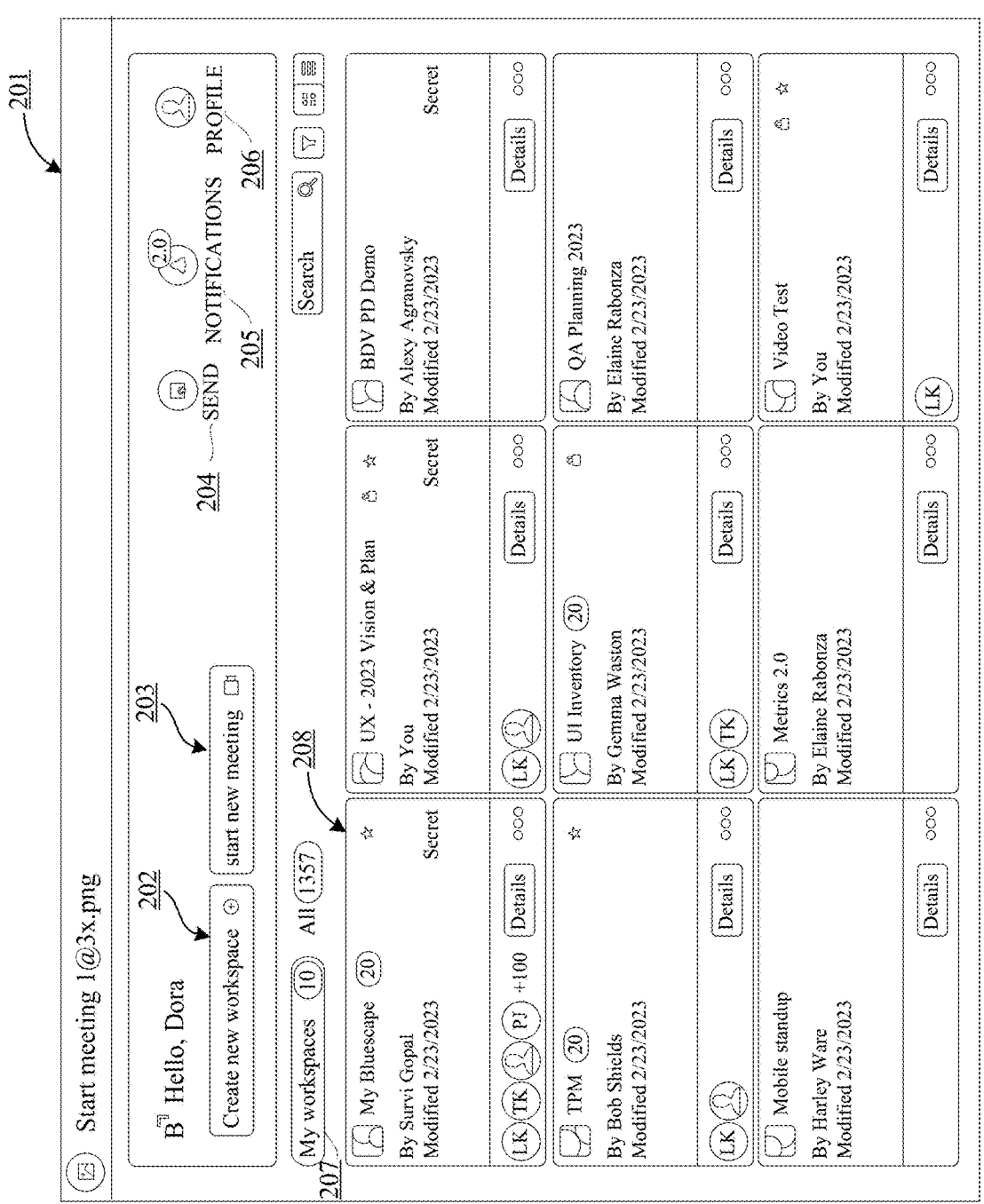
FIGS. 2A, 2B, 2C and 2D present user interface examples of a process flow to start an ad-hoc collaboration meeting.

Specifically, FIG. 2A presents an example user interface 201 that includes user interface elements related to content collaboration, video conferencing and breakout room technology disclosed herein. The user interface element 202 (labeled as "create new workspace") can be selected to create a new workspace for use in a content collaboration session or a video conference. The user interface element 203 (labeled as "start new meeting") can be selected by the user to start a new video conference or a new content collaboration session. The video conference and content collaboration session initiated in such manner can be considered an ad-hoc meeting. An ad-hoc meeting can be started at any time without needing to send prior invitations to participants. The user interface element 204 (labeled as "send") can be used to send a collaboration workspace, a message or an invitation to another user to join a collaboration session. The user interface element 205 (labeled as "notifications") can be used to view notifications received from other users (or participants) or notifications received from the collaboration server. The user interface element 206 (labeled as "profile") can be selected to view and edit the user profile of the user. The user interface element 207 (labeled as "my workspaces") can be selected to view workspaces that the user has created. The selection of the user interface element 207 can also list workspaces that the user did not create but was invited to participate during video conferences or content collaboration sessions. The workspaces are listed in the user interface. For example, a workspace 208 is listed in the top-left corner. The title of the workspace is "my bluescape". It includes the name of the participant who created the workspace "Survi Gopal". The date on which the workspace was last modified is also presented in the user interface element 208 representing the workspace. At the bottom of the user interface element 208, a list of users who participated in the collaboration session is also presented. The list of users can include the initials of users' names or other graphical icons representing the users. When the number of users participating in a video conference or a content collaboration session is large, only a selected number of users can be presented in the user interface element 208. The user interface element can also present other relevant information related to the workspace such as whether it is "secret". A workspace designated as "secret" may not be available for view by participants outside the organization that owns the content of the collaboration meeting. In some cases, users with certain level of security clearance can participate in video collaboration conference or content collaboration session that is designated as "secret". It is understood that the technology disclosed can use multiple levels of security settings for collaboration meetings. The user can select the user interface element 208 to open the workspace and view the content, details list of participants and other information related to the workspace.

Figure 2B:
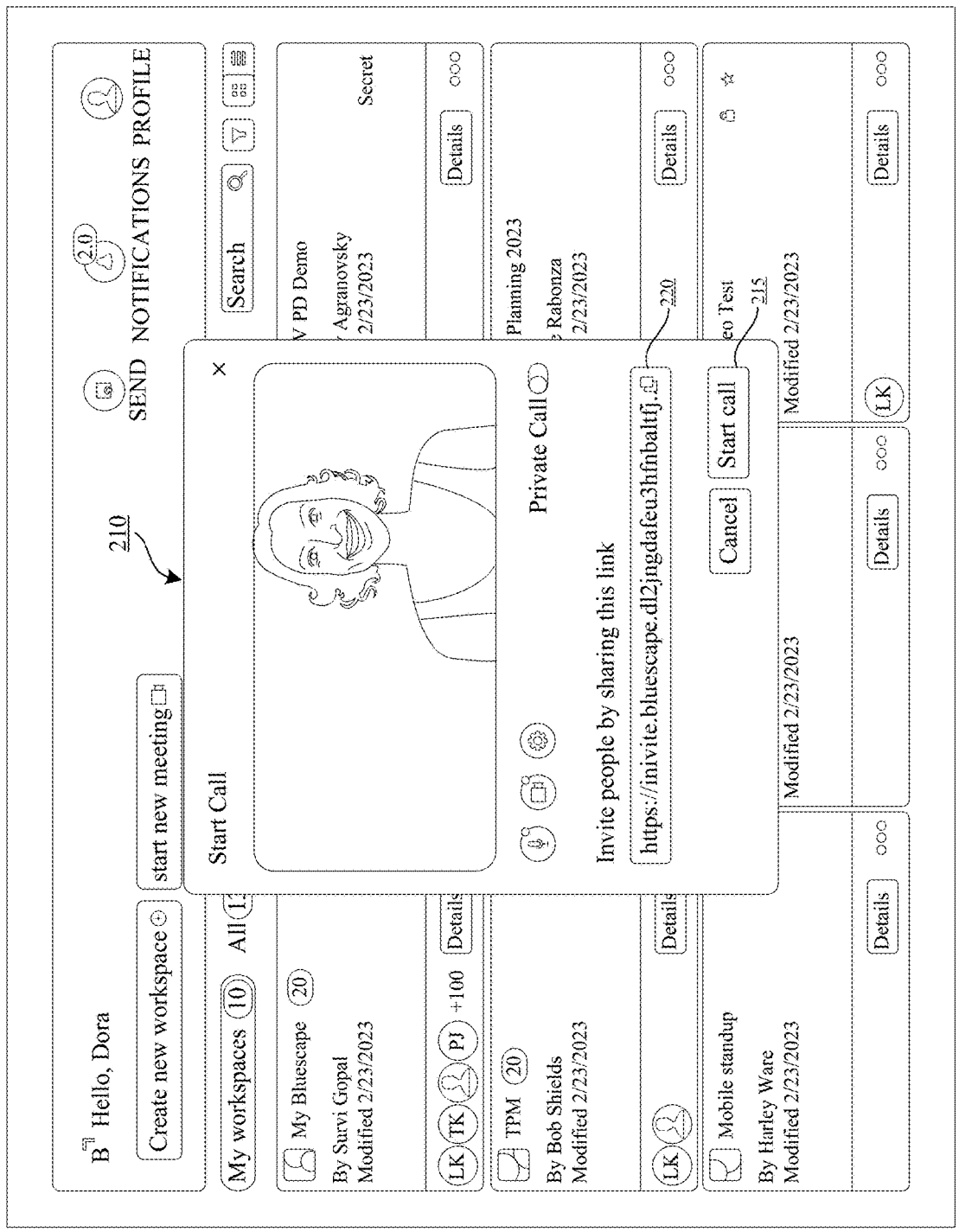

FIG. 2B presents an example user interface 210 that can be used to start the video conference and/or the content collaboration meeting. The meeting owner (e.g., the user who is initiating the video conference and content collaboration meeting) can select button 215 to start the video conference and content collaboration meeting (i.e., "start the call"). The user interface element 210 can include a meeting link 220 that can be sent (via email or other communication medium) to other participants who can then select the link to join the collaboration meeting. Selecting the link 220 can open an email application from where the meeting owner can send the meeting link 220 to the participants. The meeting owner can also copy the meeting link 220 and send it to one or participants by copying the link in an already composed email message or other communication medium.

In other implementations, the system includes the logic to allow the meeting owner to send the meeting link to participants via short message service (SMS) or via other messaging or chat applications.

Figure 2C:
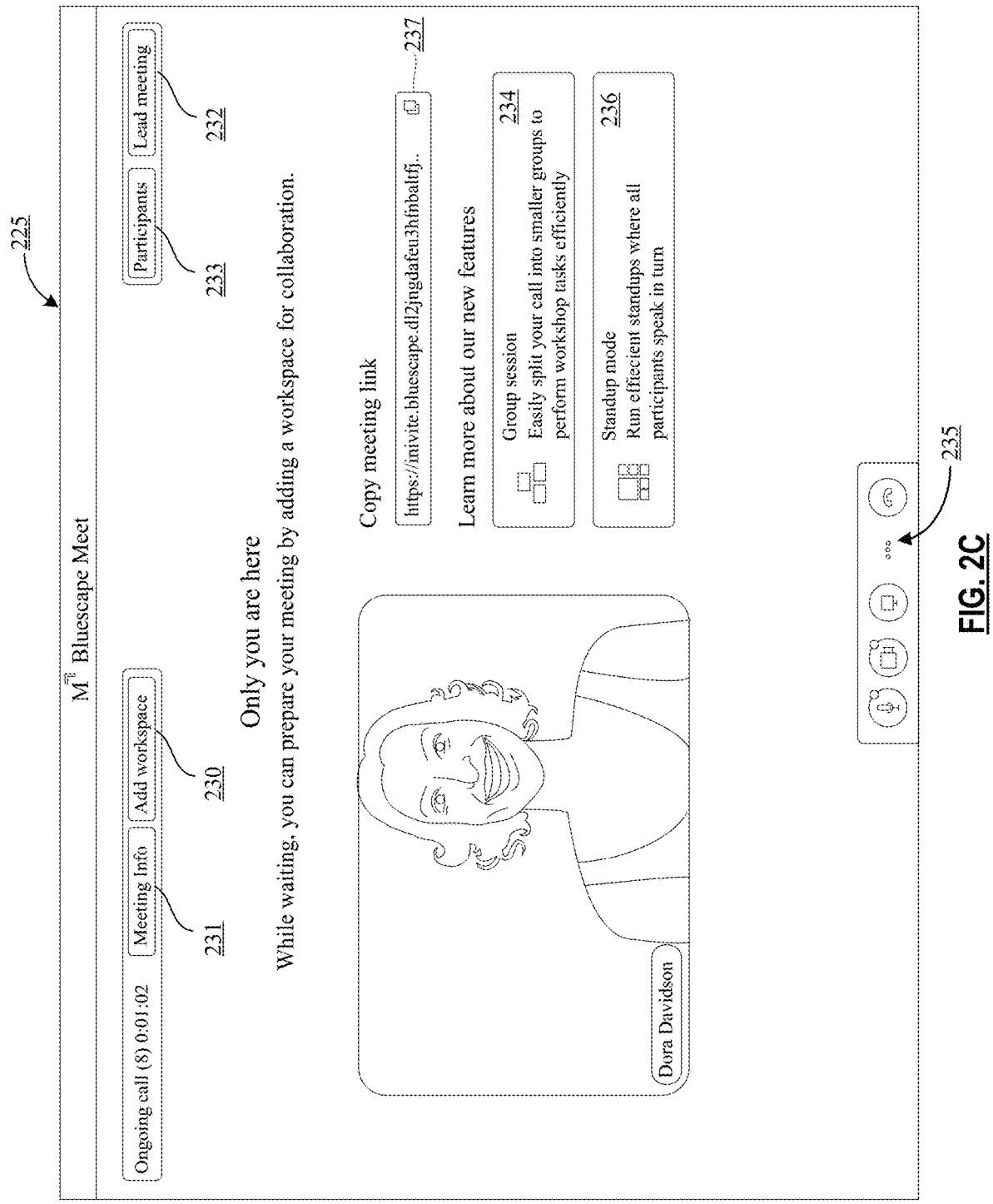

FIG. 2C illustrates an example user interface 225 to conduct different types of video conferences and content collaboration sessions using the technology disclosed. The user interface 225 includes a user interface element 230 that allows a user to add a workspace to the video conference and/or the content collaboration session. A user interface element 231 can be selected to view meeting information such as title, meeting owner name, team/department/organization name, etc. The user can select a user interface element 232 to lead the video conference or the content collaboration session. When the "lead meeting" user interface element is selected, the user who selects this feature becomes the leader and other participants follow the leader to view the content on workspace as viewed by the leader. Details of follower-leader (also referred to as follow-me) technology are presented in the U.S. patent application Ser. No. 15/147,576, entitled, "Virtual Workspace Viewport Following in Collaboration Systems" filed 5, May 2016, now issued as U.S. Pat. No. 10,802,783, which is fully incorporated into this application by reference. A user interface element 233 can be selected to view the details of participants in the video conference or the content collaboration session. A separate user interface can display the names, titles, team, department, organization and other information related to each participant in the collaboration meeting. In some implementations, the technology disclosed can present further details per participant such as a list of digital assets contributed by a participant, the amount of time a participant has presented and/or lead a collaboration meeting, the amount of time a participant has contributed verbally in the collaboration meeting, the number of edits performed by a participant on content such as digital assets, notes, etc. in the collaboration meeting. A user interface element 234 can be selected by the user to initiate a breakout group session in which participants of the video conference or the content collaboration session can be divided into a plurality of groups for working on respective problems etc. Further details of setting up and conducting breakout sessions (or group sessions) is presented below. A user interface element 236 can be selected by a user to conduct a video conference or content collaboration session in a so-called "standup" mode. In the standup mode, all participants collaborate in the same video conference or the content collaboration session. The standup mode enables all participants to contribute to the discussion by participating one-by-one in the meeting. The technology disclosed can automatically arrange the participants in a sequence for one-by-one participation and provide equal time to each participant for providing comments during the standup meeting. A user interface element 235 provides a group of buttons for various audio, video, and content sharing options. A user can select an appropriate user interface element or button to mute/unmute audio, start a video camera or share content from desktop. The user interface element 235 also provides a button to end the collaboration meeting. User interface element 237 allows a user to copy a meeting link that can be send to potential participants of a collaboration.

Figure 2D:
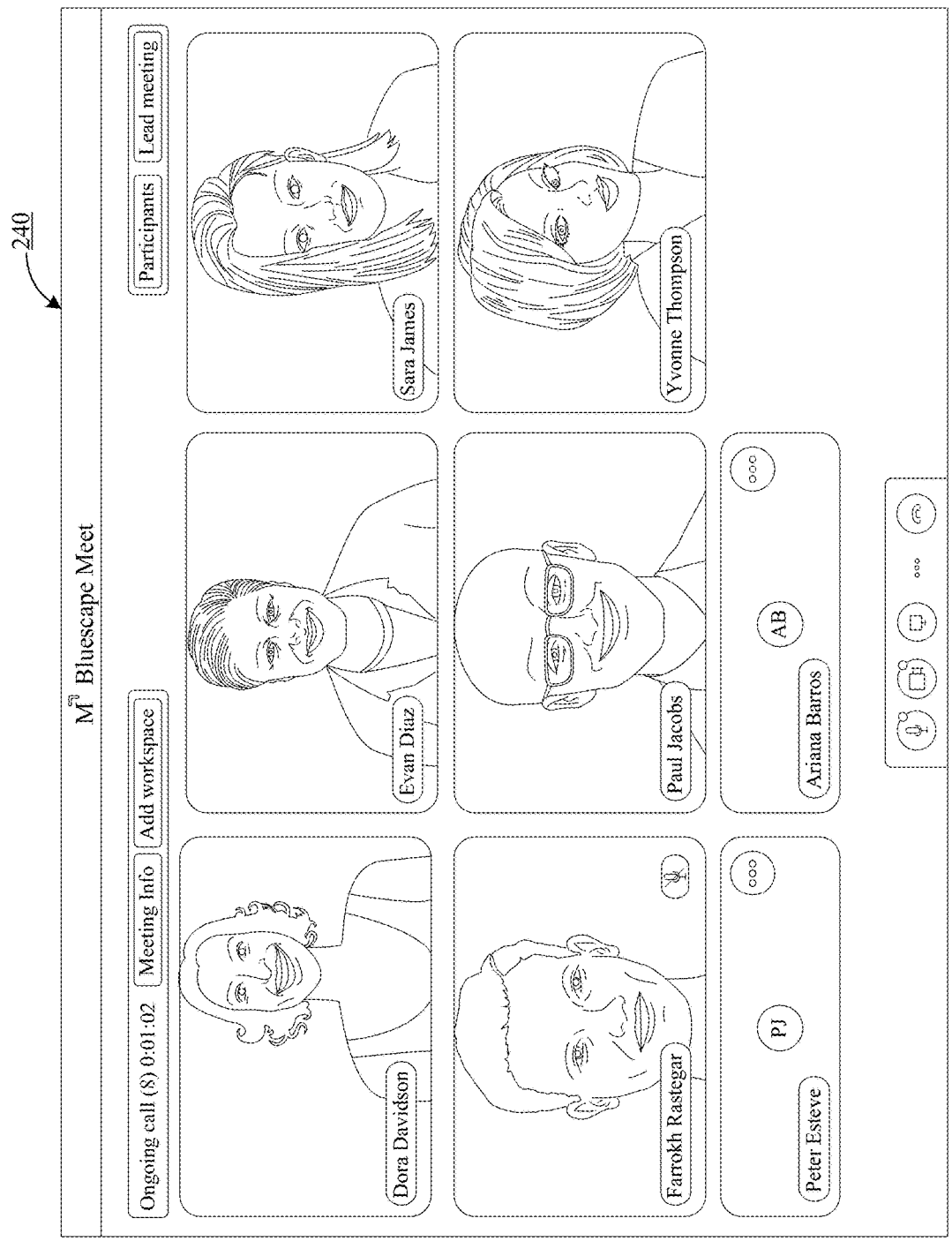

FIG. 2D presents a user interface 240 that shows participants in the ad-hoc collaboration meeting.

Joining a Video Conference and/or a Content Collaboration Meeting Using a Link

FIGS. 3A to 3D present user interface examples of a process flow to join a video conference and/or a content collaboration meeting using a meeting link. The meeting link can be sent by the meeting owner or the person who sets up the meeting.

Figure 3A:
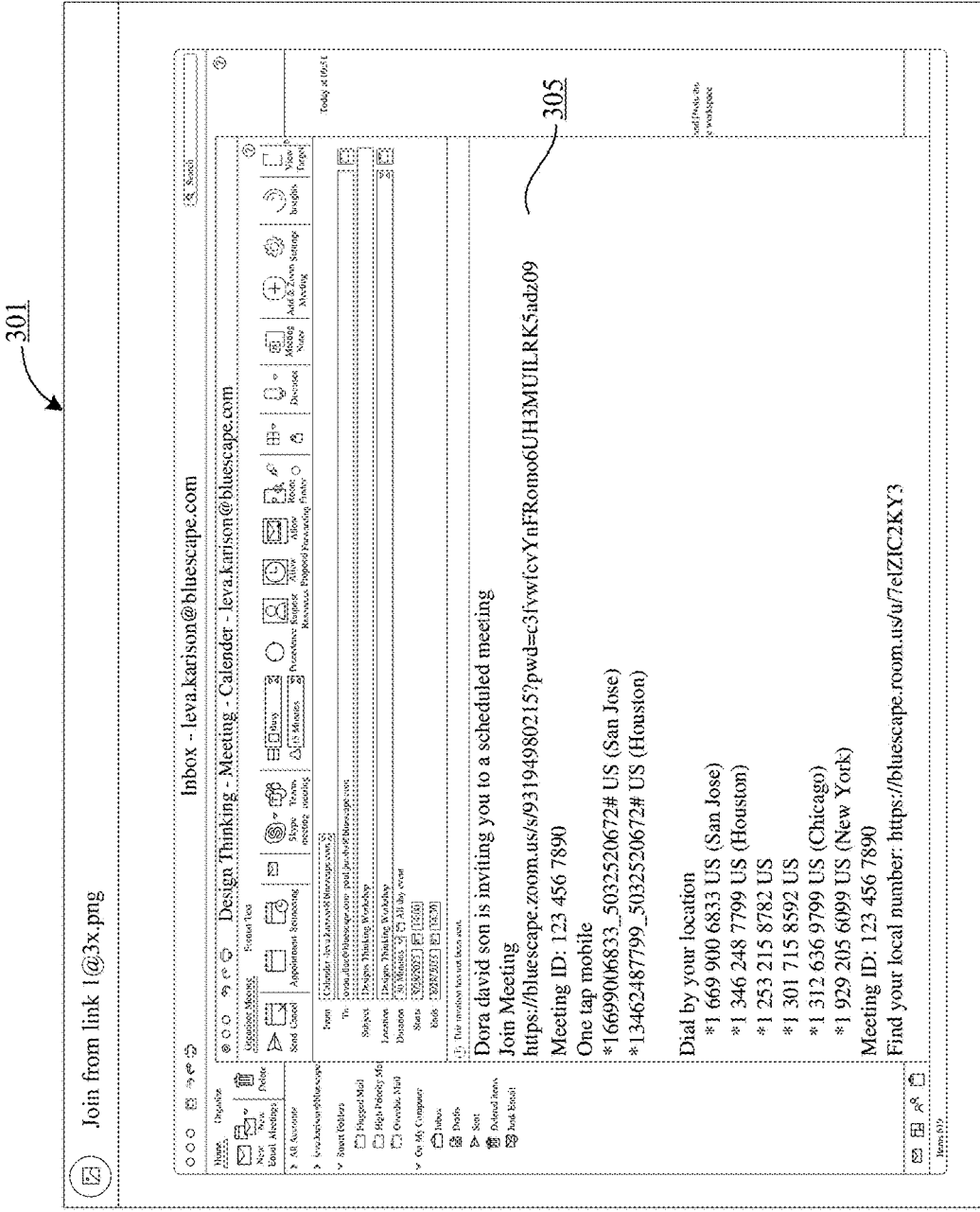
FIGS. 3A, 3B, 3C, and 3D present user interface examples of a process flow to join a collaboration meeting using a link.

FIG. 3A shows a meeting link 305 in a user interface 301 that can be sent to meeting participants in an email message.

Figure 3B:
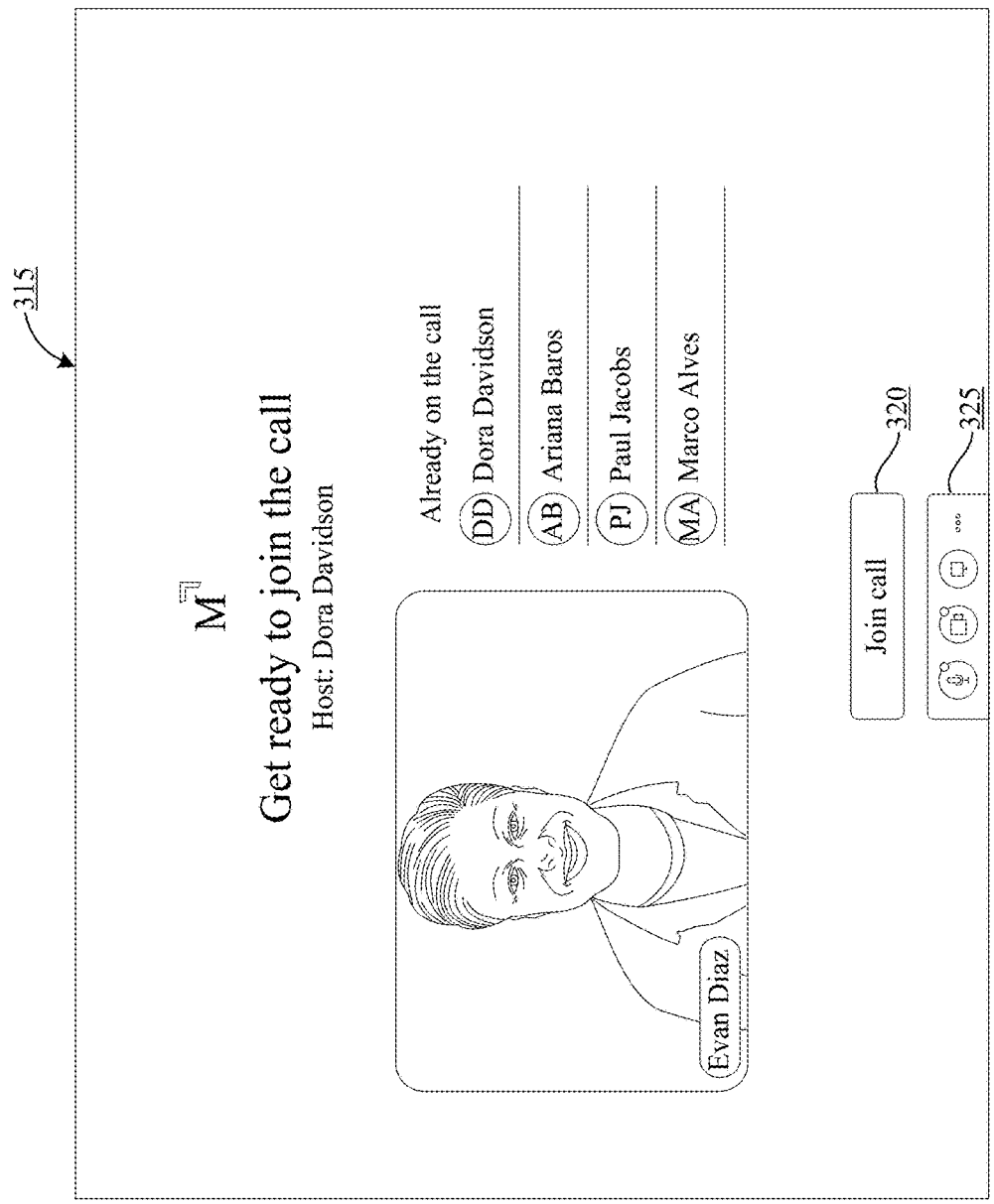

FIG. 3B shows a user interface 315 that is presented to the participant upon clicking the link 305 received in an email message or via other communication applications such as a chat or messaging application or via an SMS message on a mobile device. The user interface 315 shows the participants that are already in the meeting. The user interface 315 includes a button 320 that can be selected to join the call. The user interface 315 also includes audio, video and whiteboarding controls 325.

Figure 3C:
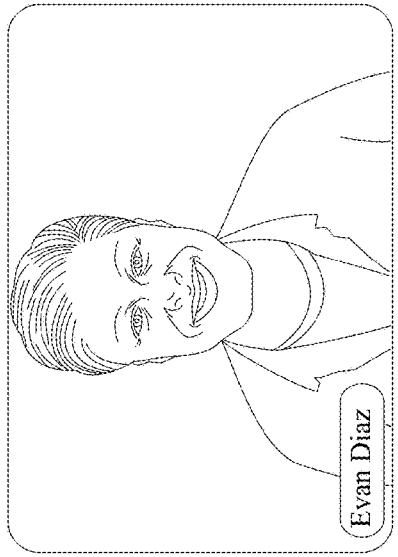

FIG. 3C presents an example user interface 330 for a lobby which is presented to the user when the meeting host or the meeting owner has not yet joined the meeting. The user interface 330 includes the meeting controls 335 that can include user interface elements or buttons for audio, video, whiteboarding and end call buttons.

Figure 3D:
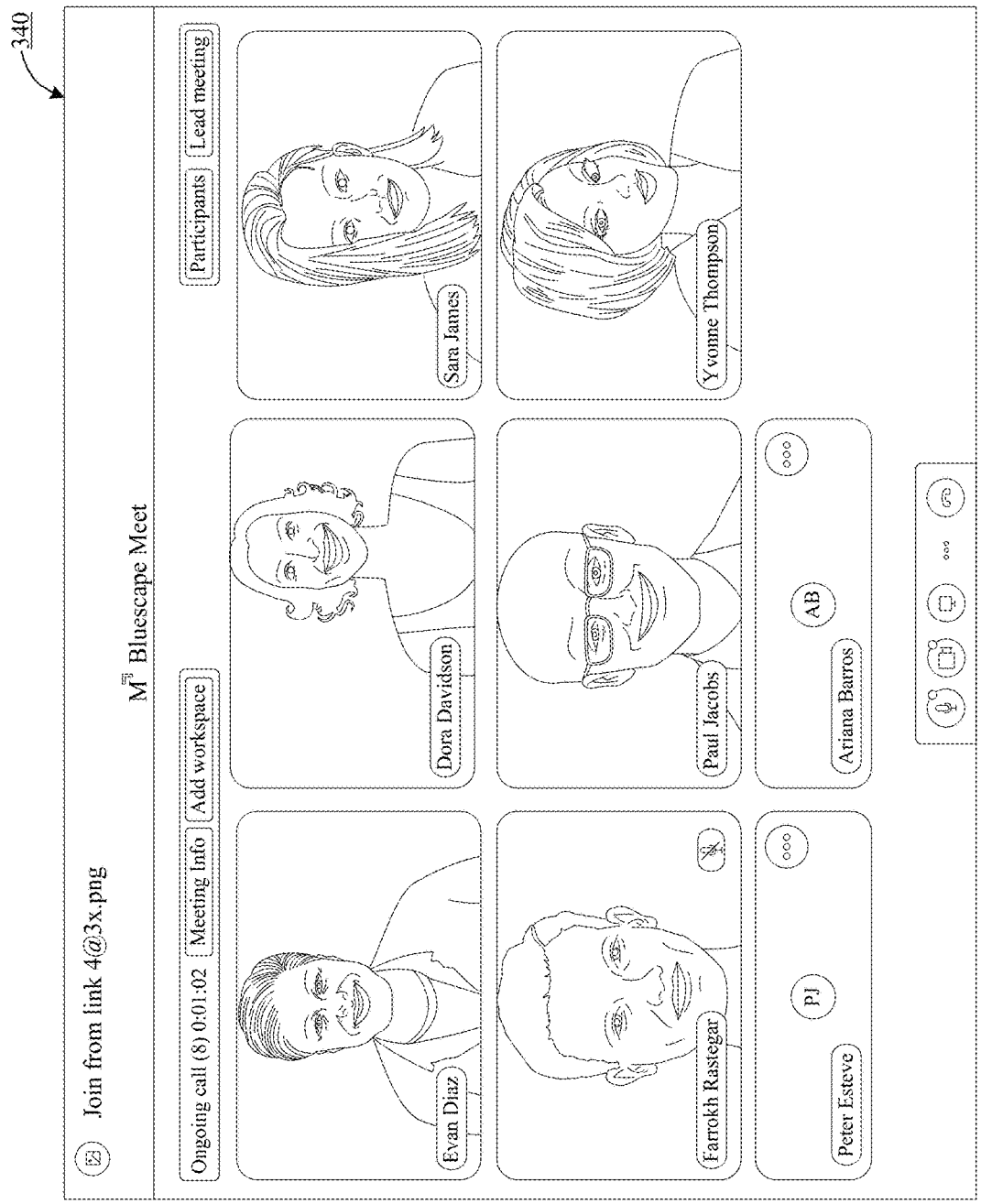

FIG. 3D illustrates a user interface 340 that shows that participants in the meeting who have joined the collaboration using the meeting invitation links received by them respectively. A participant of the meeting who has required authorization or permissions can configure the membership of virtual breakout groups granting authorization to view and/or edit canvases (or containers) for the virtual breakout groups. In one implementation, the meeting owner or the meeting host can create breakout groups and edit membership of breakout groups. The meeting owner or meeting host can also edit canvases for the breakout groups by including digital assets or by removing digital assets from the canvases of respective breakout meeting rooms.

Adding a Workspace to a Video Conference and/or a Content Collaboration Meeting

FIGS. 4A to 4G present user interface examples of a process flow to add workspace to a video conference and a content collaboration meeting.

Figure 4A:
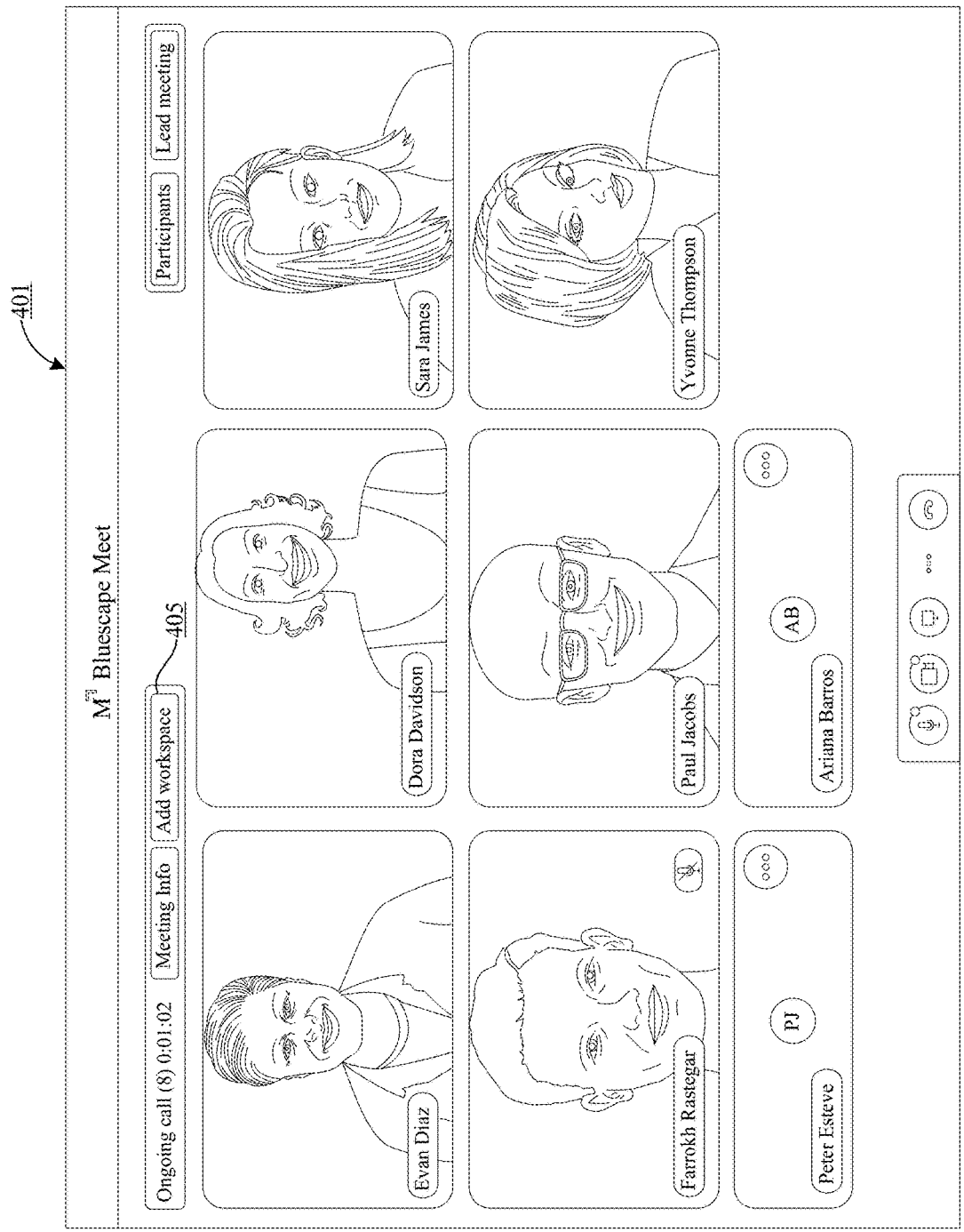
Figure 4C:
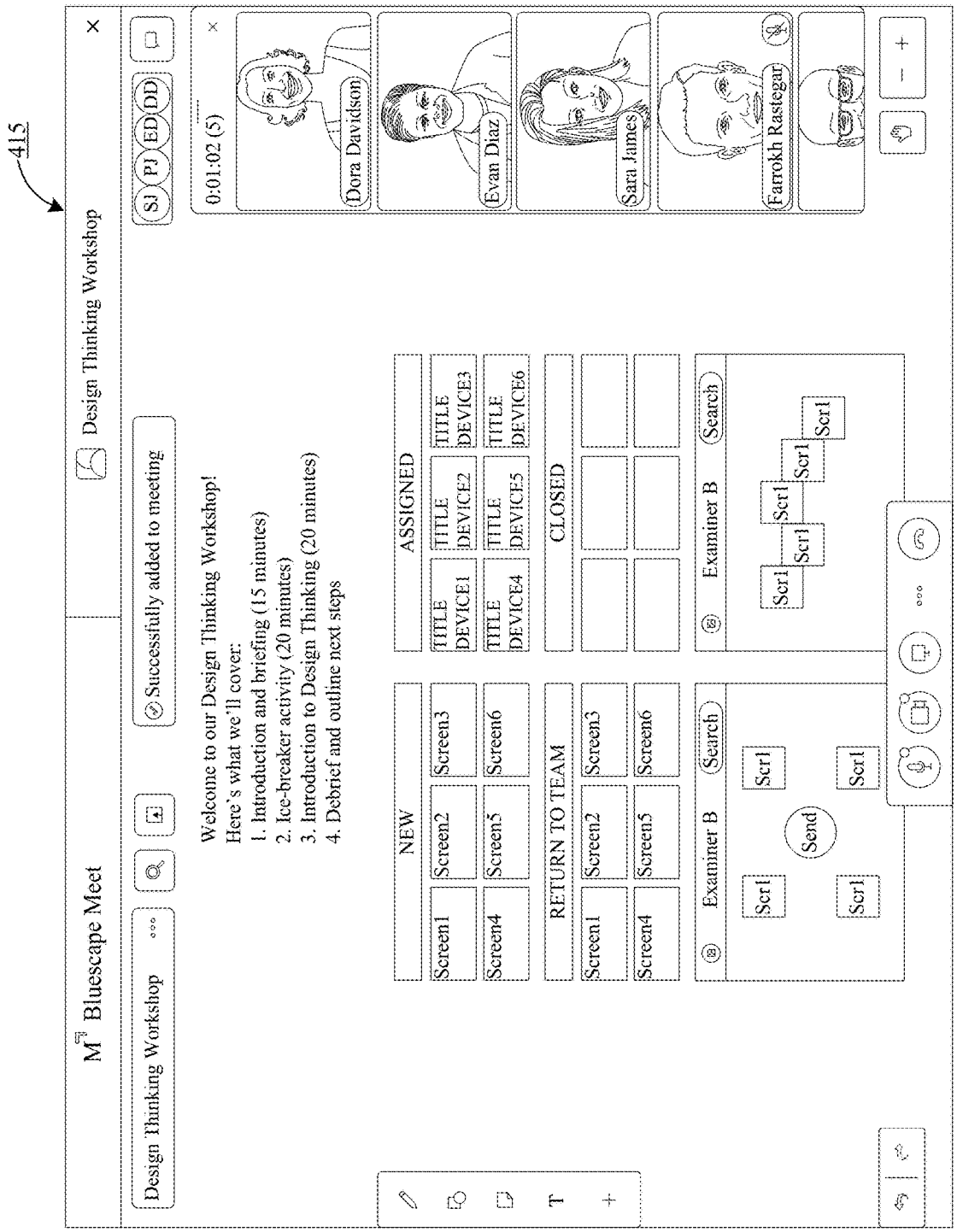

In FIG. 4A, which is similar to FIG. 3D, except that the user interacts with a user interface element 405 of a user interface 401 to include a workspace to the video conference and content collaboration meeting. When a participant selects the user interface element 405, the system presents a user interface 410 (shown in FIG. 4B) on the display of the client-side node (network node). In one implementation, only the meeting owner or the participant(s) who setup the meeting is allowed to add the workspace to the meeting. In another implementation, any participant in the video conference and content collaboration can initiate the workflow presented in FIGS. 4A to 4E to include a workspace in the video conference and content collaboration meeting. The meeting participant can select any one of existing workspaces (or canvases) listed in user interface 410 or create a new workspace (or canvas) and add the selected existing workspace or canvas or the new workspace or canvas to the video conference and content collaboration meeting. The meeting owner or participant(s) who setup the video conference and content collaboration meeting from their network node can allow other participants (i.e., users of other network nodes) to participate in the video conference aspect as well as allow the other participants to view and interact with the selected existing workspace or canvas or the new workspace or canvas FIG. 4C presents an example user interface 415 displayed on the client-side node (network node) of the participant of the video conference and the content collaboration meeting when the workspace is added to the video conference and content collaboration meeting. The digital assets that have locations in the workspace can be made visible to the participants as shown in the user interface 415. As discussed above, each participant can have a viewport that identifies a location and dimensions within the workspace such that digital assets that have a location within the viewport can be displayed in the local client screen space of the network node of the participant.

Figure 4D:
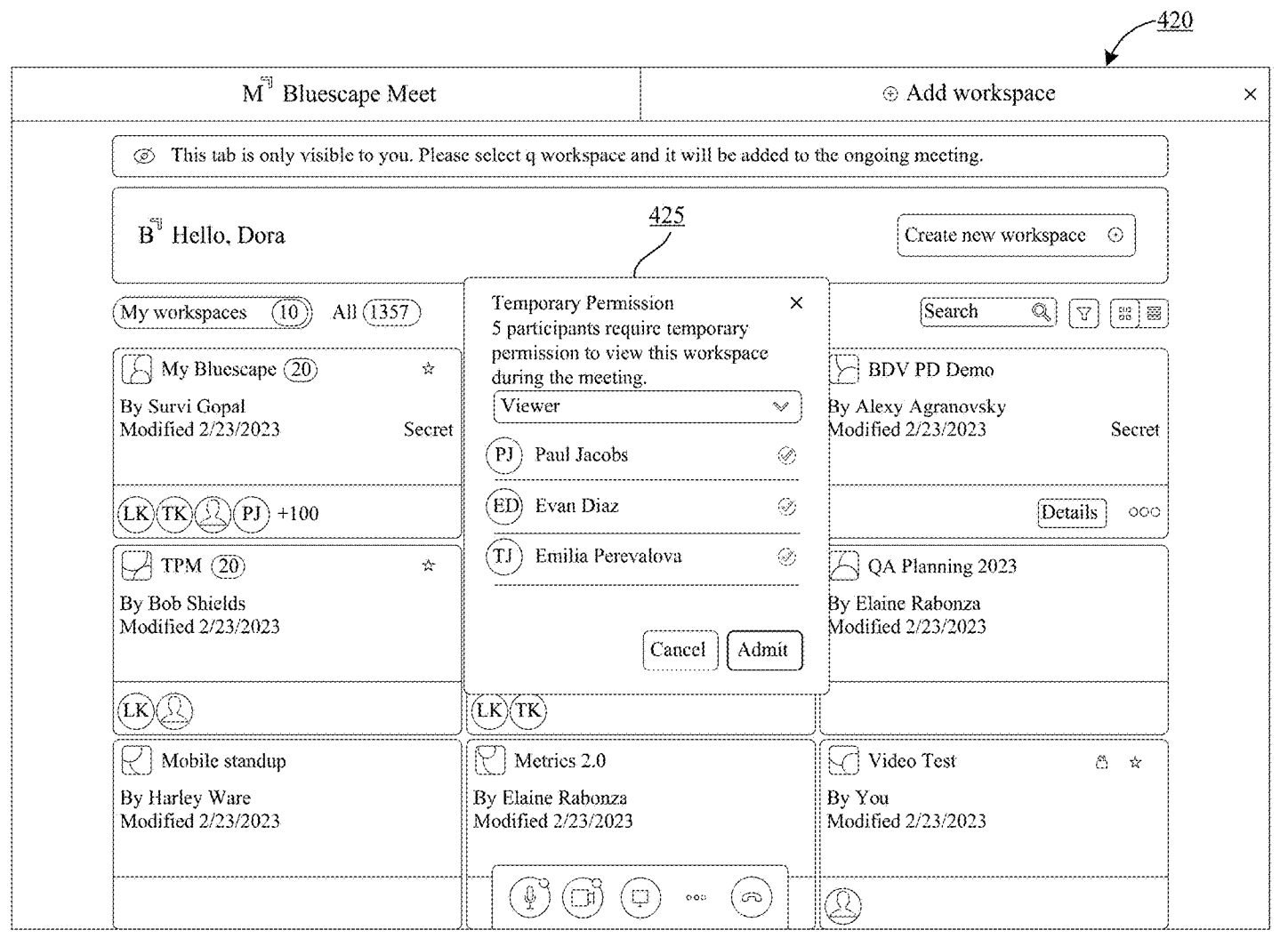

FIG. 4D presents a user interface example 420 which can be presented to the meeting owner or the meeting participant who has added the workspace in the video conference and the content collaboration meeting. The user interface 420 may only be visible to the meeting owner or participant who has added the workspace in the collaboration meeting. The user interface presents a dialog box 425 that provides the list of meeting participants who are requesting permission to access the workspace or who are available to gain access to the workspace. The meeting owner, meeting host or the participant who is the owner of the workspace (or who has selected the workspace to be part of the video conference and the content collaboration meeting) when presented with the dialog box 425 can select participants using check-boxes or other controls such as radio buttons to provide permission to requesting and/or available participants. The meeting owner can then press the admit button to provide access to selected participants.

Figure 4E:
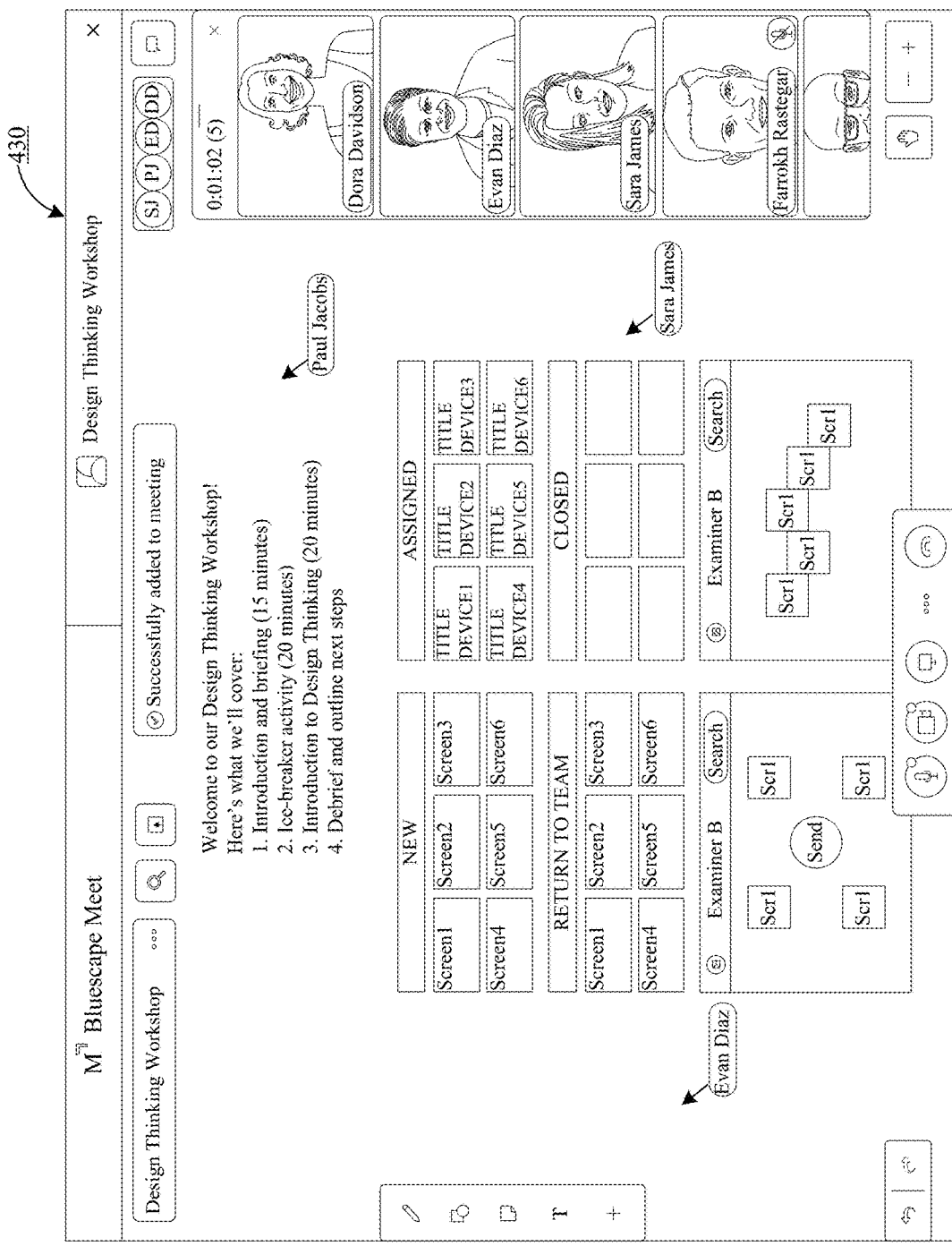

FIG. 4E shows an example user interface 430 in which multiple participants are collaborating in a meeting. The participants can edit or manipulate the digital assets in the workspace simultaneously as indicated by multiple pointers on the workspace with respective participants' names or identifiers. This collaboration on the single workspace between the participants is different than simply sharing the screen of a particular participant. Each of the participants who is collaborating on the single workspace can interact with the digital assets within the workspace. This allows all users, who have been granted access, to actively edit, create, manipulate, annotate, delete, etc. digital assets within the workspace. In contrast, merely sharing a screen only allows passive viewing by all other participants.

Figure 4F:
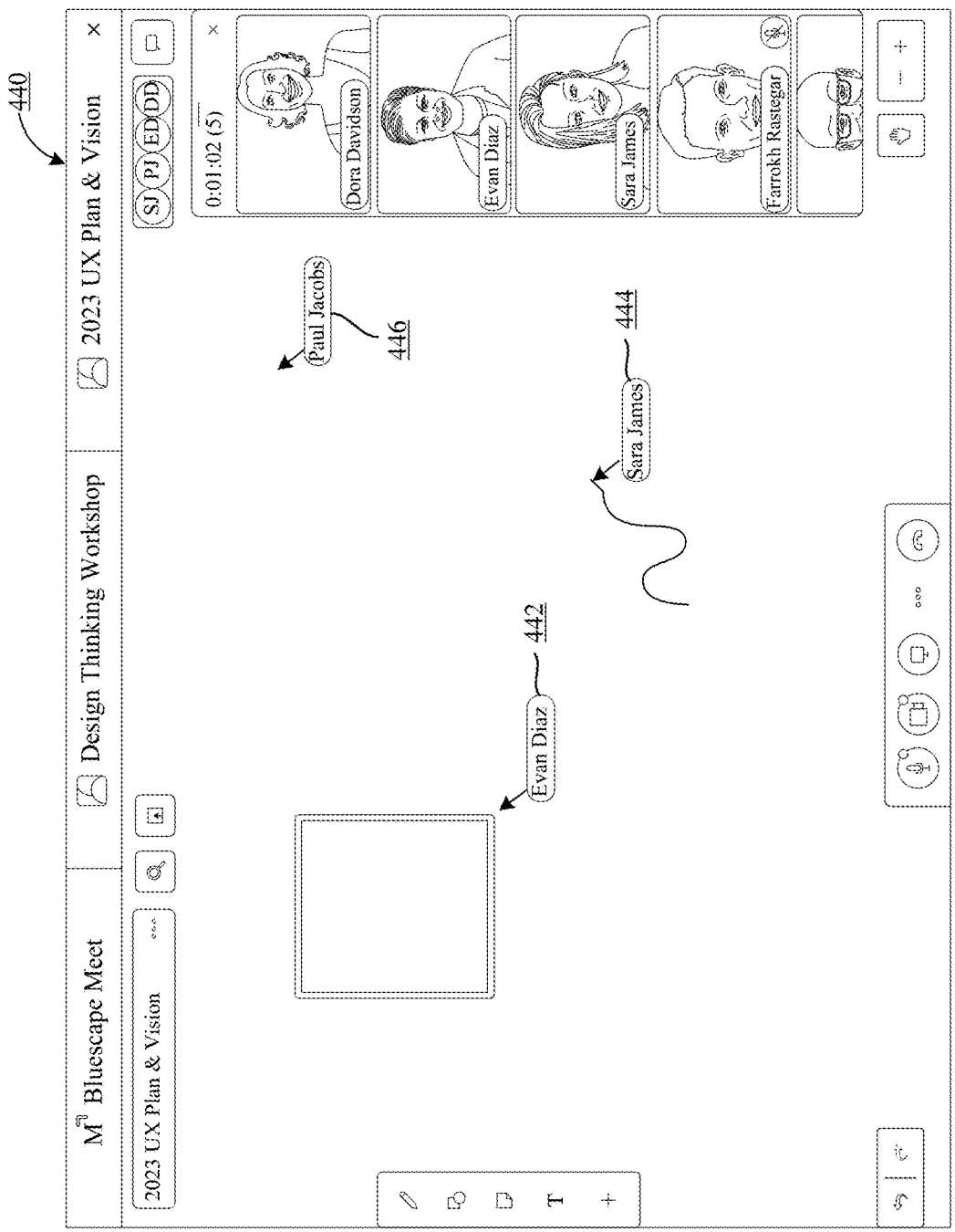

FIG. 4F presents an example user interface 440 which shows a different workspace (i.e., "2021 UX Plan & Vision") added to the video conference and the content collaboration meeting. The workspace includes a whiteboard which can be used for collaboration amongst the participants. The participants can simultaneously draw on the whiteboard as indicated by the presence of multiple pointers with respective names or identifiers of the participants. The pointers can also be distinguished by different colors assigned to participants. In FIG. 4F, three participants 442, 444, and 446 are simultaneously interacting with content or adding content to the whiteboard. This is different from simply one participant sharing their screen with the other participants.

Including Screen Sharing in a Video Conference and a Content Collaboration Meeting FIGS. 5A to 5E present user interface examples of a process flow to include screen sharing in a video conference and a content collaboration meeting.

Figure 5A:
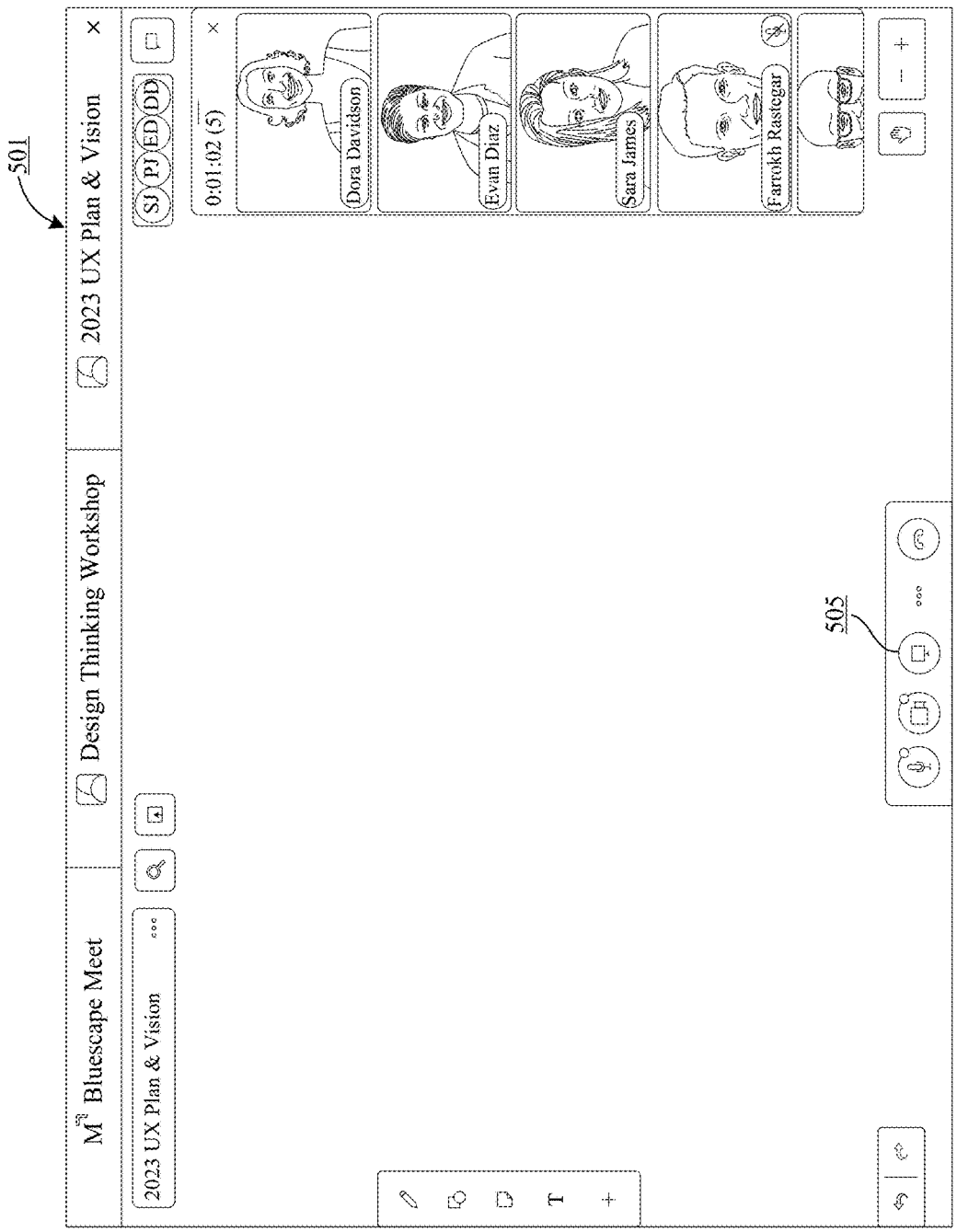
FIGS. 5A, 5B, 5C, and 5D present user interface examples of a process flow to include screen sharing in a collaboration meeting.

FIG. 5A presents an example user interface 501 that includes a user interface element 505 for screen sharing.

Figure 5B:
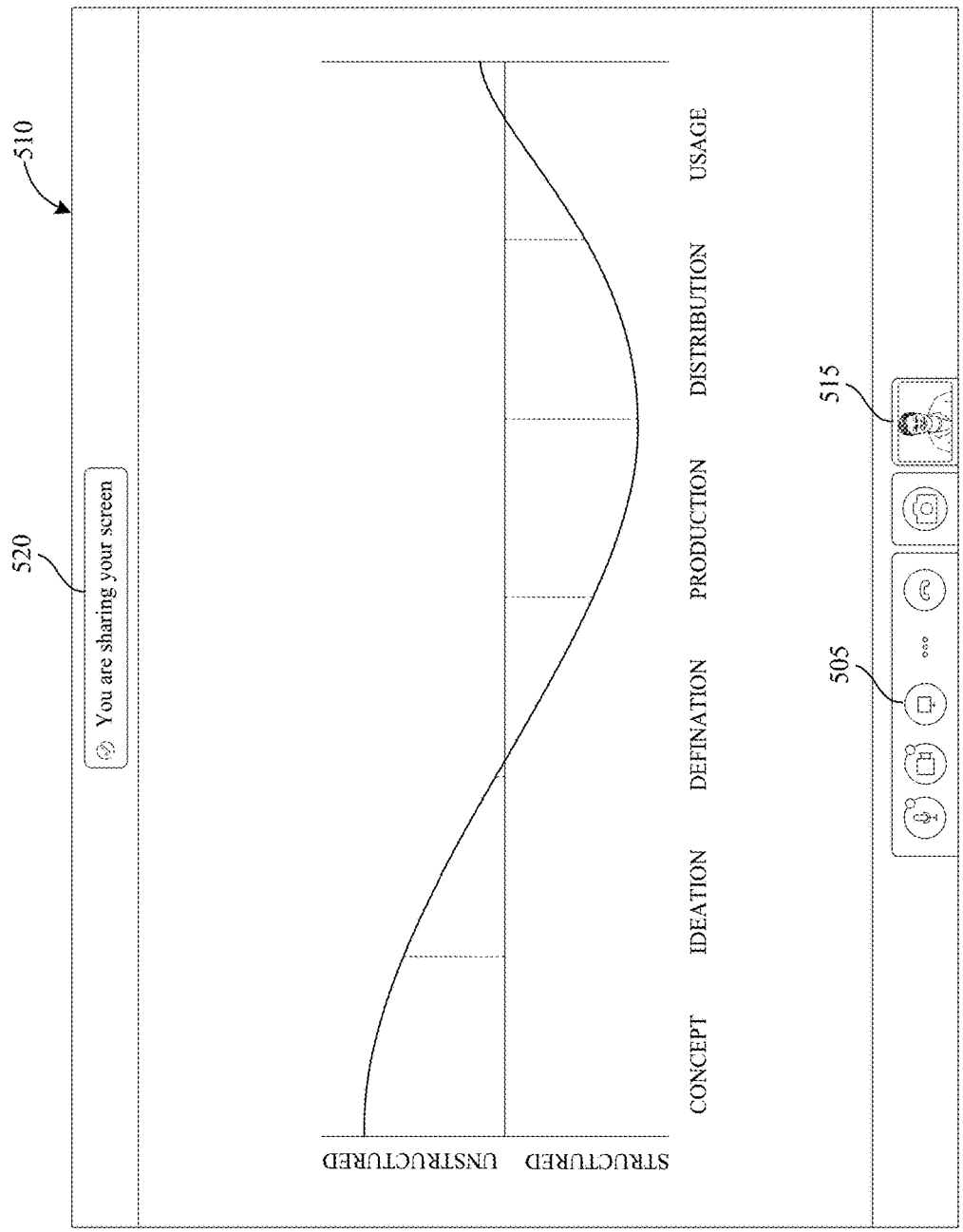

FIG. 5B presents an example user interface 510 that shows screen sharing during a video conference and a content collaboration meeting. User interface element 505 has changed color to indicate that screen sharing mode is active. An image 515 of the participant sharing their screen is also shown on the user interface 510. A message 520 can be displayed on the user interface to indicate to the participant that they are sharing their screen with other participants of the video conference and a content collaboration meeting.

Figure 5C:
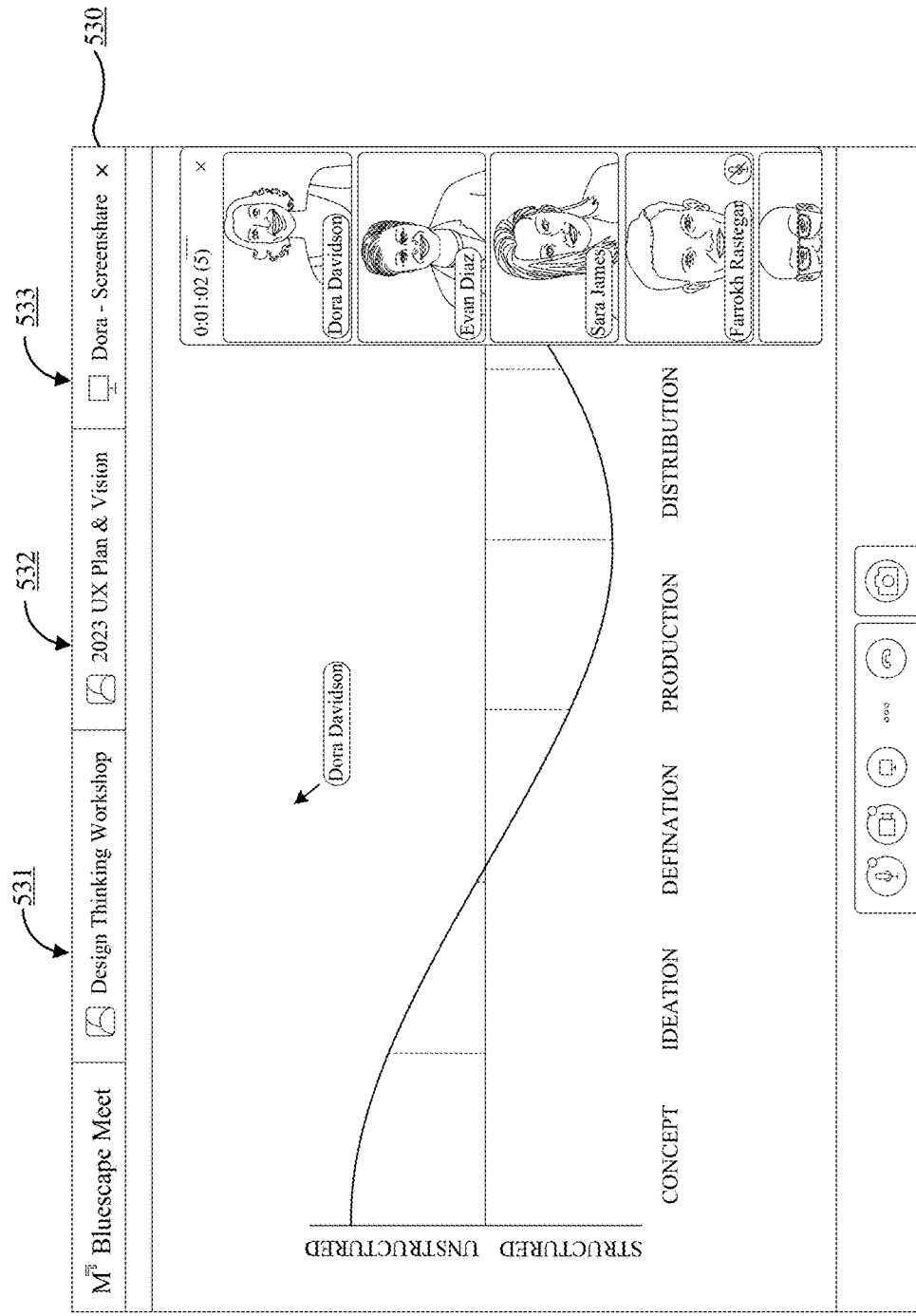

FIG. 5C presents an example user interface 530 that shows screen sharing in a video conference and a content collaboration meeting. The user interface 530 also includes images, or live videos of participants. Further, FIG. 5C illustrates that participants can select different tabs to allow them to switch between the "Design Thinking Workshop" workspace 531, the "2021 UX Plan & Vision" workspace 532 and the "Dora—Screenshare" 533 during the video conference and a content collaboration meeting.

Figure 5D:
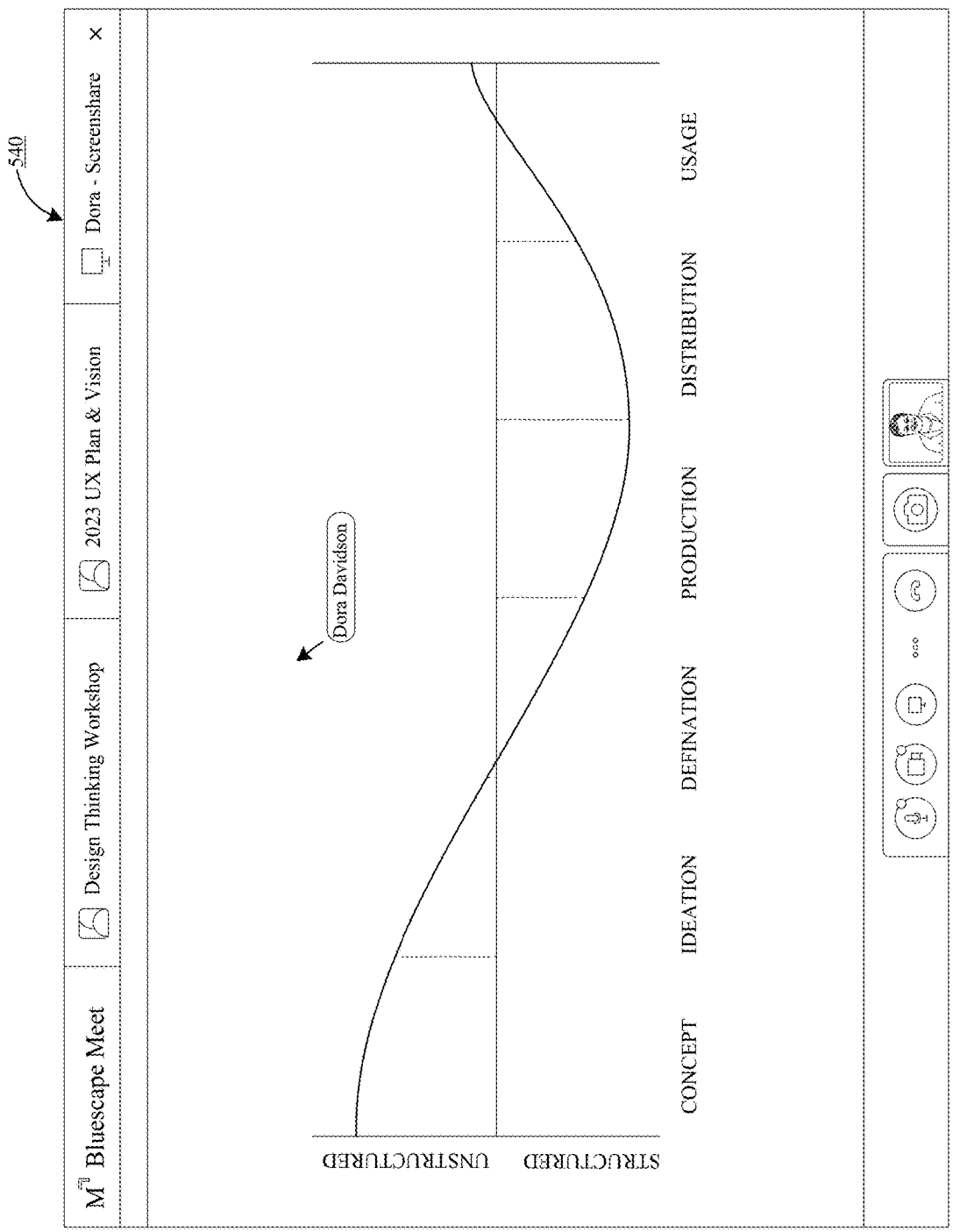

FIG. 5D shows an example user interface 540 with another document displayed in the screen sharing mode of the collaboration meeting.

Leading a Video Conference and a Content Collaboration Meeting

Figure 6A:
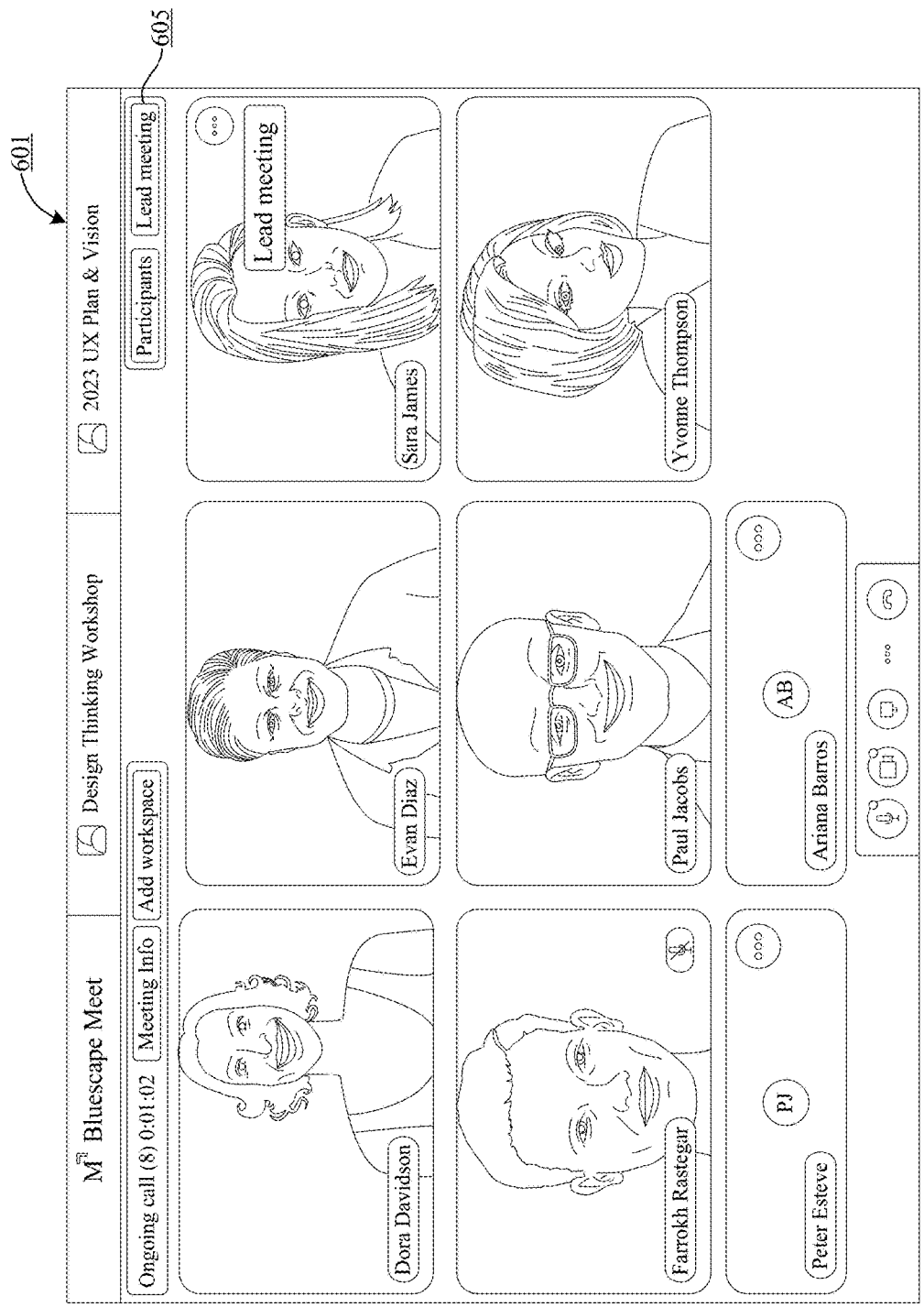
FIGS. 6A, 6B, and 6C present user interface examples of a process flow to lead a collaboration meeting.
Figure 6B:
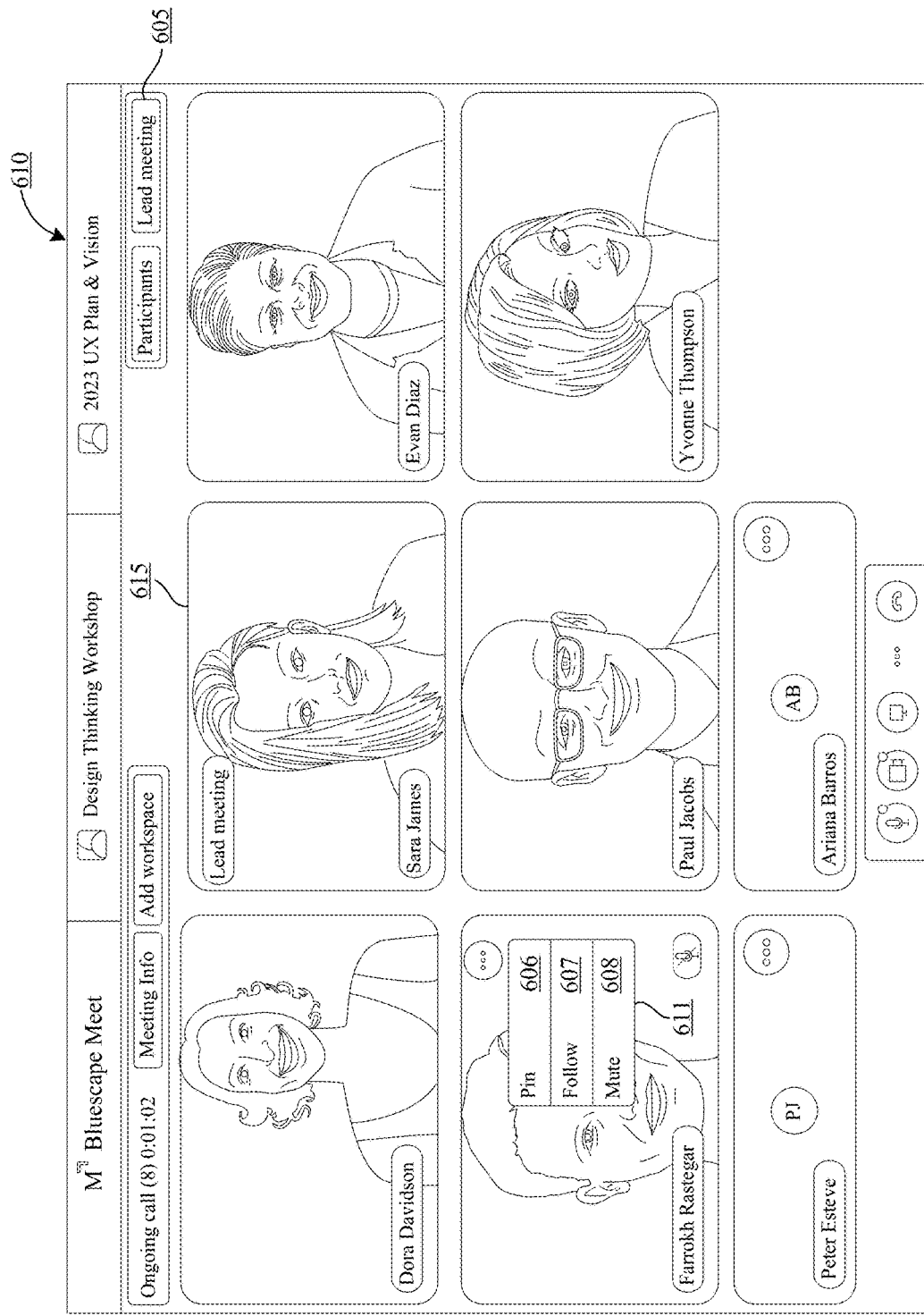
Figure 6C:
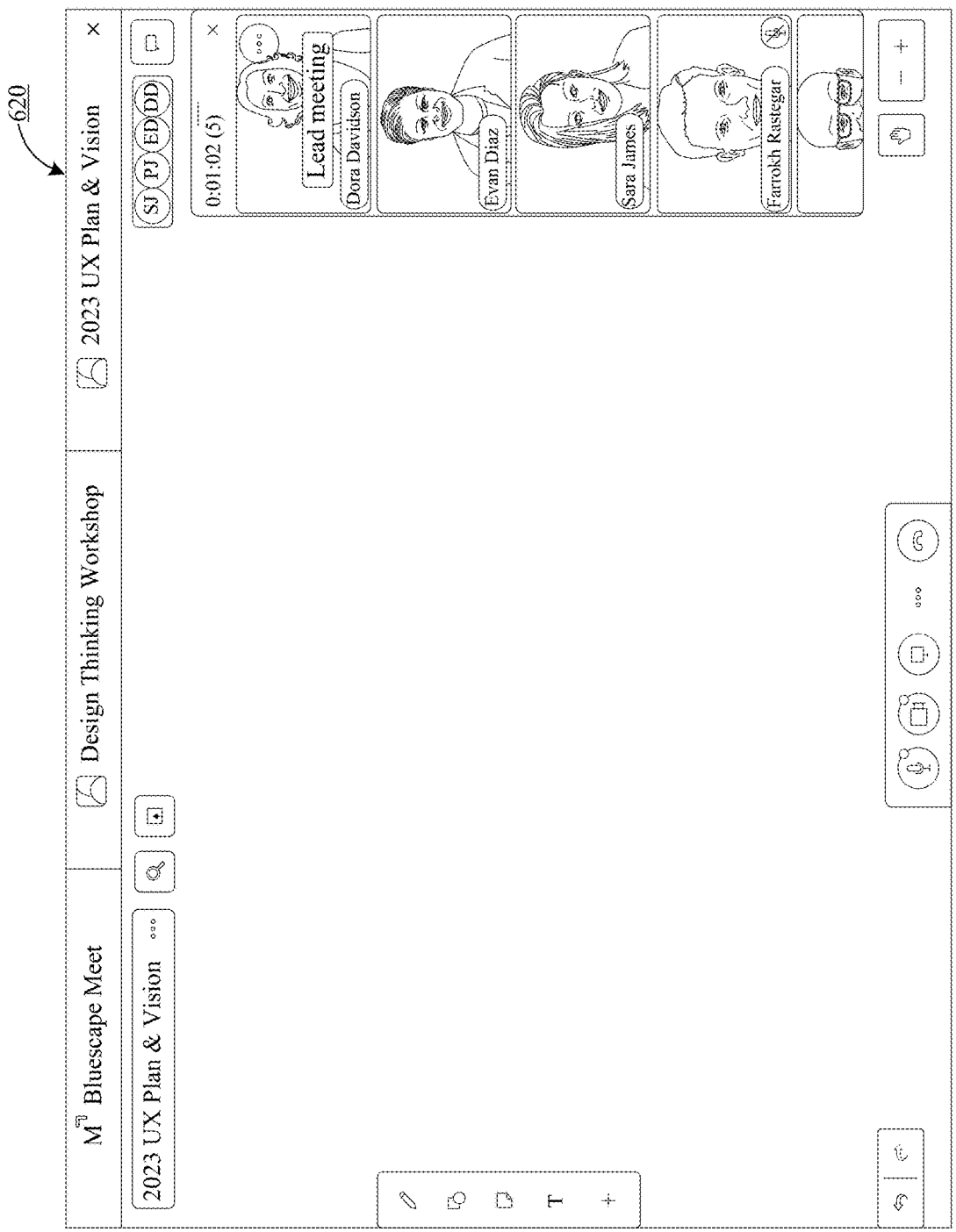

FIGS. 6A to 6C present user interface examples of a process flow to lead a collaboration meeting.

FIG. 6A shows an example user interface 601 which includes a user interface element 605 that can be selected by a participant in the video conference and the content collaboration meeting in order to allow the user to lead the meeting. When a participant leads the meeting, other participants of the video conference and the content collaboration meeting follow the leader and are forced to view the content displayed on the screen of the leader during screen sharing mode.

FIG. 6B shows a user interface 610 in which the participant "Sara James" has selected the lead meeting button 605 to become the meeting leader. The user interface element 615 indicates that the participant "Sara James" is "Leading" the meeting. The video feed of the leader "Sara James" can be placed top center so that the leader can be easily identified. The technology disclosed provides additional features to facilitate video conferences and content collaboration sessions. A user interface element menu 611 presents three user interface elements for "pin" (606), "follow" (607) and "mute" (608) features. A user can select the "pin" user interface element 606 to pin (or fixedly position) a participant's user interface element at a particular location on the workspace (or canvas). As participants join or leave a video conference or a content collaboration meeting, the collaboration server can re-arrange the user interface elements of participants on the workspace. However, if a user likes to place a participant's user interface element at a particular location in the workspace such as at the top left corner of the workspace or in the middle of the workspace, the user can use "pin" feature to fixedly position that user's user interface element at that location. The user can also remove the "pin" for this pinned user interface element and allow the collaboration server to automatically re-arrange user interface element. The "follow" user interface element 607 can be selected to follow the viewport of a participant as presented in follower-leader (also referred to as follow-me) technology. Details of the follower-leader technology are presented in the U.S. patent application Ser. No. 15/147,576, entitled, "Virtual Workspace Viewport Following in Collaboration Systems" filed 5 May 2016, now issued as U.S. Pat. No. 10,802,783, which is fully incorporated into this application by reference. A "mute" user interface element 608 can be selected to mute audio of a participant of a video conference or a content collaboration session. The user can also unmute the audio of the muted participant when needed during the video conference or the content collaboration session.

FIG. 6C shows a user interface 620 in which the participant leading the meeting is forcing the other participants follow the leader by viewing and possibly interacting with the "2021 UX Plan & Vision" workspace.

Creating Virtual Breakout Groups in a Video Conferencing and Collaboration Meeting FIGS. 7A to 7H present user interface examples of a process flow to create virtual breakout meeting groups in a video conference and a content collaboration meeting.

Figure 7A:
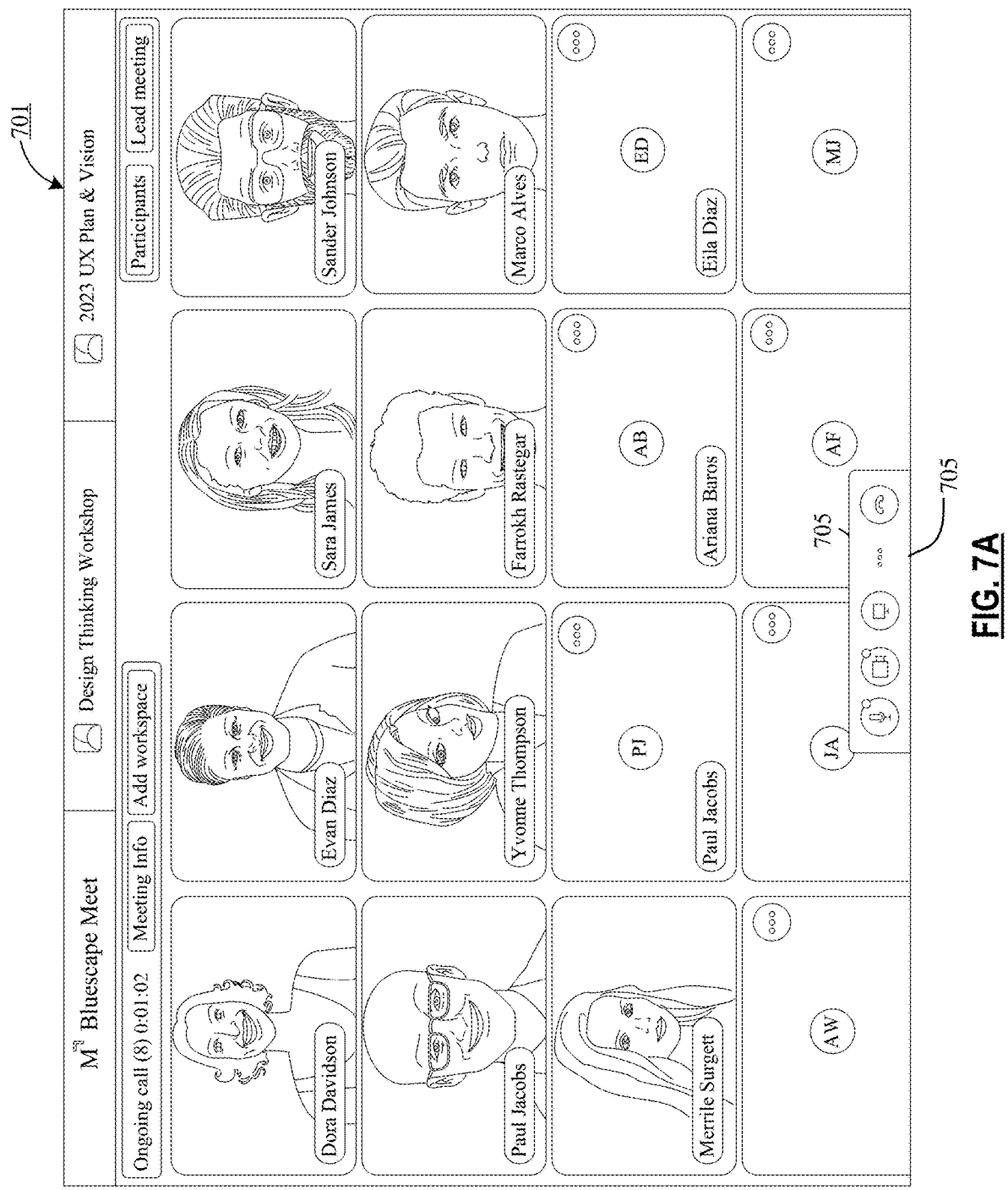
FIGS. 7A, 7B, 7C, 7D, 7E, 7F, 7G, and 7H present user interface examples of a process flow to create breakout meeting groups for a collaborative breakout session.

FIG. 7A presents an example user interface 701 that includes participants in a video conference and a content collaboration meeting. The meeting owner, meeting host or the participant who is leading the meeting can click on a user interface element 705 (comprising three dots) to initiate the process to create virtual breakout groups. This is only an example, and virtual breakout groups can be created in other ways that would be apparent to a person of ordinary skill in the art.

Figure 7B:
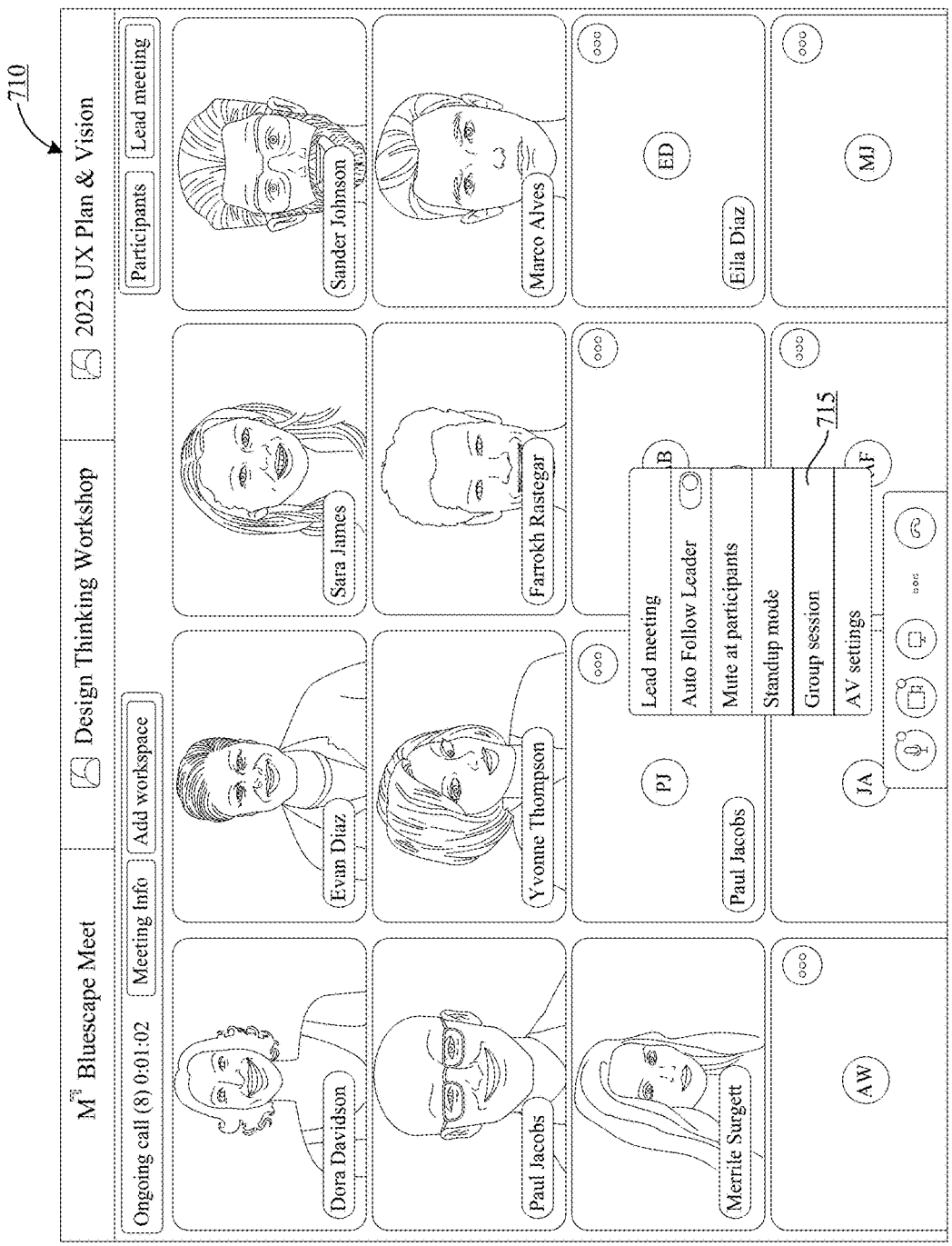

FIG. 7B presents a dialog box with multiple options displayed on the user interface 710. The dialog box is displayed in response to the interaction with the user interface element 705 in FIG. 7A. The dialog box presents an option "Group session" 715.

Figure 7C:
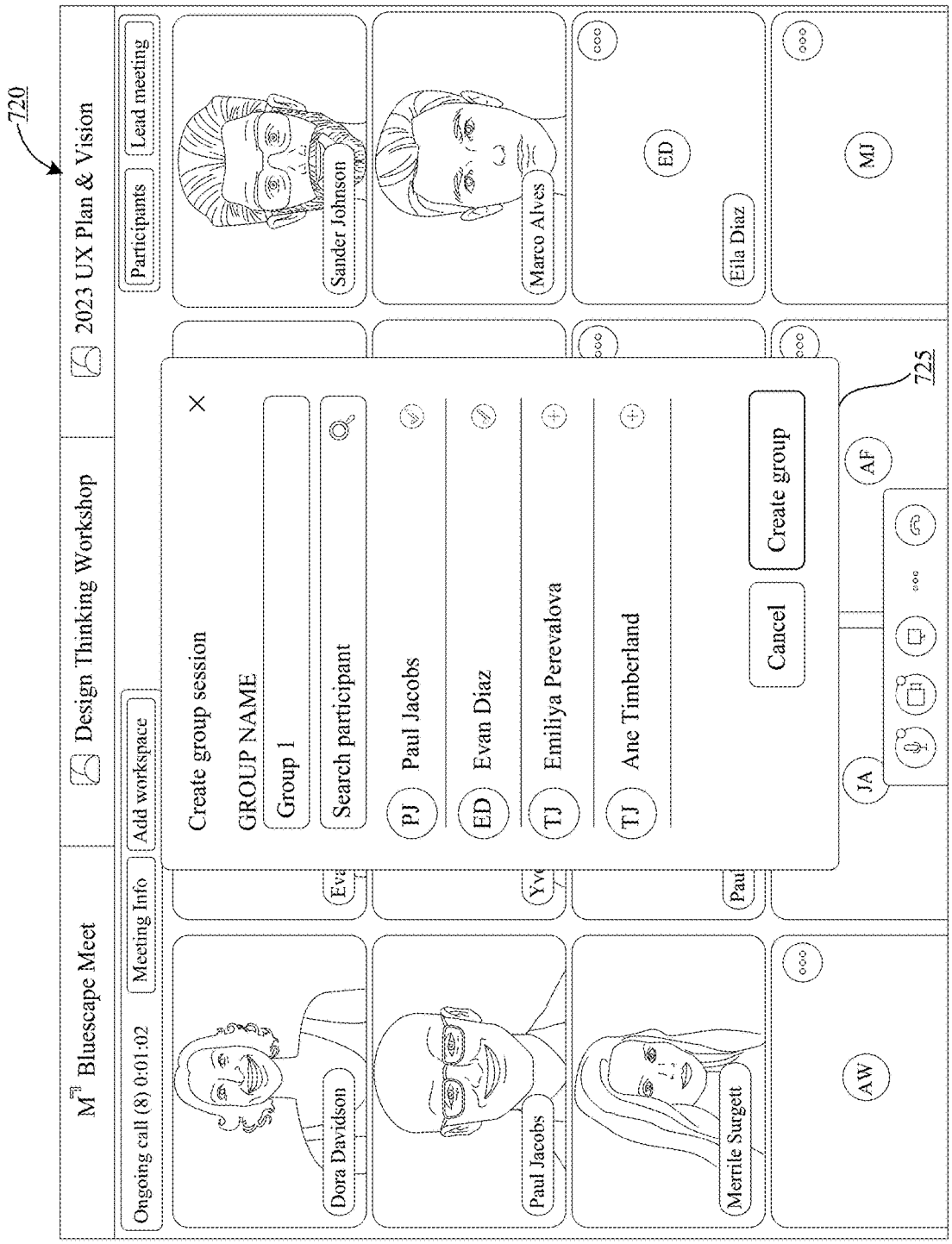

When the user selects option 715, a "create group session" dialog box 725 is displayed as shown on an example user interface 720 in FIG. 7C. The participant or the meeting owner creating the group, can assign a name to the group using a "group name" input text box within the dialog box 725. Participants (including the network nodes associated with or used by the participants) can be added to the group by selecting check boxes or radio buttons for respective participants in the dialog box. When "create group" button is pressed on the "create group session" dialog box, the virtual breakout group is created with the given group name and including the selected participants. The above process can be repeated to create multiple virtual breakout groups. In one implementation, each breakout group will have different participants selected from the participants in the collaboration meeting. The participants of each group will then participate in a video session with only the members of their respective group.

The participant or the meting owner creating the group can also assign a workspace and certain portions (i.e., canvases) of the workspace to the various groups. This can include, for example, the participant or the meeting owner identifying a first group of participants (network nodes) and identifying a first canvas of a (virtual) workspace. The first canvas can have a location and dimensions in the workspace, and the first group of participants (network nodes) can be associated with the first canvas. The first canvas may not include the entire workspace. As a result, during the video conferencing and collaboration meeting, a breakout session can be initiated by initiating a collaboration server of the collaboration system to provide the first group of participants (network nodes) access to the first canvas of the workspace to commence collaboration on the first canvas of the workspace by the first group of participants (network nodes), as discussed above with reference to FIGS. 4E and 4G. The collaboration on the first canvas can be commenced by, for each respective participant (network node) of the first group of participants (network nodes), (i) mapping a client viewport having a location and dimensions in the first canvas of the workspace to a local client screen space of the respective participant (network node) having dimensions in the physical display space of the respective participant (network node), and (ii) rendering digital assets having locations in the client viewport to the local client screen space of the respective participant (network node) as a function of the mapping. Further, upon conclusion of the collaborative breakout session, the collaboration server of the collaboration system can be initiated to provide the first group of participants (network nodes) access to the entire workspace to commence further collaboration on the virtual workspace.

Additionally, the collaboration on the first canvas can be commenced by the first group by only allowing the participants (network nodes) of the first group to access the first canvas of the workspace and preventing the participants (network nodes) of the first group from accessing other portions of the workspace. This access can be granted/denied using the concepts described above regarding authorization levels, which can be adjusted and implemented using, for example, the spatial event map that is distributed from the collaboration server to the various participants (network nodes).

As mentioned above with reference to FIG. 7E, a second group of participants (network nodes) can be identified from the other participants (network nodes). Further, the meeting owner or participant can identify a second canvas of the workspace, such that the second group of participants (network nodes) can be associated with the second canvas. Within the video conference, the collaborative breakout session can be started by initiating the collaboration server of the collaboration system to provide the second group of participants (network nodes) access to the second canvas of the workspace to commence collaboration on the second canvas of the workspace by the second group of network nodes. The collaboration on the second canvas can be commenced by, for each respective participant (network node) of the second group of network nodes, (i) mapping a client viewport having a location and dimensions in the second canvas of the workspace to a local client screen space of the respective participant (network node) having dimensions in the physical display space of the respective participant (network node), and (ii) rendering digital assets having locations in the client viewport having the location and dimensions in the second canvas to the local client screen space of the respective participant (network node) as a function of the mapping. Further, upon the conclusion of the collaborative breakout session, the system can initiate the collaboration server of the collaboration system to provide both the first group of participants (network nodes) and the second group of participants (network nodes) access to both the first canvas and the second canvas of the workspace to commence further collaboration on the first canvas and the second canvas.

In an embodiment, the collaboration on the first canvas is commenced by the first group by only allowing the participants (network nodes) of the first group to access the first canvas of the workspace and preventing the participants (network nodes) of the first group from accessing the second canvas of the workspace. Further, the collaboration on the second canvas is commenced by the second group by only allowing the participants (network nodes) of the second group to access the second canvas of the workspace and preventing the participants (network nodes) of the second group from accessing the first canvas of the workspace.

Furthermore, during the collaborative breakout session, the participants (network nodes) of the first group can view digital assets having locations in the second canvas but they cannot participate in the collaboration on the second canvas by manipulating the digital assets having locations in the second canvas. For example, the participants (network nodes) of the first group may not be able to edit, annotate, move, or delete the digital assets having locations in the second canvas.

During the collaborative breakout session, a participant (network node) or at least one participant (network node) of the first group can store collaboration data (a spatial event map) identifying digital assets having locations in the first canvas of the workspace. The collaboration data (spatial event map) can include (i) locations of the identified digital assets having locations in the first canvas of the workspace and (ii) a log of events (a) relating to the digital assets having locations in the first canvas of the workspace and (b) including entries related to participants (network nodes) of the first group interacting with the identified digital assets having locations in the first canvas.

The stored collaboration data (spatial event map) can identify digital assets having locations in a second canvas of the workspace and can further include (i) locations of the identified digital assets having locations in the second canvas of the workspace and (ii) a log of events (a) relating to the digital assets having locations in the second canvas of the workspace and (b) including entries related to participants (network nodes) of the second group interacting with the identified digital assets having locations in the second canvas.

In one implementation, the participants (network nodes) of the first group and the participants (network nodes) of the second group access the same spatial event map. However, the participants of the first group are allowed access to the first canvas (not the second canvas) and the participants of the second group are allowed access to the second canvas (not the first canvas) for the duration of the breakout session. Both groups can access the canvases, as structured in the spatial event map, but they will be limited as to which information they can obtain from the spatial event map based on their respective assignments to the canvases. When the breakout session ends, the access restriction can be removed and participants of the first group can view content in the second canvas in addition to the content in the first canvas. Similarly, when the breakout session ends, the participants of the second group can view content in the first canvas in addition to the content in the second canvas. In this implementation, when a participant joins a breakout session, the collaboration server can change the reference viewport of the participant to match the canvas assigned to the breakout group to which the participant belongs. Therefore, during the breakout session, the participant can only view content in the canvas assigned (or linked) to the breakout group to which the participant belongs. Upon leaving the breakout session, the participant can view content in the spatial event map outside the canvas assigned to the breakout group for the breakout session. The technology disclosed can include a permission model which can use an identity (such as a user ID or UID) of a participant when assigning the participant to a breakout group. The system can include a permission control system that can manage access to content in the spatial event map based on assignment of participants to breakout groups. The permission control system can use UIDs of participants and their respective assignments to breakout groups to allow access to participants to content in the spatial event map during breakout sessions.

In one implementation, the first canvas and the second canvas do not overlap one another in the workspace. Further, a participant can interact with the collaboration system to (i) allow, during the collaborative breakout session, the first group of participants (network nodes) to collaborate using the second canvas of the workspace and (ii) not allow (or prevent), during the collaborative breakout session, the first group of participants (network nodes) to collaborate by viewing the second canvas of the workspace. Further, the first group of participants (network nodes) can be allowed to collaborate with the second canvas by rendering, but not interacting with, the digital assets having locations within the second canvas. The first group of participants (network nodes) can be allowed to collaborate with the second canvas by rendering and interacting with the digital assets having locations within the second canvas. In another implementation, the first and second canvases can partially overlap. In such an implementation, the participants in the first breakout group and the participants in the second breakout can simultaneously view digital assets in the overlapping portion of the virtual workspace that is shared by both the first canvas and the second canvas.

In an implementation, a participant can interact with the collaboration system to (i) allow, during the collaborative breakout session, the first group of participants (network nodes) to collaborate using other portions of the workspace outside of the first canvas and (ii) not allow (or prevent), during the collaborative breakout session, the first group of participants (network nodes) to collaborate by viewing other portions of the workspace that are outside of the first canvas.

Additionally, a participant can identify a first sub-canvas of the first canvas and identifying a second sub-canvas of the first canvas, and also identify a first sub-group of participants (network nodes) of the first group of participants (network nodes) and identify a second sub-group of participants (network nodes) of the first group of participants (network nodes). Further, the initiating of the collaborative breakout session can include initiating the collaboration server of the collaboration system to provide the first sub-group of participants (network nodes) access to the first sub-canvas of the first canvas of the workspace to commence collaboration on the first sub-canvas of the first canvas of the workspace by the first sub-group of participants (network nodes), and initiating the collaboration server of the collaboration system to provide the second sub-group of participants (network nodes) access to the second sub-canvas of the first canvas of the workspace to commence collaboration on the second sub-canvas of the first canvas of the workspace by the second sub-group of participants (network nodes).

Figure 7D:
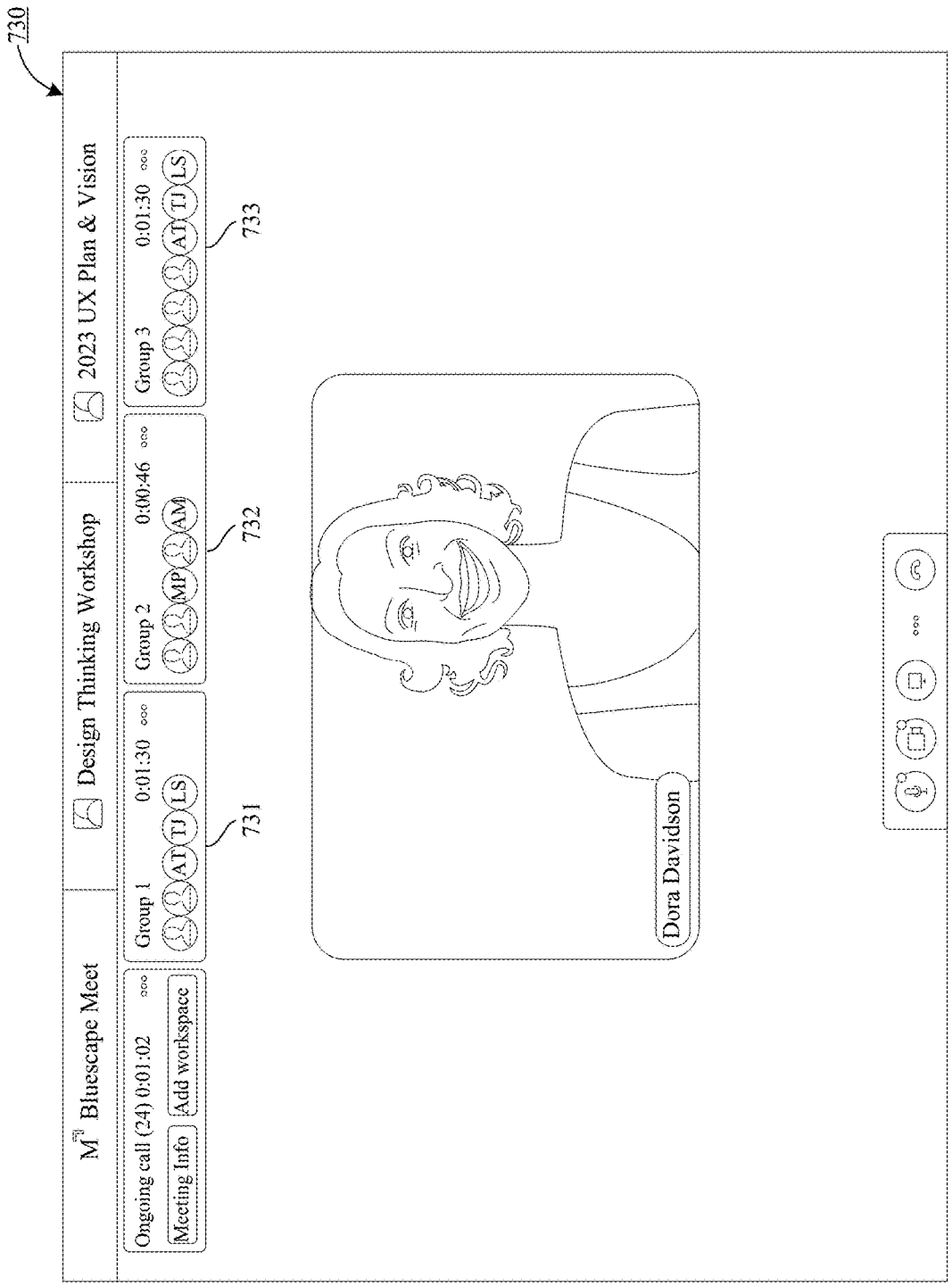

FIG. 7D presents an example user interface 730 that presents user interface elements with three virtual breakout groups named group 1 (731), group 2 (732), and group 3 (733). Each group is represented by its respective group name. The user interface element presenting a group can include names, initials, images, or avatars representing the participants in the group. The user interface element also presents the time elapsed for respective group's virtual breakout session. A participant that is not part of any virtual breakout session can be displayed on the main user interface 730. In this example, one user is not part of any group and is displayed on the user interface 730.

Figure 7E:
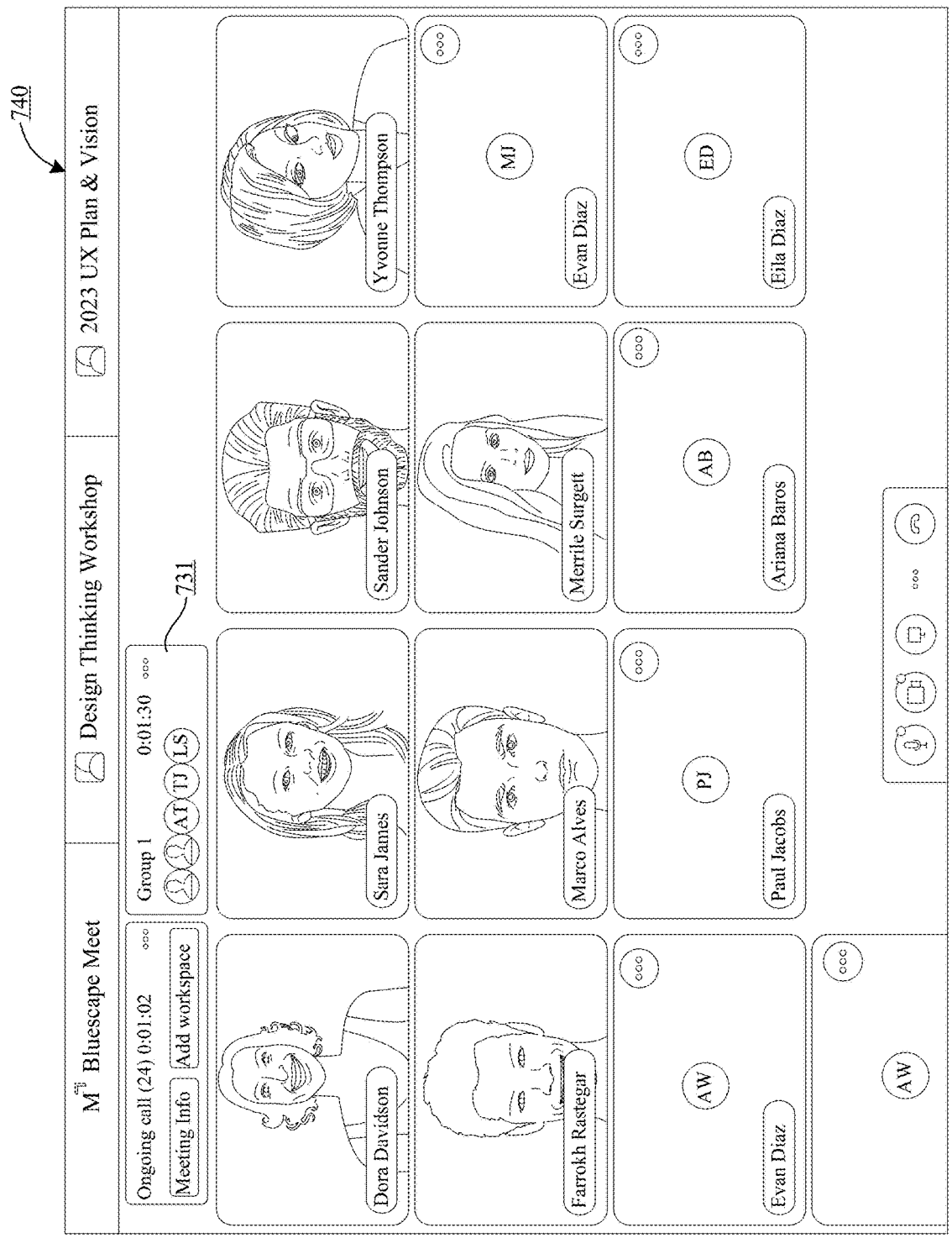

FIG. 7E presents an example user interface 740 with one virtual group named "Group 1" (731). The participants not part of the virtual breakout group are displayed on the user interface 740.

Figure 7F:
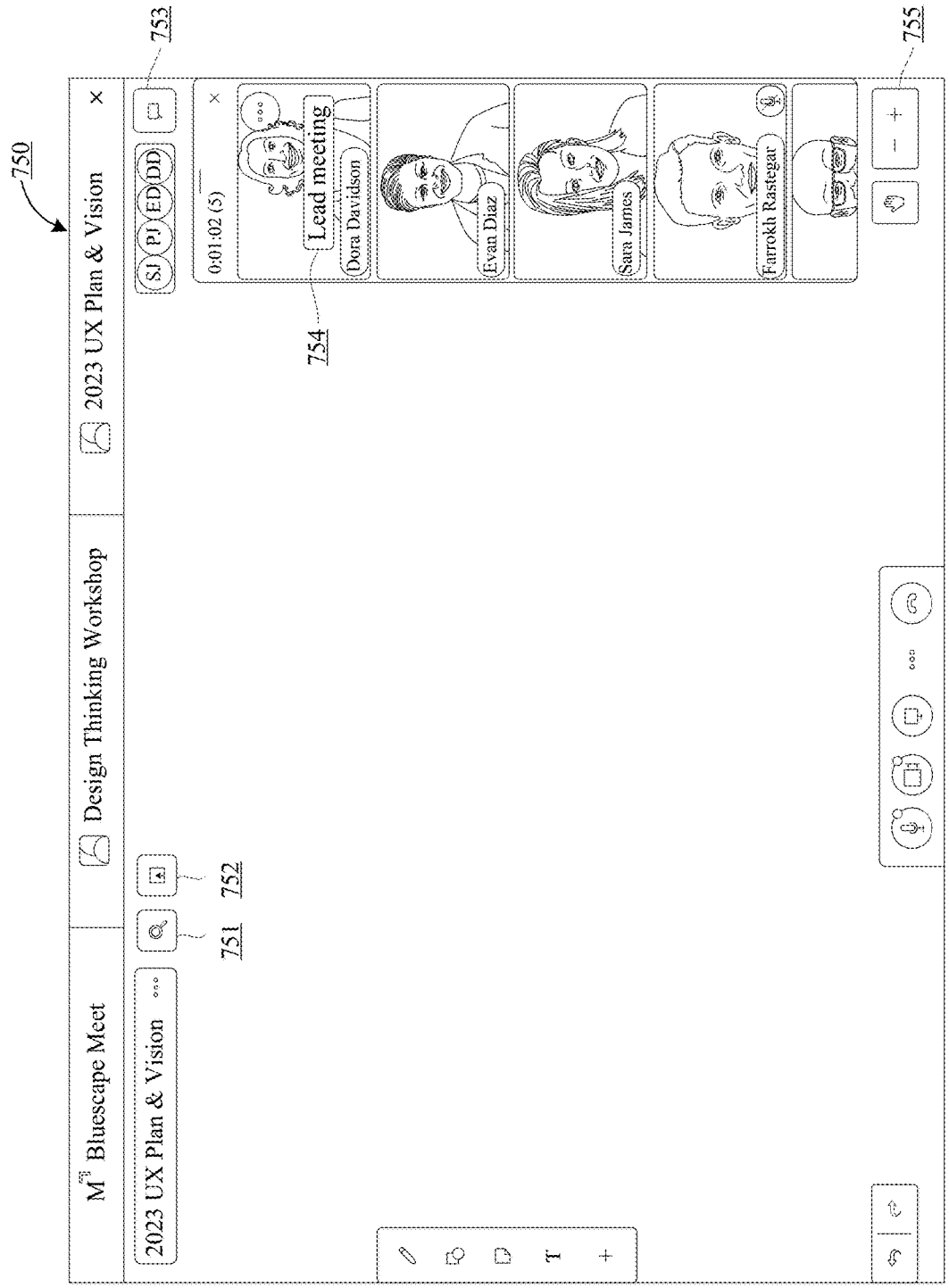

FIG. 7F presents an example user interface 750 that does not display any virtual breakout group in the collaboration meeting. The user interface 750 includes a search user interface element 751 that can be selected by a participant to search for workspaces or digital assets in workspaces by providing one or more search keywords. Note that the search can also be performed using images, videos, annotations, etc. A user interface element 752 can be selected by a participant to upload digital assets to a workspace. The digital assets can be uploaded either from a local storage on the computing device of the user or uploaded from a digital asset management system. A user interface element 753 can be selected to send a message to one or more participants of the video conference or the content collaboration session. The messages can include digital assets including text, images, videos, documents, software applications, voice messages, etc. In the right side of the user interface 750, user interface elements for participants of the video conference or the content collaboration are shown. When there are more participants in the collaboration meeting, user interface elements representing some of the participants may not show up in the user interface 750. In this case, the user can scroll down to view the user interface elements for the participants that do not show up in the user interface 750. A label 754 is positioned on the user interface element of leader (Dora Davidson) of the collaboration meeting. In one implementation, the user can drag the user interface element 754 to another participant's user interface element to change the leader of the video conference or content collaboration session.

Figure 7G:
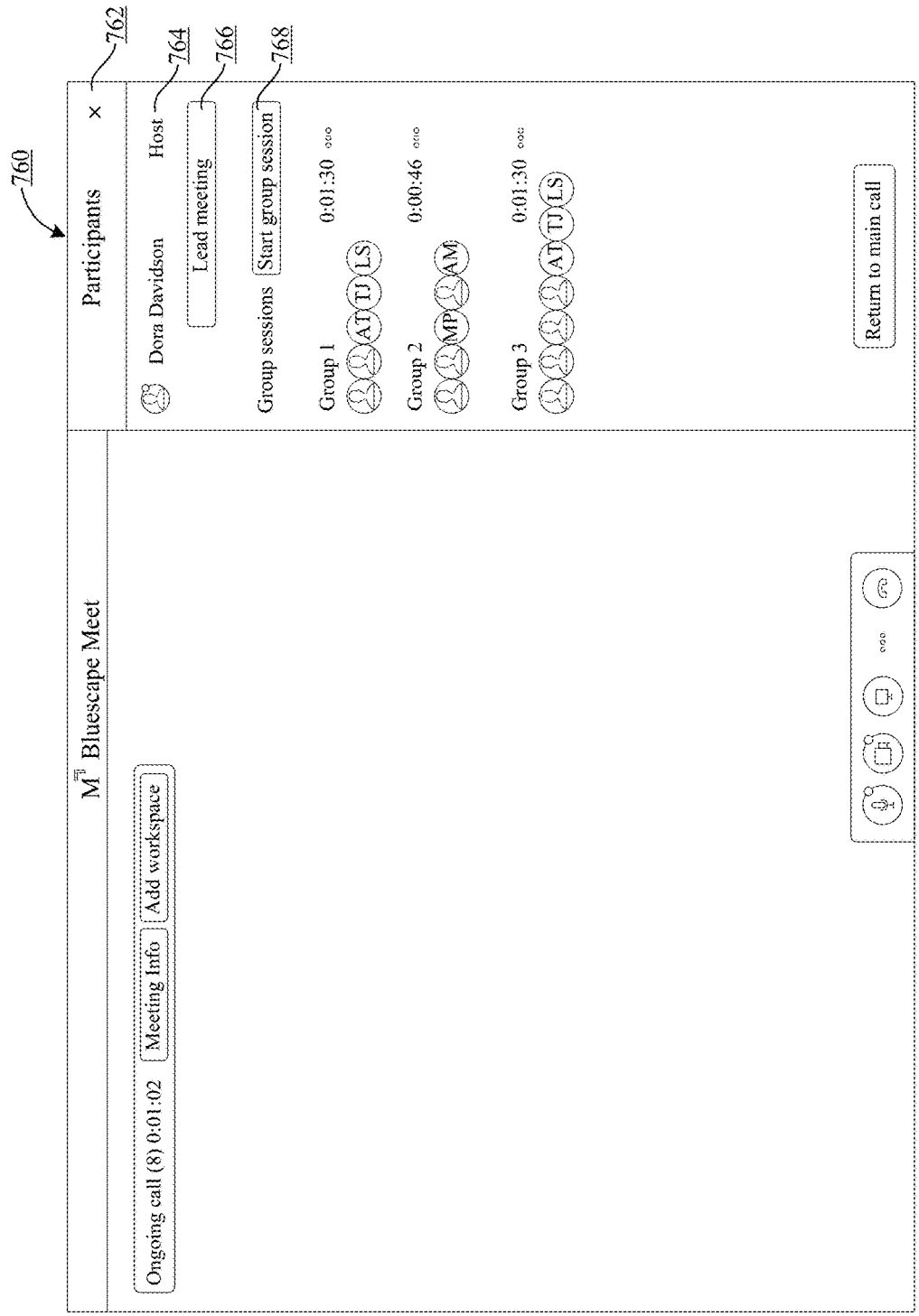

FIG. 7G presents an example user interface 760. The user interface 7G includes a "participants" side bar user interface element 762. The "participants" side bar displays the user identifier or username of the host or meeting owner 764. The user interface displays a "lead meeting" button 766. The host can initiate virtual breakout sessions by selecting a "start group session" user interface element or button 768. The user interface also displays virtual groups along with the initials or identifiers of the participants in respective groups.

Figure 7H:
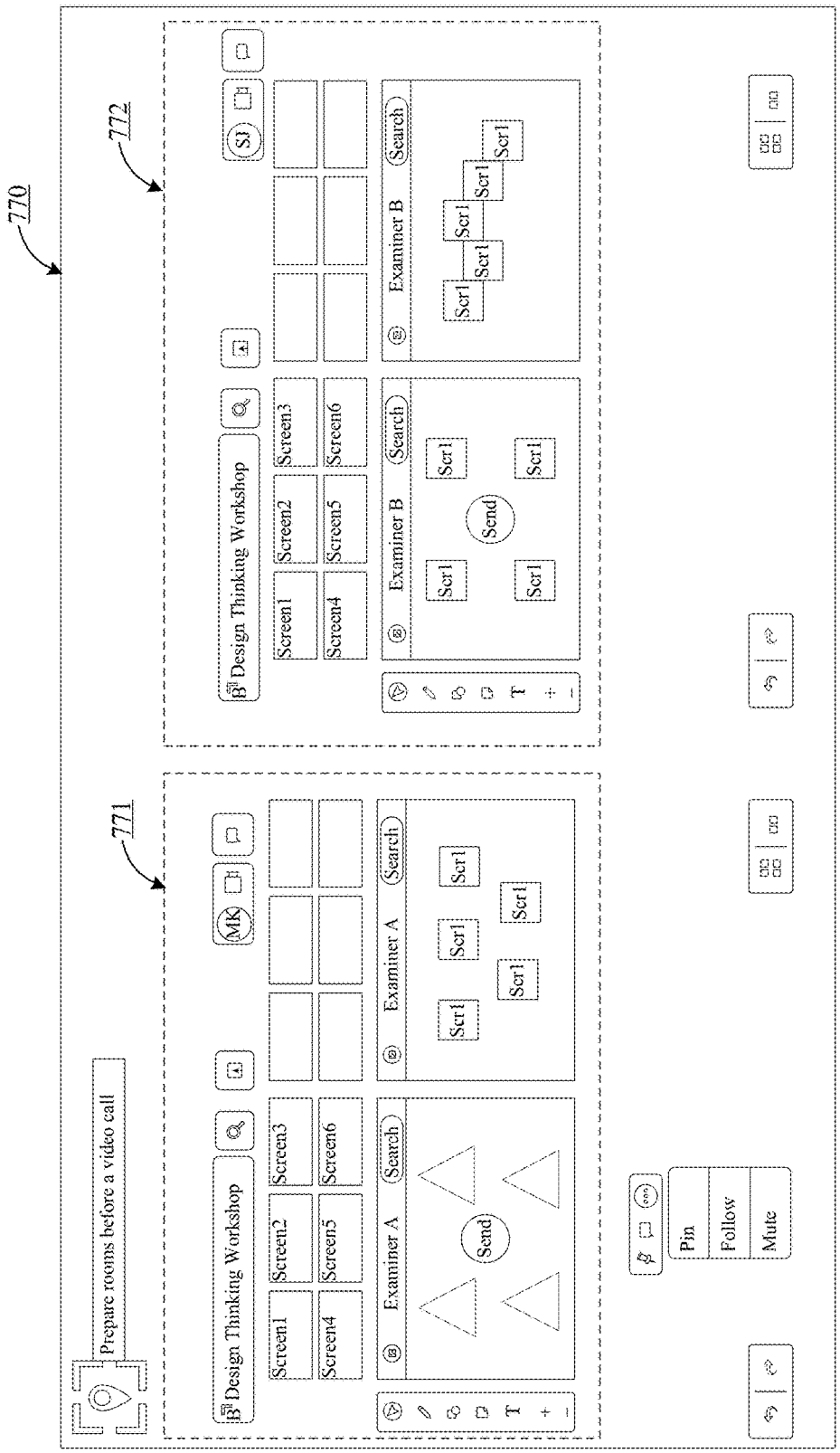

FIG. 7H presents an example user interface 770 that shows creation or preparation of meeting rooms for virtual breakout groups. The meeting host or meeting owner can perform the preparation of meeting rooms before starting the collaboration meeting. In one implementation as described above, the meeting host or meeting leader can create or prepare the meeting rooms in the lobby prior to starting the collaboration meeting. The meeting host can prepare a separate virtual breakout room for each breakout group. As discussed above, the virtual breakout room can include an assigned canvas of the workspace, so as to grant access to the digital assets or resources having locations in the assigned canvas for the participants of the breakout group. For example, FIG. 7H shows two breakout rooms, labeled as 771 and 772 respectively, with separate canvases of a virtual workspace positioned in each breakout room. The digital assets in each breakout room area are illustrated within a boundary created using a broken line. This can be from the perspective of a meeting organizer, such that the organizer can simultaneously view two different breakout rooms, the contents thereof, the assigned participants and even a leader. Other users of the system may not be able to view multiple breakout rooms, such as that illustrated in FIG. 7H. A breakout room can be assigned to a breakout group when a breakout group is created (as shown in FIGS. 7A to 7G). When the virtual breakout meeting starts, the participants of the breakout groups have access to respective breakout meeting rooms and digital assets (having locations within the assigned canvases of the virtual workspace) positioned in respective breakout meeting rooms. For example, as shown in FIG. 7H, members of a first breakout group have access to digital assets in the breakout room 771 and members of a second breakout group have access to digital assets in the breakout room 772. In one implementation, the participants of other breakout groups can only view or edit digital assets of the canvas assigned to their respective breakout room. The participants of a breakout group cannot view or edit digital assets of canvases positioned in breakout rooms assigned to other breakout meeting rooms not assigned to their breakout group. In such an implementation, during the breakout group session, when participants of a group scroll, pan or zoom, the technology disclosed does not render on their display screens, portions of the virtual workspace outside the boundary of canvas assigned to their respective breakout group. In such an implementation, the technology disclosed can also prevent the users of the breakout group from scrolling or panning to areas of the virtual workspace outside the assigned canvas. In one implementation, the technology disclosed allows the participants of a breakout group to scroll, pan and/or zoom to locations of the virtual workspace that are outside the boundary of the canvas assigned to their respective breakout group. However, when the participants of the group scroll, pan and/or zoom to locations of the virtual workspace that are outside the boundary of the canvas assigned to their breakout group, the digital assets on such locations are not visible to the participants or the digital assets are displayed in grayed out manner. In another implementation, the participants of a breakout group, during a breakout group session, can view digital assets in a canvas assigned to another breakout group. When a breakout meeting starts, the participants of a breakout group can only view and edits digital assets of the canvas positioned in their respective meeting room. When the breakout meeting ends, the meeting rooms are unlocked and the digital assets of the canvases in all meeting rooms are available for view by all participants in the collaboration meeting, as well as all other digital assets of the virtual workspace that were not included in a particular canvas. This means that after the breakout meeting ends, participants of a breakout group can view digital assets positioned in meeting rooms assigned to other breakout groups.

Workspace Data Structures

FIGS. 8A-8I represent data structures which can be part of workspace data maintained by a database at the collaboration server 107.

In FIG. 8A, an events data structure is illustrated. An event is an interaction with the workspace that can result in a change in workspace data. An event can include an event identifier, and a meeting identifier. Other attributes that can be stored in the events data structure can include a user identifier, a timestamp, a session identifier, an event type parameter, the client identifier, and an array of locations in the workspace, which can include one or more locations for the corresponding event. It is desirable for example that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include breakout meeting start event when a breakout group meeting starts and a breakout meeting end event to indicate end of a breakout group meeting. Events can include authorization request events when a participant OID interacts with a graphical object with a second level authorization. Events can also include approval events that indicate approval from the owner account of the content to the requesting participant OID to access the content or digital asset. Events can include style events, which indicate the display parameters of a stroke for example. The events can include a text type event, which indicates entry, modification, or movement in the workspace of a text object. The events can include a card type event, which indicates the creation, modification, or movement in the workspace of a card type object. The events can include a stroke type event which identifies a location array for the stroke, and display parameters for the stroke, such as colors and line widths for example.

Events can be classified as persistent, history events and as ephemeral events. Processing of the events for addition to workspace data, and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 8A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log. The entries in the log of events can include information about participants such as participant_name, participant_ID, etc. as shown in FIG. 8G. The entries in the log of events can also include information about canvases such as canvas_ID, canvase_boundary_ID, is_canvas_locked, etc. as shown in FIG. 8H. The entries in the log of events can further include information about breakout groups such as breakout_group_ID, meeting_ID, breakout_room_ID, etc. as shown in FIG. 8C.

FIG. 8B presents a meetings data structure. The meeting data structure can include a meeting identifier and an owner identifier (or a meeting host identifier).

FIG. 8C presents a breakout groups data structure. The breakout groups data structure includes a breakout group identifier, a meeting identifier, a group permission identifier, and a breakout meeting room identifier. One collaboration meeting can include multiple breakout groups.

A breakout can include group permissions to indicate whether a breakout meeting group's content in the breakout meeting room is visible to other participants in the collaboration meeting. FIG. 8D presents a group permissions data structure that includes group permission identifier and a Boolean "is visible" which can set to true to allow the group's data or content (digital assets having locations in a particular canvas) in the breakout meeting room visible to other participants in the collaboration meeting.

A breakout room data structure can include a breakout room identifier as shown in FIG. 8E. A breakout room can be associated to a canvas (or a portion of a workspace) which can be defined by a canvas data structure 8H. The canvas data structure can include a canvas identifier, a breakout room identifier, a canvas boundary identifier. The canvas data structure can also include an "is canvas locked" Boolean data indicating whether the contents or digital assets in the canvas are visible to participants or locked and not visible to participants in the collaboration meeting. The canvas is locked when the breakout session is in progress, hence the value of this data variable is set as "true". After the completion of the breakout session or when the breakout session ends, the canvas is unlocked by setting the value of the canvas as "false". This allows participants of the collaboration meeting who are not member of the breakout group assigned to this meeting room to view the contents or digital assets positioned in the canvas associated with the meeting room of the breakout group.

FIG. 8I presents a canvas boundary data structure which can include attributes that define the boundary of a canvas.

The canvas boundary data structure includes a canvas boundary identifier, CX offset, CY offset and CZ offset (for three dimensional canvases). The offsets can indicate the positions of the canvas within the workspace. The canvas boundary data structure can also include width, height, and depth (for three dimensional canvases) attributes for the canvas.

FIG. 8G presents a participant data structure. The participant data structure can include a participant identifier, a user identifier, a breakout group identifier, and a participant permission identifier. The participant permission is further defined by the participant permissions data structure 8F. The participant permissions data structure includes a participant permission identifier, a breakout group identifier. The participant permission can also include a "is read only" attribute indicating whether the participant has read only access to content or digital assets in the breakout room.

The system can also include a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

The system can include a chunk data structure which consolidates a number of events and objects into a catchable set called a chunk. The data structure includes a session ID, and identifier of the events included in the chunk, and a timestamp at which the chunk was created.

The system can include a data structure for links to a user participating in a session in a chosen workspace. This data structure can include a session access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated. A user session can also be linked to a meeting. One or more than one user can participate in a meeting. A user session data structure can identify the meeting in which a user participated in during a given collaboration session. Linking a user session to a meeting enables the technology disclosed to determine the identification of the users and the number of users who participated in the meeting.

The system can include a display array data structure which can be used in association with large-format displays that are implemented by federated displays, each having a display client. The display clients in such federated displays cooperate to act as a single display. The workspace data can maintain the display array data structure which identifies the array of displays by an array ID, and identifies the session position of each display. Each session position can include an x-offset and a y-offset within the area of the federated displays, a session identifier, and a depth.

Process Flowcharts

FIGS. 9A to 15 present process flowcharts for creating a video conference and a content collaboration meeting including virtual breakout sessions. The flowcharts illustrate logic executed by clients (network nodes), a server (collaboration server) or both. The logic can be implemented using processors programmed using computer programs stored in memory accessible to the computer systems and executable by the processors, by dedicated logic hardware, including field programmable integrated circuits, and by combinations of dedicated logic hardware and computer programs. As with all flowcharts herein, it will be appreciated that many of the operations can be combined, performed in parallel or performed in a different sequence without affecting the functions achieved. In some cases, as the reader will appreciate, a re-arrangement of operations will achieve the same results only if certain other changes are made as well. In other cases, as the reader will appreciate, a re-arrangement of operations will achieve the same results only if certain conditions are satisfied. Furthermore, it will be appreciated that the flow charts herein show only operations that are pertinent to an understanding of the technology, and it will be understood that numerous additional operations for accomplishing other functions can be performed before, after and between those shown.

Figure 9A:
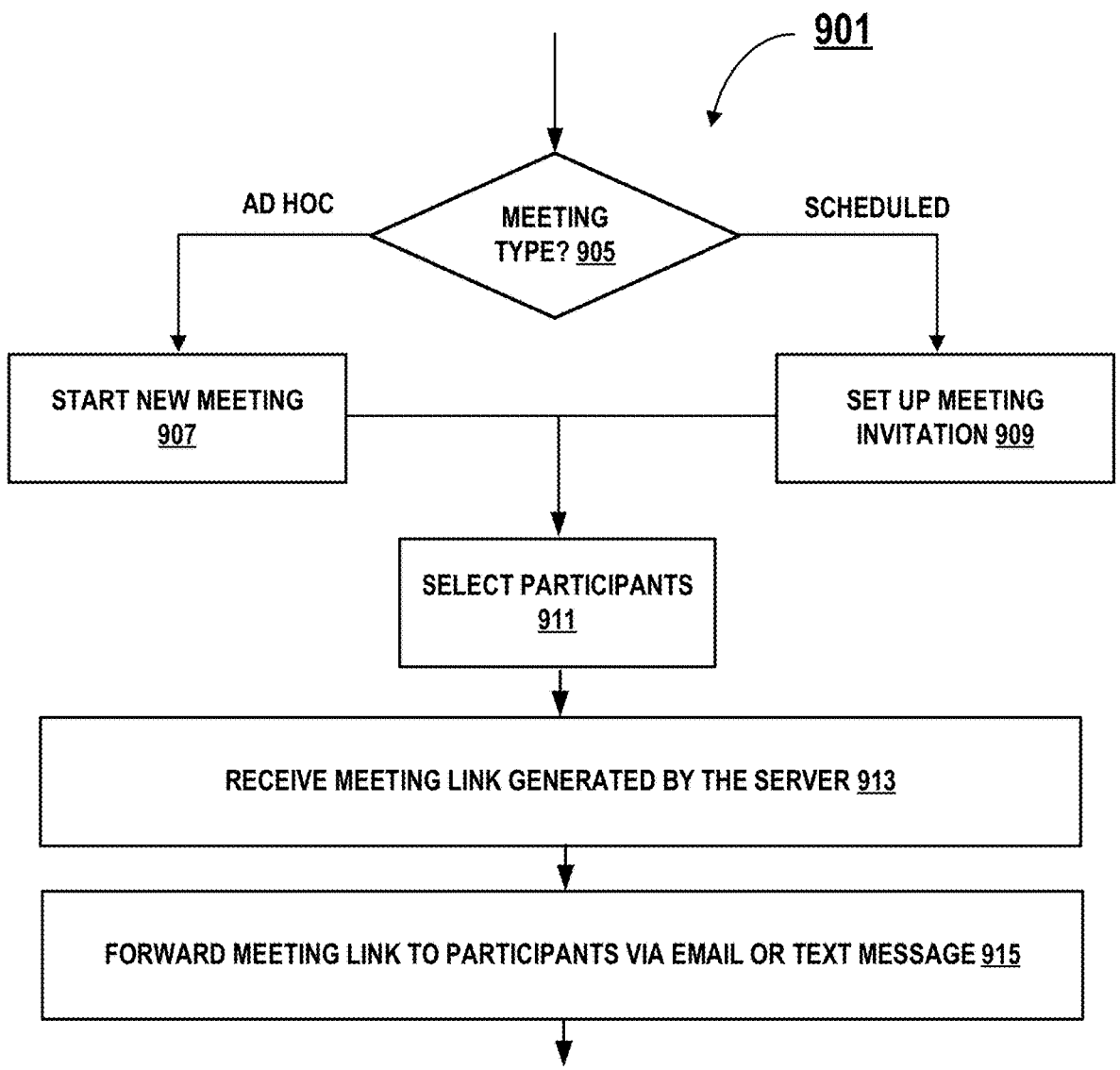
FIG. 9A is a flowchart presenting process operations performed at the client-side network node to setup ad hoc or scheduled collaboration meetings.
Figure 9B:
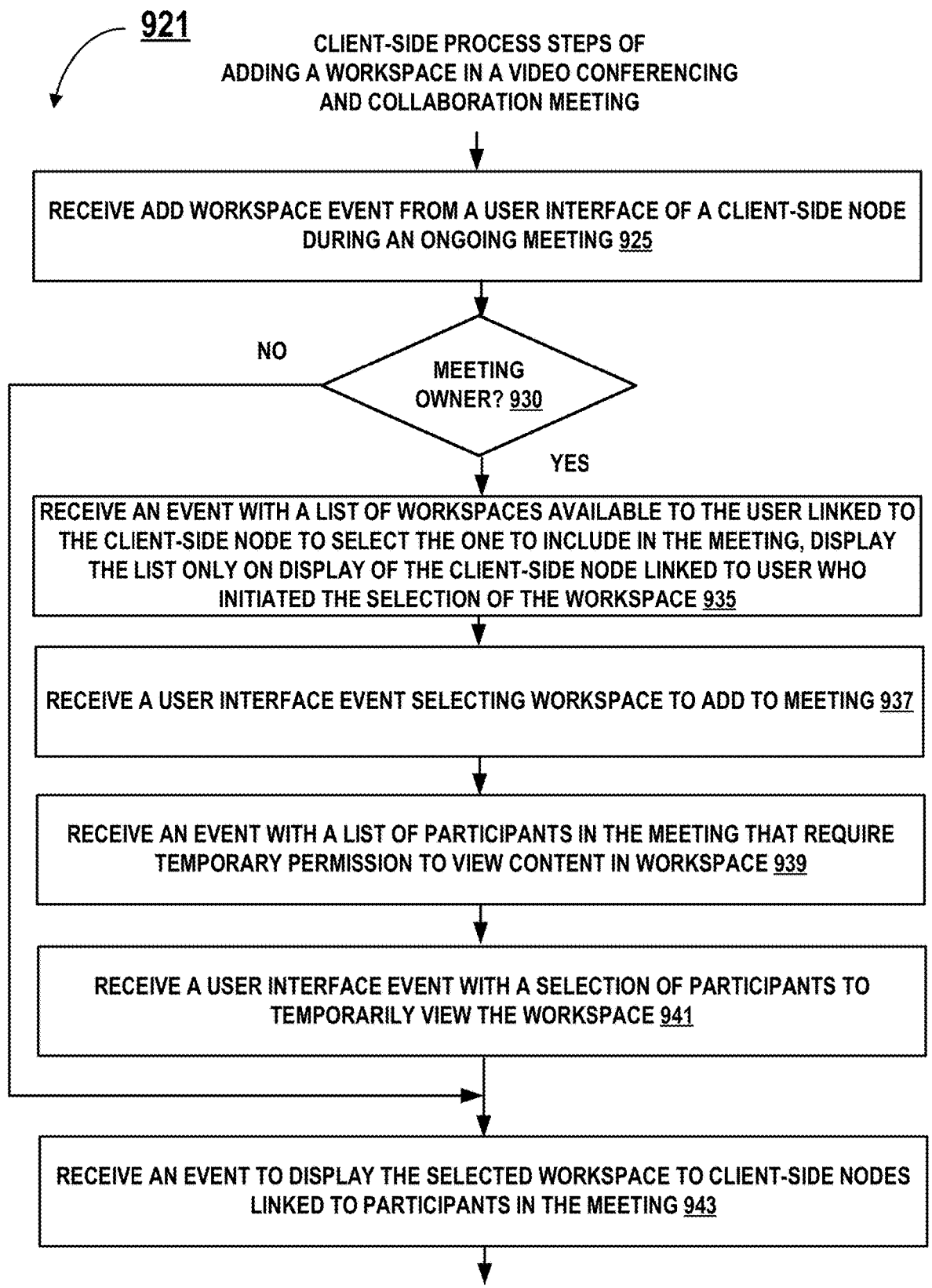
FIG. 9B is a flowchart presenting process operations performed at the client-side network node to add workspace in a collaboration meeting.
Figure 9C:
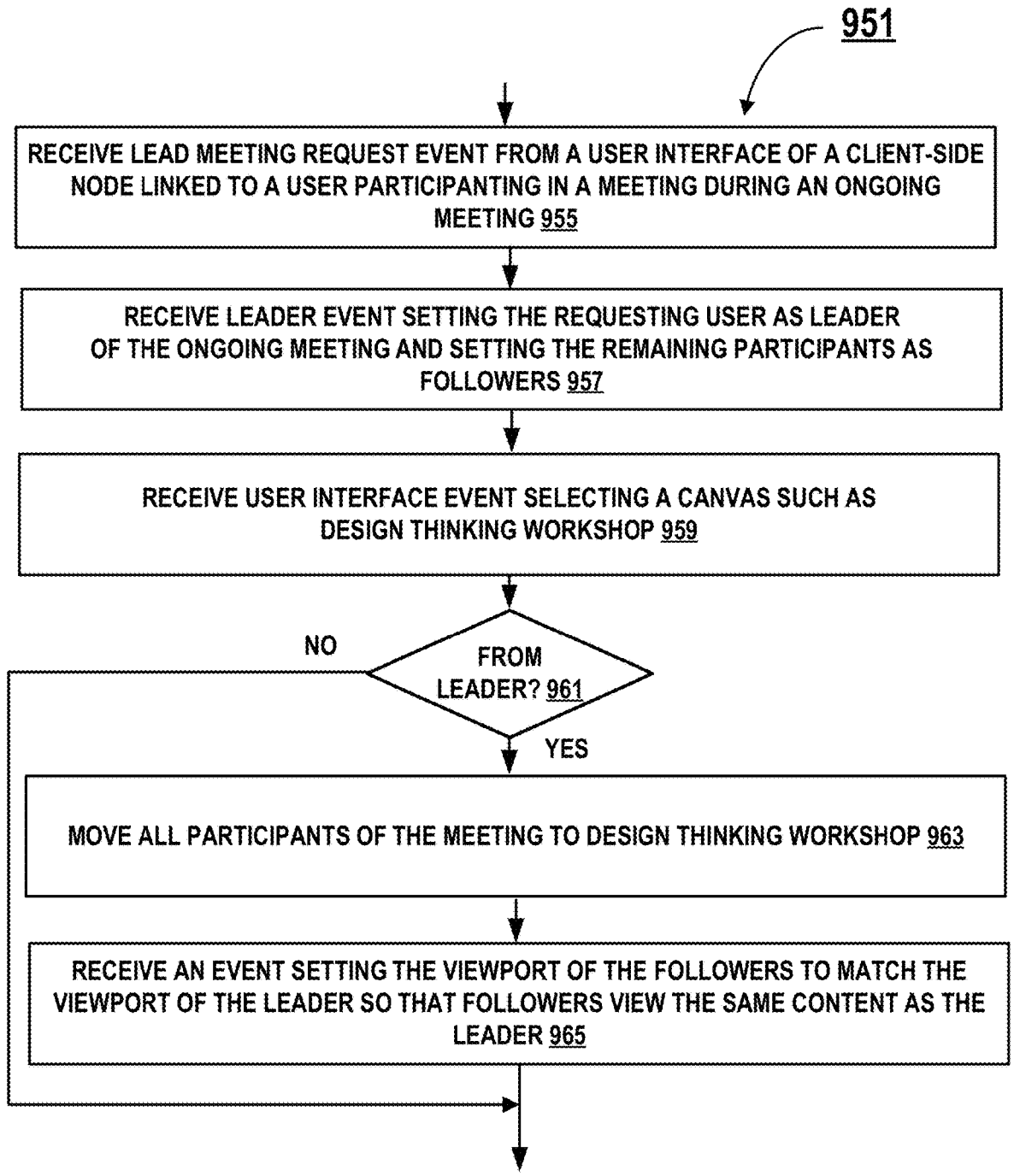
FIG. 9C is a flowchart presenting process operations performed at the client-side network node to lead a collaboration meeting.

Client-Side Process of Setting up Ad-Hoc & Scheduled Video Conferencing and Content Collaboration Meeting FIGS. 9A to 9C present client-side process operations for setting up a collaboration meeting, add workspace in a collaboration meeting, and lead a collaboration meeting.

FIG. 9A is a flowchart 901 presenting high-level client-side process operations for setting up ad-hoc or scheduled video conferencing and collaboration meeting. The process starts at operation 905. If the meeting is an ad-hoc type meeting, the client-side node of meeting host or meeting owner can initiate the "start new meeting" process operation 907. If a scheduled meeting is to be set up, the client-side node of meeting owner or meeting host initiates setting up meeting invitations at the process operation 909. The participants are selected at the operation 911. The client-side node of the meeting host or the meeting owner receives a meeting link generated by the server at operation 913. The meeting link can then be forwarded to the meeting participants via email message, text message (such as SMS text message), via a message in a chat application etc. in operation 915.

FIG. 9B presents a flowchart 921 including client-side process operations for adding a workspace in a video conferencing and collaboration meeting. The process starts at operation 925 when a client-side network node receives an add workspace event from a user interface of a client-side node during an ongoing video conferencing and collaboration meeting. The client-side network node includes logic to determine if the participant initiating the request is the meeting owner (operation 930). In one implementation, the meeting host or the meeting owner can add a workspace to the video conferencing and collaboration meeting. The process flowchart presents process operations for such an implementation. However, in another implementation, any participant in the video conferencing and collaboration meeting can add the workspace to the video conferencing and collaboration meeting.

The process continues at operation 935 in which the client-side node receives an event with a list of workspaces available to the participants or the user linked to the client-side node. The participant can then select the workspace to include in the video conferencing and collaboration meeting. The client-side node of the participant who initiated the add workspace event displays the list of available workspaces. Other client-side nodes of participants in the video conferencing and collaboration meeting do not display such list of available workspaces. The client-side node receives a user interface event selecting A workspace to add to the video conferencing and collaboration meeting (operation 937). The client-side node then receives a list of participants in the meeting that require temporary permission to view the content in the workspace (operation 939). The client-side network node receives a selection of participants to temporarily view the workspace (operation 941). Finally, the client-side network node receives an event to display the selected workspace to client-side nodes linked to participants in the collaboration meeting at operation 943. The workspace is then displayed on displays of the client-side network nodes.

FIG. 9C presents a process flowchart 951 presenting client-side process operations to lead a video conferencing and collaboration meeting. The process starts operation 955 when the client-side network node receives a lead meeting request from a user or a participant of the ongoing video conferencing and collaboration meeting to become leader of the meeting. The lead meeting event is sent to the collaboration server and is processed. The client-side network node receives a leader event, setting the requesting user as leader of the ongoing meeting (operation 957). The other participants in the video conferencing and collaboration meeting are set as followers of the leader. The client-side network node receives a user interface event selecting a canvas such as a "design thinking workshop" (operation 959). The client-side network node includes logic to determine whether the event is received from a leader at operation 961. If the message is not from a leader then the process ends. Otherwise, if the message is from the leader the process continues at operation 963 in which the follower participants of the meeting which can include all participants of the meeting are moved to the canvas selected by the leader. For example, in this case all participants are moved to the "design thinking workshop" canvas. The client-side network node receives an event setting the viewport of the followers to match the viewport of the leader so that following participants of the video conferencing and collaboration meeting view the same content as the leader of the meeting (operation 965).

Client-Side Process of Creating a Meeting Room for Virtual Breakout Session

Figure 10:
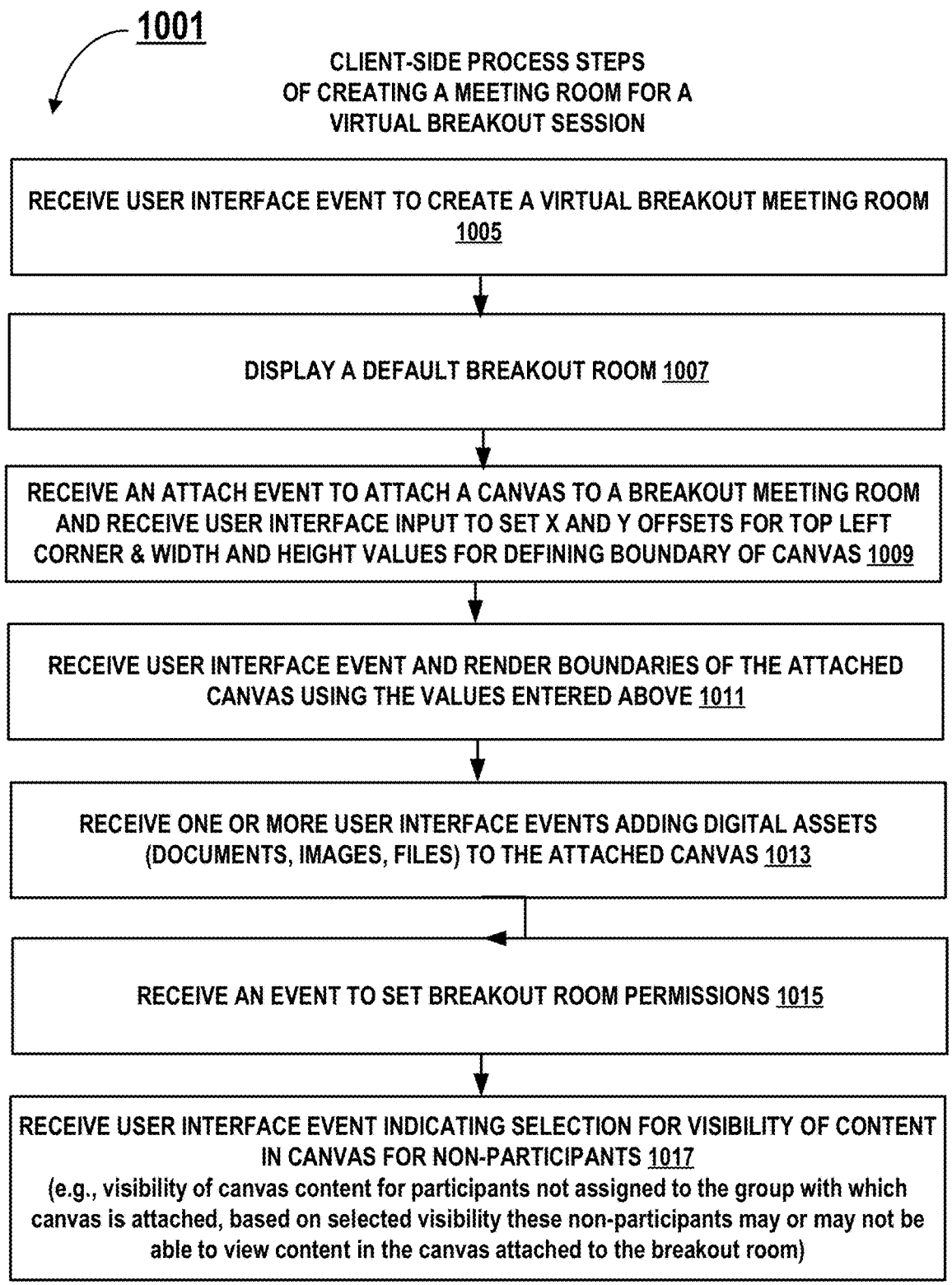
FIG. 10 is a flowchart presenting process operations performed at the client-side network node to create a meeting room for a virtual breakout session.

FIG. 10 presents a process flowchart 1001 presenting client-side process operations for creating a meeting room for a virtual breakout session. The process starts operation 1005 in when the client-side network node receives a user interface event to create a virtual breakout meeting room. The client-side network node can then display a default breakout room at operation 1007. The client-side network node can receive an attach event to attach a canvas to a breakout meeting room at operation 1009. The breakout meeting room can include a portion of the workspace. The breakout meeting room may include pre-included digital assets positioned within the boundary of the breakout meeting room. The client-side network node can receive user interface input to set CX-offset (canvas X-offset) and CY-offset (canvas Y-offset) for top left corner of the canvas in a two-dimensional workspace. The client-side network node can also receive width and height values for defining boundary of canvas (i.e., portion of the workspace). In case of three-dimensional workspace or canvas, a CZ-offset (canvas Z-offset) and depth of the canvas may also be received at the operation 1009 to define the boundary of the canvas. The client-side network node then renders the canvas using the boundary values entered above (operation 1011).

The meeting owner or the meeting host who is preparing the breakout meeting room can include digital assets in the canvas attached to the meeting room. The client-side network node receives one or more user interface events adding digital assets such as document, images, files, etc. to the canvas attached to the meeting room (operation 1013). The client-side network node receives an event to set permissions for the breakout room at operation 1015. The permissions can indicate, among other things, whether the contents of the canvas attached to the meeting room are visible to the participants of other groups or participants who are not part of any breakout group but are participating in the collaboration meeting (operation 1017).

Client-Side Process of Assigning Participants to Breakout Meeting Groups

Figure 11:
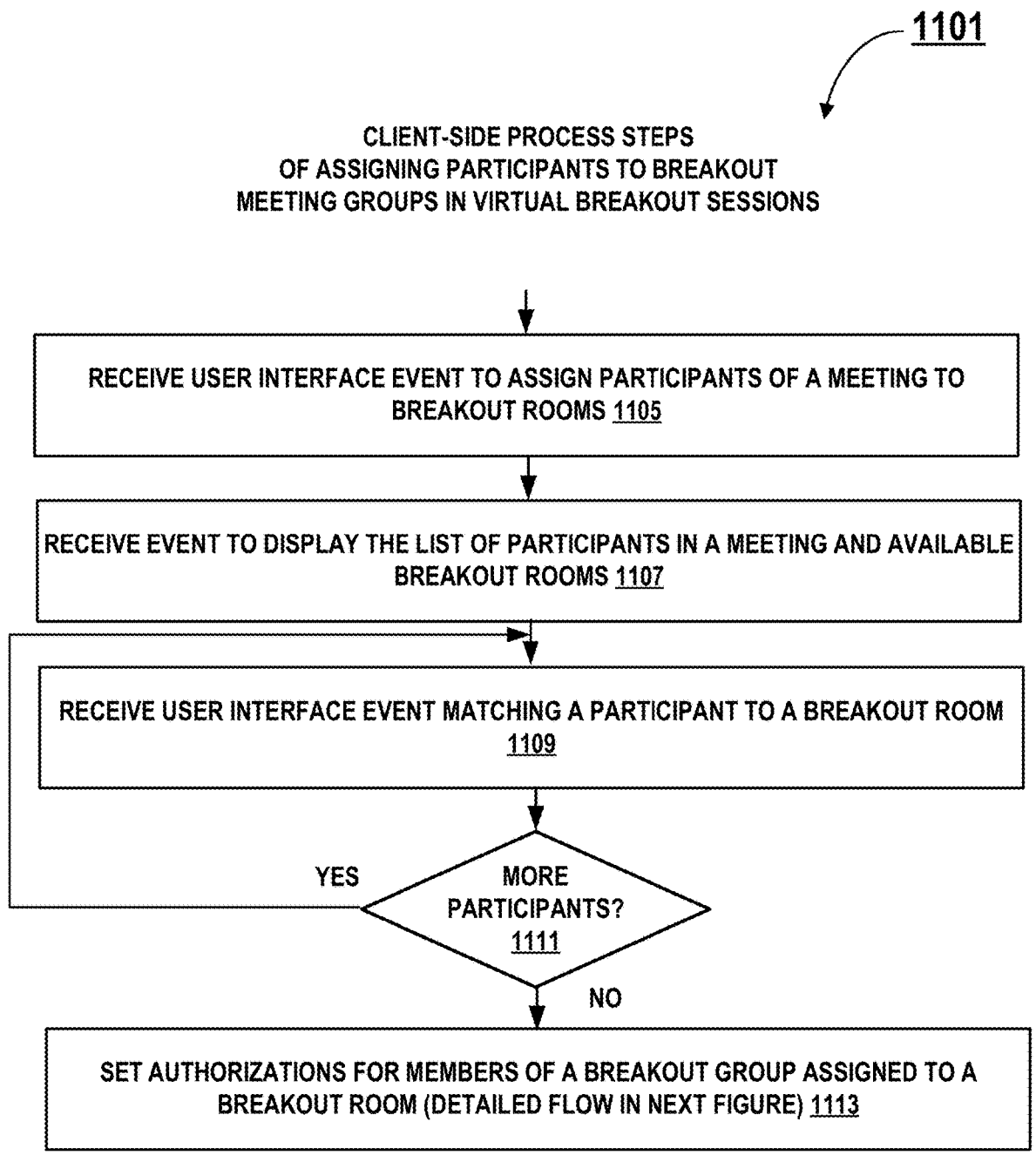
FIG. 11 is a flowchart presenting process operations performed at the client-side network node to assign participants to breakout meeting groups in virtual breakout sessions.

FIG. 11 presents a client-side process flowchart 1101 for assigning participants to breakout meeting groups. The process starts at operation 1105 in which a client-side network node receives a user interface event to assign participants of a video conferencing and collaboration meeting to breakout rooms. The client-side network node receives an event to display the list of participants in the collaboration meeting and available breakout rooms in the collaboration meeting (operation 1107). The client-side network node receives a user interface event matching a participant to a breakout room (operation 1109). The client-side network includes logic to determine if there are more participants that need to be assigned to breakout meeting rooms (operation 1111). If there are more participants, the process repeats process operation 1109. Otherwise, the process continues at operation 1113 to set authorization for members of a breakout group assigned to a breakout room. Further details of setting the authorizations are presented in a following process flowchart.

Client-Side Process of Assigning Setting Authorizations for Participants

Figure 12:
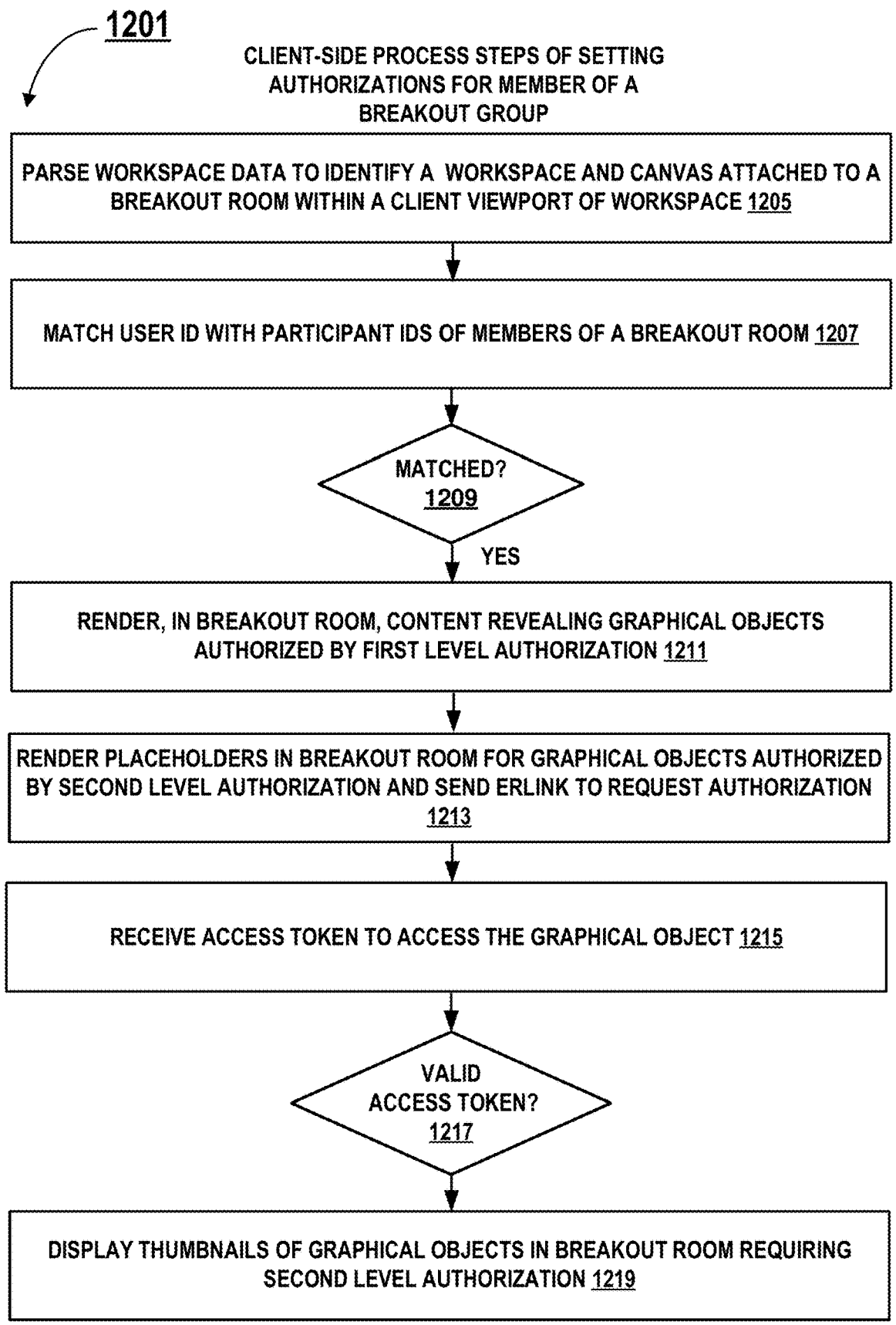
FIG. 12 is a flowchart presenting process operations performed at the client-side network node to set authorizations for a member of a breakout meeting group.

FIG. 12 presents a client-side process flowchart 1201 for setting authorizations for a member of a breakout meeting group. The process starts at a process operation 1205 in which the client-side network node parses the workspace data to identify a data canvas such as a portion of a workspace attached to a breakout meeting room. The client-side network node includes logic to match a user identifier of a digital assets in the data canvas with identifiers of participants that are members of a breakout group (operation 1207). If the identifier is matched (operation 1209), the client-side network node renders the digital asset or content revealing graphical object that are authorized by first level authorization in the breakout room (operation 1211). The client-side network node renders placeholders in breakout room for graphical objects that are authorized by second level authorization (operation 1213). In other words, any content either requiring first level or second level authorization will only be displayed if the user is a member of the breakout group. The client-side network node sends an ERLink (external resource link) to request authorization from content owner for digital assets requiring second level authorization. The client-side network node receives an access token to access the graphical object at operation 1215. If the access token is valid (operation 1217), the client-side network node displays the thumbnail of graphical objects in breakout meeting room (operation 1219). Further details of two-level authorization scheme implemented by the technology disclosed are described in the U.S. patent application Ser. No. 17/200,731, entitled, "User Experience Container Level Identity Federation and Content Security" filed on Mar. 12, 2021.

Figure 13:
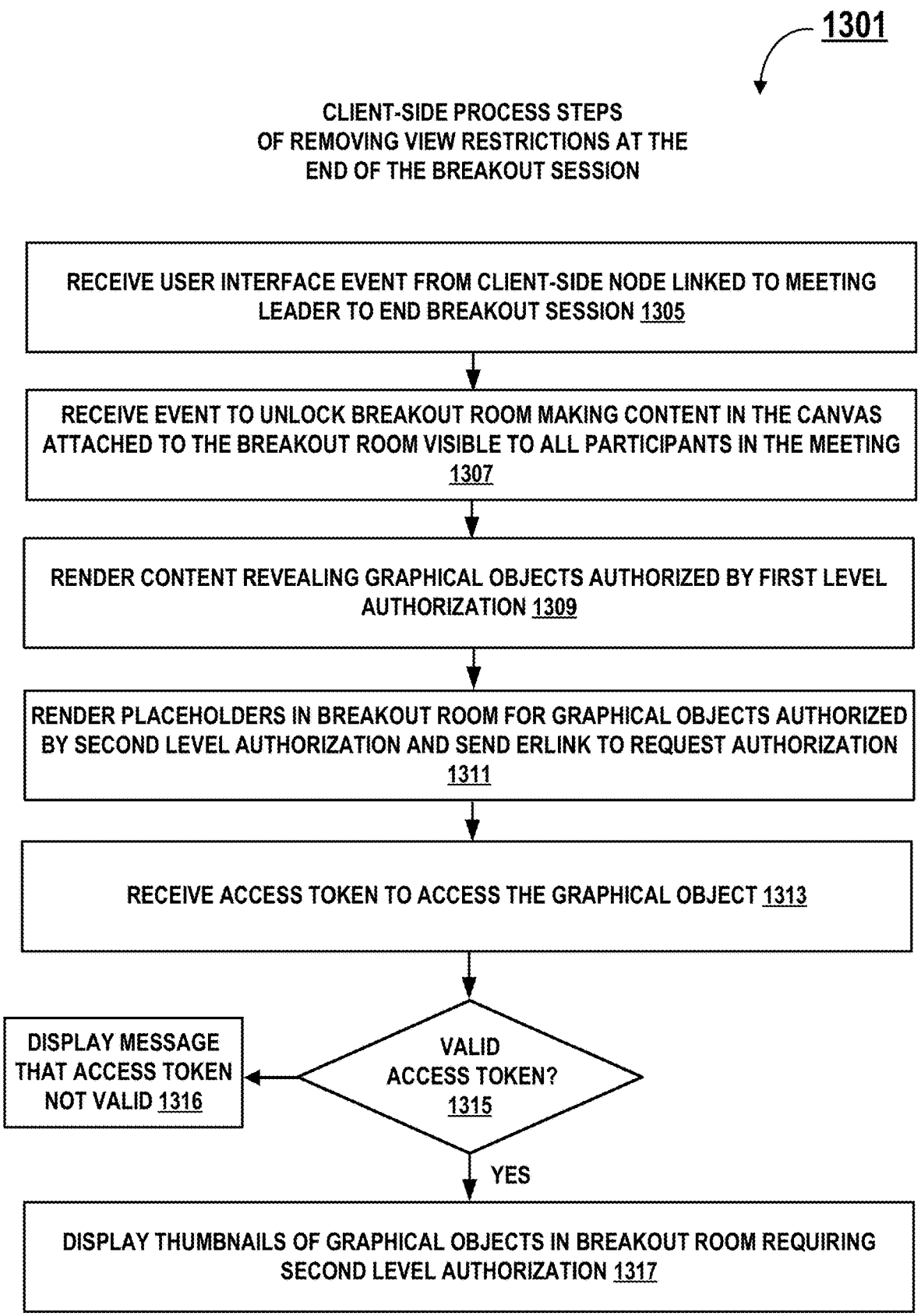
FIG. 13 is a flowchart presenting process operations performed at the client-side network node to remove view restrictions at the end of a virtual breakout session.

Client-Side Process of Removing View Restrictions at the End of Breakout Session FIG. 13 presents a client-side process flowchart 1301 for removing view restrictions for digital assets in breakout meetings rooms at the end of a virtual breakout meeting. In this implementation, there is no restriction on content rendering placed based on membership to a breakout group, rather the content is displayed for all participants of the meeting. The process starts at operation 1305 when a client-side network node receives a user interface event to end the breakout session. In one implementation, the event is received from a client-side network node linked to the meeting host or meeting owner or meeting leader. In another implementation, the user interface event can be received from any participant of the collaboration meeting. At a process operation 1307, the client-side network node receives an event to unlock the breakout meeting room for which the breakout session is complete (or is ending). The unlock event can remove view restrictions for digital assets in the canvas linked to the breakout meeting room. Removing the restriction allows all participants in the video conferencing and collaboration meeting to view content in the breakout meeting room. At a process operation 1309, the client-side network node renders content revealing graphical objects authorized by first level authorization. At a process operation 1311, the client-side network node renders placeholders in breakout meeting room for graphical objects authorized by second level authorization and sends ERLink for respective graphical objects to request authorization from owners of the digital assets. The client-side network node receives an access token at operation 1313 to access the graphical objects for which authorization requests were sent. The client-side network node determines if the access token is valid (operation 1315). If access token is not valid, the client-side network node can display a message that access token is not valid (operation 1316). The client-side network node can then take further input from the requesting client and send another request to content owner with ERLink. If the access token is valid, the client-side network node displays thumbnails of the graphical objects in breakout room requiring second level authorization (operation 1317).

Server-Side Process of Starting a Virtual Breakout Session

Figure 14:
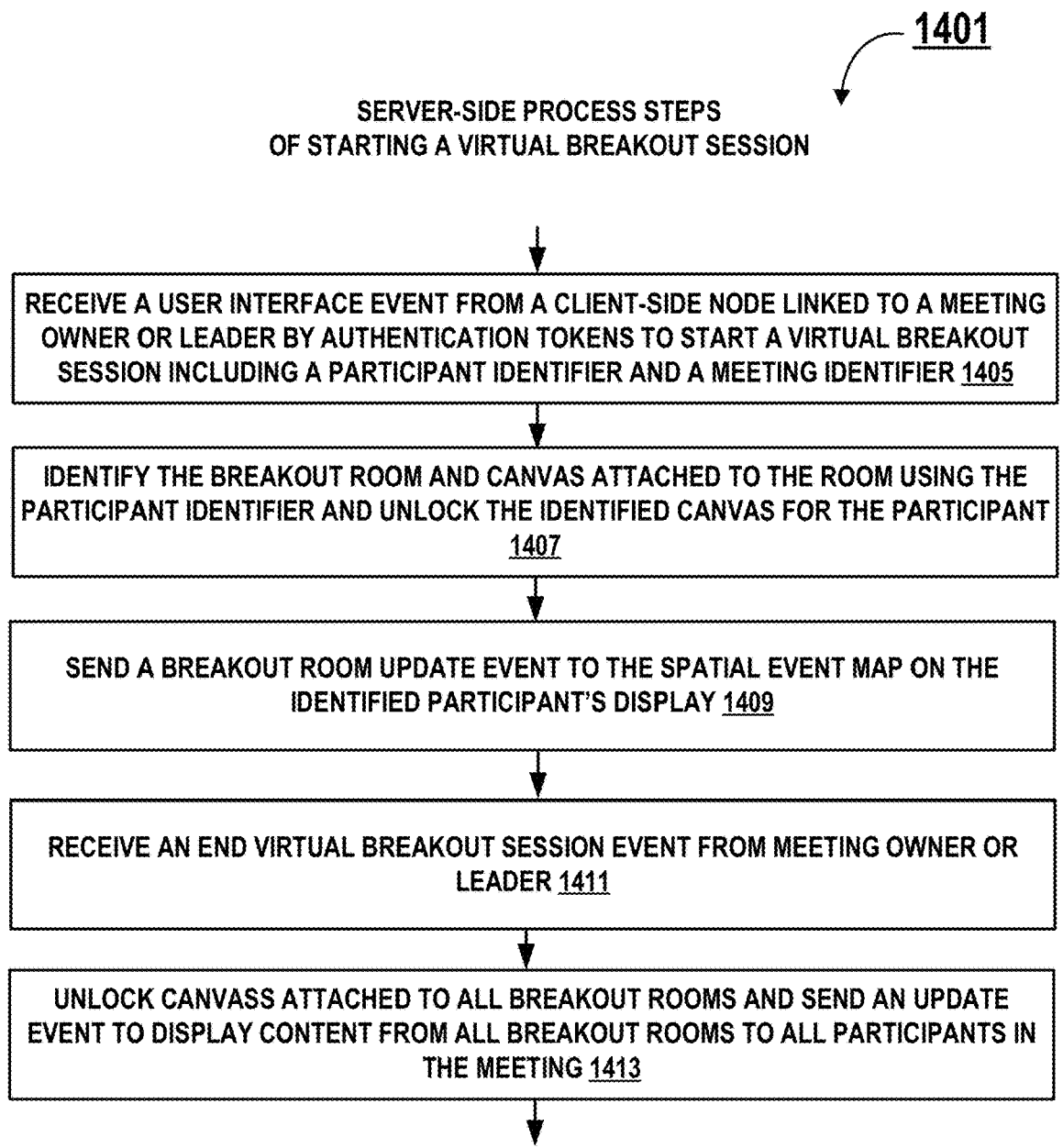
FIG. 14 is a flowchart presenting process operations performed at the server-side network node to start a virtual breakout session.

FIG. 14 presents a process flowchart 1401 presenting server-side process operations to start a virtual breakout session. The process starts at operation 1405 when the server receives a user interface event from a client-side node linked to a meeting leader or meeting owner to start a virtual breakout session. The event can include authentication tokens including participant identifier and a meeting identifier. The process continues at operation 1407 at which the server-side node identifies the breakout meeting room and canvas attached to the breakout meeting room. In one implementation, the server-side node can use the participant identifier to determine the breakout meeting room. The server-side node can then execute the logic to unlock the identified canvas linked to the meeting room for the participant to access the digital assets in the canvas during the virtual breakout session.

The server-side network node includes logic to send a breakout meeting room update event to the spatial event map to the client-side network node's display associated with the identified participant (operation 1409). The server-side node can receive an end virtual breakout session event from the client-side network node associated with the meeting owner or the meeting leader (operation 1411). The server-side network node includes logic to unlock canvases attached to breakout meeting rooms when end breakout meeting event is received (operation 1413). The server-side network node can then send an update event to display content from breakout rooms to all participants in the collaboration room. This can be considered as unlocking the content of breakout session groups. The server can follow the process to display digital assets with first and second level authorizations as described in the U.S. patent application Ser. No. 17/200,731, entitled, "User Experience Container Level Identity Federation and Content Security" filed on Mar. 12, 2021.

Figure 15:
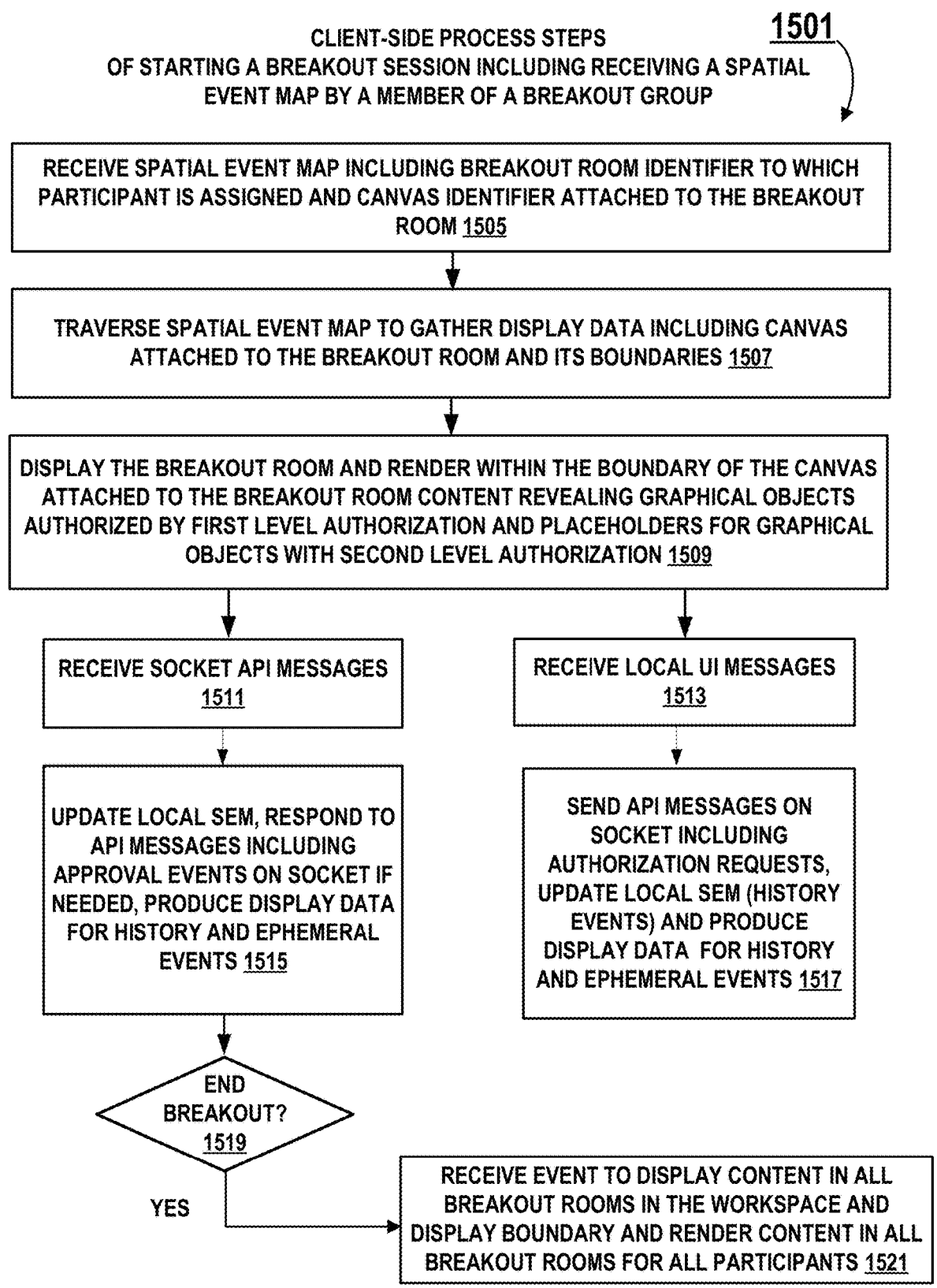
FIG. 15 is a flowchart presenting process operations performed at the client-side network node to start a virtual breakout session and receive a spatial event map.

Client-Side Process of Starting a Virtual Breakout Session Including Receiving a Spatial Event Map FIG. 15 presents a process flowchart 1501 including client-side process operations to start a breakout session including receiving a spatial event map by a member of a breakout group. The order illustrated in the simplified flow diagram is provided for the purposes of illustration, and can be modified as suits a particular implementation. Many of the operations for example, can be executed in parallel.

The process starts at operation 1505. The collaboration server provides an identifier of, or identifiers of parts of, the spatial event map (or SEM) which can be used by the client to retrieve the spatial event map from the collaboration server. The client retrieves the spatial event map, or at least portions of it, from the collaboration server using the identifier or identifiers provided at which the client-side node receives a spatial event map including breakout room identifier. The breakout room identifier identifies the breakout room to which the collaboration meeting participant is assigned to. The breakout room identifier can also be used to identify (using the breakout room data structure) the canvas attached to or associated with the breakout room. The canvas contains the digital assets for the participants of the breakout group.

For example, the client can request all history for a given workspace to which it has been granted access as follows:

curl http://localhost:4545/<sessionId>/history

The server will respond with all chunks (each its own section of time):

```
["/<sessionId>/history/<startTime>/<endTime>?b=1"]
["/<sessionId>/history/<startTime>/<endTime>?b=1"]
```

For each chunk, the client will request the events:

```
Curl http: //localhost:4545/<sessionId>/history/<startTime>/
<endTime>?b=<cache-buster>
```

Each responded chunk is an array of events and is cacheable by the client:

```
[
  [
    4,
    "sx",
    "4.4",
    [537, 650, 536, 649, 536, 648, ...],
    {
      "size": 10,
      "color": [0, 0, 0, 1],
      "brush": 1
    },
    1347644106241,
    "cardFling"
  ]
]
```

The individual messages might include information like position on screen, color, width of stroke, time created etc.

The client then determines a viewport in the workspace, using for example a server provided focus point, and display boundaries for the local display. The client-side node (network node) includes logic to traverse spatial event map (SEM) to gather display data (operation 1507). The local copy of the spatial event map is traversed to gather display data for spatial event map entries that map to the displayable area for the local display. At this operation the system traverses spatial event map to gather display data that identifies graphical objects with first level authorization and graphical objects with second level authorization for spatial map events. In some embodiments, the client may gather additional data in support of rendering a display for spatial event map entries within a culling boundary defining a region larger than the displayable area for the local display, in order to prepare for supporting predicted user interactions such as zoom and pan within the workspace. The display data can include canvas attached to the breakout room. This data can also include coordinates indicating the boundary of the canvas attached to the breakout room.

The process continues at operation 1509 at which the client-side node displays the breakout room on the display of the client-side node. The client-side node also display content within the boundary of the canvas attached to the breakout room. The client processor executes a process using spatial event map events and display data to render parts of the spatial event map that fall within the viewport. The system includes logic to display content revealing thumbnails or more detailed content revealing objects up to full resolution images, for digital assets requiring first level authorization and placeholders for digital assets requiring second level authorization. The first level graphical objects are displayed as content revealing thumbnails within window or frame graphical objects on the workspace. In case of placeholder graphical objects requiring second level authorization, the client-side node can render a placeholder with a graphical user interface element such as a button to receive user input.

The client-side network node can receive socket API messages (1511). The client-side node can receive local user interface messages (1513). Also, the client-side node receives socket API messages from the collaboration server. In response to local user interface messages, the client-side node can classify inputs as history events and ephemeral events, send API messages on the socket to the collaboration server for both history events and ephemeral events as specified by the API, the API message can include authorization requests, update the cached portions of the spatial event map with history events, and produce display data for both history events and ephemeral events (1517). In response to the socket API messages, the client-side node can update the cached portion of the spatial event map with history events identified by the server-side network node, responds to API messages on the socket as specified by the API, the API message can include approval events including authorization from content owner account, and produce display data for both history events and ephemeral events about which it is notified by the socket messages (1515).

The client-side node can detect receipt of a message from the collaboration server to end the breakout session (1519). The client-side node can receive an event to display content in all breakout rooms in the workspace to all participants in the collaboration meeting. The client-side node then displays the content in the breakout room within the boundary of the breakout room by rendering the content (1521).

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present technology may consist of any such feature or combination of features. In view of the foregoing description, it will be evident to a person skilled in the art that various modifications may be made within the scope of the technology.

The foregoing description of preferred embodiments of the present technology has been provided for the purposes of illustration and description. It is not intended to be exhaustive or to limit the technology to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the technology. In addition, any and all variations described, suggested or incorporated by reference herein with respect to any one embodiment are also to be considered taught with respect to all other embodiments. The embodiments described herein were chosen and described in order to best explain the principles of the technology and its practical application, thereby enabling others skilled in the art to understand the technology for various embodiments and with various modifications as are suited to the particular use contemplated. It is intended that the scope of the technology be defined by the following claims and their equivalents.

What is claimed is:

1. A method of operating a network node to implement a collaborative breakout session in a video conference between other network nodes hosted in part by a collaboration system, the method comprising:

establishing the video conference between the other network nodes, the network node and each network node of the other network nodes including a display having a physical display space and a processor;

identifying a first group of network nodes of the other network nodes and identifying a first canvas of a virtual workspace, the first canvas having a location and dimensions in the virtual workspace, and the first group of network nodes being associated with the first canvas and the first canvas not including the entire virtual workspace;

within the video conference, initiating the collaborative breakout session by:

initiating a collaboration server of the collaboration system to provide the first group of network nodes access to the first canvas of the virtual workspace to commence collaboration on the first canvas of the virtual workspace by the first group of network nodes, the collaboration on the first canvas being commenced by, for each respective network node of the first group of network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping; and upon conclusion of the collaborative breakout session, initiating the collaboration server of the collaboration system to provide the first group of network nodes access to the entire virtual workspace to commence further collaboration on the virtual workspace.

2. The method of claim 1, wherein the collaboration on the first canvas is commenced by the first group by only allowing the network nodes of the first group to access the first canvas of the virtual workspace, without allowing the network nodes of the first group to access other portions of the virtual workspace.

3. The method of claim 1, further comprising:
identifying a second group of network nodes of the other network nodes and identifying a second canvas of the virtual workspace, the second group of network nodes being associated with the second canvas;
within the video conference, the collaborative breakout session is further initiated by:
initiating the collaboration server of the collaboration system to provide the second group of network nodes access to the second canvas of the virtual workspace to commence collaboration on the second canvas of the virtual workspace by the second group of network nodes, the collaboration on the second canvas being commenced by, for each respective network node of the second group of network nodes, (i) mapping a client viewport having a location and dimensions in the second canvas of the virtual workspace to a local client screen space of the respective network node having dimensions in the physical display space of the respective network node, and (ii) rendering digital assets having locations in the client viewport having the location and dimensions in the second canvas to the local client screen space of the respective network node as a function of the mapping; and
upon the conclusion of the collaborative breakout session, initiating the collaboration server of the collaboration system to provide both the first group of network nodes and the second group of network nodes access to both the first canvas and the second canvas of the virtual workspace to commence further collaboration on the first canvas and the second canvas.

4. The method of claim 3,
wherein the collaboration on the first canvas is commenced by the first group by only allowing the network nodes of the first group to access the first canvas of the virtual workspace, without allowing the network nodes of the first group to access the second canvas of the virtual workspace, and
wherein the collaboration on the second canvas is commenced by the second group by only allowing the network nodes of the second group to access the second canvas of the virtual workspace, without allowing the network nodes of the second group to access the first canvas of the virtual workspace.

5. The method of claim 3, wherein, during the collaborative breakout session, the network nodes of the first group can view digital assets having locations in the second canvas but they cannot participate in the collaboration on the second canvas by manipulating the digital assets having locations in the second canvas.

6. The method of claim 1,
wherein the network node is included in the first group of network nodes, and
wherein, during the collaborative breakout session, the network node or at least one network node of the first group stores collaboration data identifying digital assets having locations in the first canvas of the virtual workspace, the collaboration data including (i) locations of the identified digital assets having locations in the first canvas of the virtual workspace and (ii) a log of events (a) relating to the digital assets having locations in the first canvas of the virtual workspace and (b) including entries related to network nodes of the first group interacting with the identified digital assets having locations in the first canvas.

7. The method of claim 6, wherein the stored collaboration data identifies digital assets having locations in a second canvas of the virtual workspace and further includes (i) locations of the identified digital assets having locations in the second canvas of the virtual workspace and (ii) a log of events (a) relating to the digital assets having locations in the second canvas of the virtual workspace and (b) including entries related to network nodes of the second group interacting with the identified digital assets having locations in the second canvas.

8. The method of claim 7, wherein the first canvas and the second canvas do not overlap one another in the virtual workspace.

9. The method of claim 7, further comprising a user of the network node interacting with the collaboration system to (i) allow, during the collaborative breakout session, the first group of network nodes to collaborate using the second canvas of the virtual workspace and (ii) not allow, during the collaborative breakout session, the first group of network nodes to collaborate by viewing the second canvas of the virtual workspace.

10. The method of claim 7, wherein the first group of network nodes is allowed to collaborate with the second canvas by rendering, but not interacting with, the digital assets having locations within the second canvas.

11. The method of claim 7, wherein the first group of network nodes is allowed to collaborate with the second canvas by rendering and interacting with the digital assets having locations within the second canvas.

12. The method of claim 1, further comprising a user of the network node interacting with the collaboration system to form the first group of network nodes and assign the first canvas of the virtual workspace to the first group prior to establishing the video conference with the other network nodes.

13. The method of claim 1, further comprising a user of the network node interacting with the collaboration system to form the first group of network nodes and assign the first canvas of the virtual workspace to the first group after establishing the video conference with the other network nodes.

14. The method of claim 1, further comprising a user of the network node interacting with the collaboration system to (i) allow, during the collaborative breakout session, the first group of network nodes to collaborate using other portions of the virtual workspace outside of the first canvas and (ii) not allow, during the collaborative breakout session, the first group of network nodes to collaborate by viewing other portions of the virtual workspace that are outside of the first canvas.

15. The method of claim 1, further comprising:
identifying a first sub-canvas of the first canvas and identifying a second sub-canvas of the first canvas; and
identifying a first sub-group of network nodes of the first group of network nodes and identifying a second sub-group of network nodes of the first group of network nodes, wherein the initiating of the collaborative breakout session includes:
  initiating the collaboration server of the collaboration system to provide the first sub-group of network nodes access to the first sub-canvas of the first canvas of the virtual workspace to commence collaboration on the first sub-canvas of the first canvas of the virtual workspace by the first sub-group of network nodes; and
  initiating the collaboration server of the collaboration system to provide the second sub-group of network nodes access to the second sub-canvas of the first canvas of the virtual workspace to commence collaboration on the second sub-canvas of the first canvas of the virtual workspace by the second sub-group of network nodes.

16. A network node of a collaboration system, the collaboration system for hosting a collaborative breakout session in a video conference between the network node and other network nodes, the network node comprising:
  a display having a physical display space and a processor, the processor being configured with logic to:
    establish the video conference between the other network nodes, the network node and each network node of the other network nodes including a display having a physical display space;
    identify a first group of network nodes of the other network nodes and identify a first canvas of a virtual workspace, the first canvas having a location and dimensions in the virtual workspace, and the first group of network nodes being associated with the first canvas and the first canvas not including the entire virtual workspace;
    within the video conference, initiate the collaborative breakout session by:
      initiating a collaboration server of the collaboration system to provide the first group of network nodes access to the first canvas of the virtual workspace to commence collaboration on the first canvas of the virtual workspace by the first group of network nodes, the collaboration on the first canvas being commenced by, for each respective network node of the first group of network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping; and
    upon conclusion of the collaborative breakout session, initiate the collaboration server of the collaboration system to provide the first group of network nodes access to the entire virtual workspace to commence further collaboration on the virtual workspace.

17. A method of operating a collaboration server of a collaboration system to implement a collaborative breakout session in a video conference between network nodes of the collaboration system, the method comprising:
  establishing the video conference between the network nodes, each of the network nodes including a display having a physical display space and a processor;
  receiving an identification of a first group of network nodes of the network nodes and receiving an identification of a first canvas of a virtual workspace, the first canvas having a location and dimensions in the virtual workspace, and the first group of network nodes being associated with the first canvas and the first canvas not including the entire virtual workspace;
  within the video conference, initiating the collaborative breakout session by:
    providing the first group of network nodes access to the first canvas of the virtual workspace to commence collaboration on the first canvas of the virtual workspace by the first group of network nodes, the collaboration on the first canvas being commenced by providing information to each network node of the first group of network nodes that allows for, for each respective network node of the first group of the network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping; and
  upon conclusion of the collaborative breakout session, providing the first group of network nodes access to the entire virtual workspace to commence further collaboration on the virtual workspace.

18. The method of claim 17, further comprising:
  during the collaborative breakout session, providing collaboration data to each of the network nodes of the first group, the collaboration data identifying digital assets having locations in the first canvas of the virtual workspace, the collaboration data including (i) locations in first canvas of the virtual workspace of the identified digital assets and (ii) a log of events (a) relating to the digital assets having locations in the first canvas of the virtual workspace and (b) including entries related to network nodes of the first group interacting with the identified digital assets having locations in the first canvas.

19. A collaboration server of a collaboration system, the collaboration system for hosting a collaborative breakout session in a video conference between network nodes including a display having a physical display space and a processor, the collaboration server comprising:
  a processor configured with logic to:
    establish the video conference between the network nodes;
    receive an identification of a first group of network nodes of the network nodes and receive an identification of a first canvas of a virtual workspace, the first canvas having a location and dimensions in the virtual workspace, and the first group of network nodes being associated with the first canvas and the first canvas not including the entire virtual workspace;
    within the video conference, initiate the collaborative breakout session by:
      providing the first group of network nodes access to the first canvas of the virtual workspace to commence collaboration on the first canvas of the virtual workspace by the first group of network nodes, the collaboration on the first canvas being commenced by providing information to each network node of the first group of network nodes that allows for, for each respective network node of the first group of network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping; and upon conclusion of the collaborative breakout session, provide the first group of network nodes access to the entire virtual workspace to commence further collaboration on the virtual workspace.

20. A method of operating a network node to implement a collaborative breakout session in a content collaboration session between other network nodes hosted in part by a collaboration system, the method comprising:

establishing the content collaboration session between the other network nodes, the network node and each network node of the other network nodes including a display having a physical display space and a processor;

identifying a first group of network nodes of the other network nodes and identifying a first canvas of a virtual workspace, the first canvas having a location and dimensions in the virtual workspace, and the first group of network nodes being associated with the first canvas and the first canvas not including the entire virtual workspace;

within the content collaboration session, initiating the collaborative breakout session by:

initiating a collaboration server of the collaboration system to provide the first group of network nodes access to the first canvas of the virtual workspace to commence collaboration on the first canvas of the virtual workspace by the first group of network nodes, the collaboration on the first canvas being commenced by, for each respective network node of the first group of network nodes, (i) mapping a client viewport having a location and dimensions in the first canvas of the virtual workspace to a local client screen space of the respective network node having dimensions in the physical display space of the respective network node, and (ii) rendering digital assets having locations in the client viewport to the local client screen space of the respective network node as a function of the mapping; and upon conclusion of the collaborative breakout session, initiating the collaboration server of the collaboration system to provide the first group of network nodes access to the entire virtual workspace to commence further collaboration on the virtual workspace.

* * * * *